United States Patent
Whisman, III

(10) Patent No.: US 7,175,770 B2
(45) Date of Patent: Feb. 13, 2007

(54) METHODS AND SYSTEMS FOR GROUNDWATER REMEDIATION

(75) Inventor: Charles B. Whisman, III, Lancaster, PA (US)

(73) Assignee: Groundwater and Environmental Services, Inc., Exton, PA (US)

(*) Notice: Subject to any disclaimer, the term of this patent is extended or adjusted under 35 U.S.C. 154(b) by 132 days.

(21) Appl. No.: 10/802,103

(22) Filed: Mar. 16, 2004

(65) Prior Publication Data
US 2004/0238459 A1 Dec. 2, 2004

Related U.S. Application Data

(60) Provisional application No. 60/455,527, filed on Mar. 17, 2003.

(51) Int. Cl.
*B09C 1/00* (2006.01)
*C02F 1/72* (2006.01)
*C02F 1/78* (2006.01)

(52) U.S. Cl. .............. 210/747; 210/759; 210/760; 405/128.3; 405/128.5; 405/128.7; 405/128.75; 166/264

(58) Field of Classification Search .......... 210/747, 210/759, 760; 405/128.45, 128.5, 128.3, 405/128.7, 128.75; 166/264
See application file for complete search history.

(56) References Cited

U.S. PATENT DOCUMENTS

| | | | |
|---|---|---|---|
| 5,286,141 A | 2/1994 | Vigneri | |
| 5,755,977 A | 5/1998 | Gurol et al. | |
| 5,868,523 A | 2/1999 | Nickell et al. | |
| 5,967,233 A | 10/1999 | Riese et al. | |
| 6,024,882 A | 2/2000 | McNeilly et al. | |
| 6,210,073 B1* | 4/2001 | Buehlman et al. | 405/128.25 |
| 6,319,328 B1 | 11/2001 | Greenberg et al. | |
| 6,457,905 B1 | 10/2002 | Nickell | |
| 6,502,633 B2 | 1/2003 | Cooper et al. | |
| 6,517,288 B2 | 2/2003 | Schindler | |
| 2003/0029792 A1 | 2/2003 | Kerfoot | |

OTHER PUBLICATIONS

Herlihy, "Ozone, oxygen and hydrogen peroxide injection for agressive in-situ chemical oxidation of MTBE (methyl tertiary-butyl ether) and TBA (tert-butyl alcohol)," 13th Ann. W. Coast Contaminated Soils, Sediments & Water Conf., Soil Sediment Contam. (2003) 12:P737 (Abstract).

Whisman and Herlihy, "Ozone, oxygen and hydrogen peroxide injection for agressive in-situ chemical oxidation of MTBEand TBA," Soil Sediment Contam. (2004) 13:208-209.

Whisman and Herlihy, "Ozone, oxygen and hydrogen peroxide injection for agressive in-situ chemical oxidation of MTBEand TBA," Soil Sediment Contam. (2003) 12:737.

* cited by examiner

*Primary Examiner*—Robert Hopkins
(74) *Attorney, Agent, or Firm*—Cozen O'Connor, P.C.

(57) ABSTRACT

The present invention provides systems and methods for the remediation of contaminated water, soils and/or sediments. In some embodiments, the system includes one or more conduits for injection of hydrogen peroxide and ozone based reagents.

86 Claims, 56 Drawing Sheets

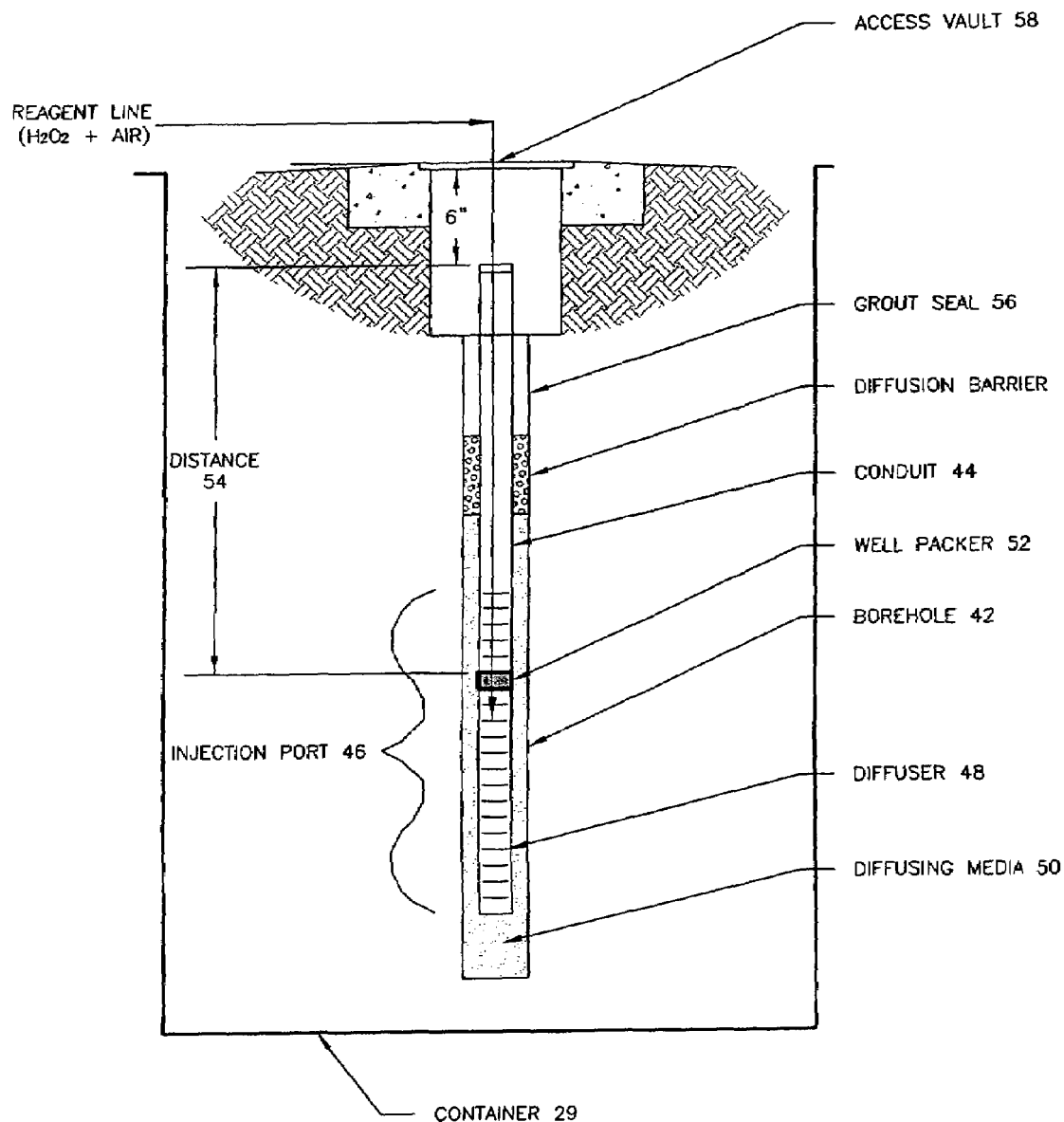

Figure 3
Ozone, Hydrogen Peroxide, Oxygen, & Air Injection

Step 1 – Duration 20 minutes

| Injection Solution | Injection Point | | | | | | | | | |
|---|---|---|---|---|---|---|---|---|---|---|
| | 1 | 2 | 3 | 4 | 5 | 6 | 7 | 8 | 9 | 10 |
| Ozone | 1 | 1 | 1 | 1 | | | | | | |
| Air | | | 1 | 1 | | | | | | |
| Hydrogen Peroxide | | | 1 | 1 | 1 | 1 | | | | |

Step 2 – Duration 10 minutes

| Injection Solution | Injection Point | | | | | | | | | |
|---|---|---|---|---|---|---|---|---|---|---|
| | 1 | 2 | 3 | 4 | 5 | 6 | 7 | 8 | 9 | 10 |
| Ozone | | | | | 1 | 1 | 1 | 1 | | |
| Air | | | | | 1 | 1 | 1 | 1 | | |
| Hydrogen Peroxide | | | | | 1 | 1 | 1 | 1 | | |

Step 3 – Duration 20 minutes

| Injection Solution | Injection Point | | | | | | | | | |
|---|---|---|---|---|---|---|---|---|---|---|
| | 1 | 2 | 3 | 4 | 5 | 6 | 7 | 8 | 9 | 10 |
| Ozone | 1 | 1 | 1 | 1 | | | | | 1 | 1 |
| Air | | | | | | | | | 1 | 1 |
| Hydrogen Peroxide | | | 1 | 1 | 1 | 1 | | | | |

FIGURE 4A (TABLE 1)

| Monitoring Well | Date | Benzene (µg/L) | Toluene (µg/L) | Ethylbenzene (µg/L) | Total Xylenes (µg/L) | Total BTEX (µg/L) | MTBE (µg/L) | Isopropyl Benzene (µg/L) | Naphthalene (µg/L) | tert-Butyl Alcohol (µg/L) | tert-amyl methyl ether (µg/L) |
|---|---|---|---|---|---|---|---|---|---|---|---|
| DERBCAP Distance to POE or POC | | 29 | 7,300 | 3,700 | 73,000 | NA | 180 | 3,700 | 15,000 | NA | NA |
| 11 MAIN ST.-WELL#1 | 01/10/2002 | ND<1 | ND<1 | ND<1 | ND<1 | ND<4 | ND<1 | ND<1 | - | ND<10 | ND<1 |
| | 06/24/2002 | ND<0.5 | ND<0.7 | ND<0.8 | ND<0.8 | ND<2.8 | ND<0.5 | ND<1 | ND<1 | ND<10 | ND<10 |
| | 09/23/2002 | ND<0.5 | ND<0.7 | ND<0.8 | ND<0.8 | ND<2.8 | ND<0.5 | ND<1 | - | ND<10 | ND<0.8 |
| | 12/17/2002 | ND<5 | ND<5 | ND<5 | ND<5 | ND<20 | ND<5 | ND<5 | ND<5 | ND<100 | ND<5 |
| | 03/17/2003 | ND<1 | ND<1 | ND<1 | ND<1 | ND<4 | ND<1 | ND<1 | ND<1 | ND<10 | ND<1 |
| 11 MAIN ST.-WELL#2 | 01/10/2002 | ND<1 | ND<1 | ND<1 | ND<1 | ND<4 | ND<1 | ND<1 | - | ND<10 | ND<1 |
| | 06/24/2002 | ND<0.5 | ND<0.7 | ND<0.8 | ND<0.8 | ND<2.8 | ND<0.5 | ND<1 | ND<1 | ND<10 | ND<0.8 |
| | 09/23/2002 | ND<0.5 | ND<0.7 | ND<0.8 | ND<0.8 | ND<2.8 | ND<0.5 | ND<1 | - | ND<10 | ND<0.8 |
| | 12/17/2002 | ND<5 | ND<5 | ND<5 | ND<5 | ND<20 | ND<5 | ND<5 | ND<5 | ND<100 | ND<5 |
| | 03/17/2003 | ND<1 | ND<1 | ND<1 | ND<1 | ND<4 | ND<1 | ND<1 | ND<1 | ND<10 | ND<1 |
| 19 FRAZIER ST. | 02/11/2002 | ND<1 | ND<1 | ND<1 | ND<1 | ND<4 | ND<1 | ND<1 | - | ND<10 | ND<1 |
| | 06/24/2002 | ND<0.5 | ND<0.7 | ND<0.8 | ND<0.8 | ND<2.8 | ND<0.5 | ND<1 | ND<1 | ND<10 | ND<0.8 |
| | 12/16/2002 | ND<5 | ND<5 | ND<5 | ND<5 | ND<20 | ND<5 | ND<5 | ND<5 | ND<100 | ND<5 |
| | 03/19/2003 | ND<1 | ND<1 | ND<1 | ND<1 | ND<4 | ND<1 | ND<1 | ND<1 | ND<10 | ND<1 |
| | 05/29/2003 | ND<1 | ND<1 | ND<1 | ND<1 | ND<4 | 1 | ND<1 | ND<1 | ND<10 | ND<1 |
| 32 E. COMM. ST.-NEW | 01/10/2002 | ND<1 | ND<1 | ND<1 | ND<1 | ND<4 | ND<1 | ND<1 | NA | ND<10 | ND<1 |
| | 06/24/2002 | ND<0.5 | ND<0.7 | ND<0.8 | ND<0.8 | ND<2.8 | ND<0.5 | ND<1 | ND<1 | ND<10 | ND<0.8 |
| | 12/16/2002 | ND<5 | ND<5 | ND<5 | ND<5 | ND<20 | ND<5 | ND<5 | ND<5 | ND<100 | ND<5 |
| | 03/18/2003 | ND<1 | ND<1 | ND<1 | ND<1 | ND<4 | ND<1 | ND<1 | ND<1 | ND<10 | ND<1 |
| 32 E. COMM. ST.-OLD | 01/16/2002 | 1J | ND<1 | ND<1 | 1J | 2 | 2,000 | ND<1 | ND<1 | 60J | 220 |
| | 06/24/2002 | ND<0.5 | ND<0.7 | ND<0.8 | ND<0.8 | ND<2.8 | 21 | ND<1 | ND<1 | ND<10 | 1J |
| | 10/03/2002 | ND<0.5 | ND<0.7 | ND<0.8 | ND<0.8 | ND<2.8 | 4 | ND<1 | ND<1 | ND<10 | ND<0.8 |
| | 12/16/2002 | ND<5 | ND<5 | ND<5 | ND<5 | ND<20 | <5 | ND<5 | ND<5 | ND<100 | ND<5 |
| | 03/18/2003 | ND<1 | ND<1 | ND<1 | ND<1 | ND<4 | 4 | ND<1 | ND<1 | ND<10 | ND<1 |
| 87 E. COMM. ST.-EFF | 12/21/2001 | ND<5 | ND<5 | ND<5 | ND<5 | ND<20 | ND<5 | ND<5 | NA | ND<100 | ND<5 |
| | 01/04/2002 | ND<5 | ND<5 | ND<5 | ND<5 | ND<20 | ND<5 | ND<5 | NA | ND<100 | ND<5 |
| | 01/16/2002 | ND<1 | ND<1 | ND<1 | ND<1 | ND<4 | ND<1 | ND<1 | NA | ND<10 | ND<1 |
| | 02/11/2002 | ND<1 | ND<1 | ND<1 | ND<1 | ND<4 | ND<1 | ND<1 | NA | ND<10 | ND<1 |
| | 03/11/2002 | ND<1 | ND<1 | ND<1 | ND<1 | ND<4 | ND<1 | ND<1 | ND<1 | ND<10 | ND<1 |
| | 03/26/2002 | ND<1 | ND<1 | ND<1 | ND<1 | ND<4 | ND<1 | ND<1 | ND<1 | ND<10 | ND<1 |
| | 04/08/2002 | ND<1 | ND<1 | ND<1 | ND<1 | ND<4 | ND<1 | ND<1 | ND<1 | ND<10 | ND<1 |
| | 04/29/2002 | ND<0.5 | ND<0.7 | ND<0.8 | ND<0.8 | ND<2.8 | ND<0.5 | ND<1 | ND<1 | ND<10 | ND<0.8 |
| | 05/20/2002 | ND<0.5 | ND<0.7 | ND<0.8 | ND<0.8 | ND<2.8 | ND<0.5 | ND<1 | ND<1 | ND<10 | ND<0.8 |
| | 05/29/2002 | ND<0.5 | ND<0.7 | ND<0.8 | ND<0.8 | ND<2.8 | ND<0.5 | ND<1 | ND<1 | ND<10 | ND<0.8 |
| | 06/10/2002 | ND<0.5 | ND<0.7 | ND<0.8 | ND<0.8 | ND<2.8 | ND<0.5 | ND<1 | ND<1 | ND<10 | ND<0.8 |
| | 06/24/2002 | ND<0.5 | ND<0.7 | ND<0.8 | ND<0.8 | ND<2.8 | ND<0.5 | ND<1 | ND<1 | ND<10 | ND<0.8 |
| | 07/18/2002 | ND<0.5 | ND<0.7 | ND<0.8 | ND<0.8 | ND<2.8 | ND<0.5 | ND<1 | - | ND<10 | ND<0.8 |

FIGURE 4B (TABLE 1)

| Monitoring Well | Date | Benzene (µg/L) | Toluene (µg/L) | Ethylbenzene (µg/L) | Total Xylenes (µg/L) | Total BTEX (µg/L) | MTBE (µg/L) | Isopropyl Benzene (µg/L) | Naphthalene (µg/L) | tert-Butyl Alcohol (µg/L) | tert-amyl methyl ether (µg/L) |
|---|---|---|---|---|---|---|---|---|---|---|---|
| DERBCAP Distance to POE or POC | | 29 | 7,300 | 3,700 | 73,000 | NA | 180 | 3,700 | 15,000 | NA | NA |
| 87 E. COMM. ST.-EFF Con't | 07/29/2002 | ND<0.5 | ND<0.7 | ND<0.8 | ND<0.8 | ND<2.8 | ND<0.5 | ND<1 | ND<1 | ND<10 | ND<0.8 |
| | 08/07/2002 | ND<0.5 | ND<0.7 | ND<0.8 | ND<0.8 | ND<2.8 | ND<0.5 | ND<1 | - | ND<10 | ND<0.8 |
| | 08/26/2002 | ND<0.5 | ND<0.7 | ND<0.8 | ND<0.8 | ND<2.8 | ND<0.5 | ND<1 | ND<1 | ND<10 | ND<0.8 |
| | 09/09/2002 | ND<0.5 | ND<0.7 | ND<0.8 | ND<0.8 | ND<2.8 | ND<0.5 | ND<1 | ND<1 | ND<10 | ND<0.8 |
| | 10/14/2002 | ND<0.5 | ND<0.7 | ND<0.8 | ND<0.8 | ND<2.8 | ND<0.5 | ND<1 | ND<1 | ND<10 | ND<0.8 |
| | 10/28/2002 | ND<1 | ND<1 | ND<1 | ND<1 | ND<4 | ND<1 | ND<1 | ND<1 | ND<10 | ND<1 |
| | 11/04/2002 | ND<1 | ND<1 | ND<1 | ND<1 | ND<4 | ND<1 | ND<1 | ND<1 | ND<10 | ND<1 |
| | 11/20/2002 | ND<1 | ND<1 | ND<1 | ND<1 | ND<4 | ND<1 | ND<1 | ND<1 | ND<10 | ND<1 |
| | 12/04/2002 | ND<1 | ND<1 | ND<1 | ND<1 | ND<4 | ND<1 | ND<1 | ND<1 | ND<10 | ND<1 |
| | 12/16/2002 | ND<5 | ND<5 | ND<5 | ND<5 | ND<20 | ND<5 | ND<5 | ND<5 | ND<100 | ND<5 |
| | 02/05/2003 | ND<5 | ND<5 | ND<5 | ND<5 | ND<20 | ND<5 | ND<5 | ND<5 | ND<100 | ND<5 |
| | 03/03/2003 | ND<1 | ND<1 | ND<1 | ND<1 | ND<4 | ND<1 | ND<1 | ND<1 | ND<10 | ND<1 |
| | 04/23/2003 | ND<1 | ND<1 | ND<1 | ND<1 | ND<4 | ND<1 | ND<1 | ND<1 | ND<10 | ND<1 |
| | 05/29/2003 | ND<1 | ND<1 | ND<1 | ND<1 | ND<4 | ND<1 | ND<1 | ND<1 | ND<10 | ND<1 |
| | 06/17/2003 | ND<1 | ND<1 | ND<1 | ND<1 | ND<4 | 6 | ND<1 | ND<1 | ND<10 | ND<1 |
| | 07/14/2003 | ND<1 | ND<1 | ND<1 | ND<1 | ND<4 | 1 | ND<1 | - | ND<10 | ND<1 |
| | 08/18/2003 | ND<1 | ND<1 | ND<1 | ND<1 | ND<4 | ND<1 | ND<1 | ND<1 | ND<10 | ND<1 |
| | 09/18/2003 | ND<1 | ND<1 | ND<1 | ND<1 | ND<4 | 3 | ND<1 | ND<1 | ND<10 | ND<1 |
| | 10/21/2003 | ND<1 | ND<1 | ND<1 | ND<1 | ND<4 | 3 | ND<1 | ND<1 | ND<10 | ND<1 |
| | 11/21/2003 | ND<1 | ND<1 | ND<1 | ND<1 | ND<4 | 3 | ND<1 | ND<1 | ND<10 | ND<1 |
| | 12/08/2003 | ND<1 | ND<1 | ND<1 | ND<1 | ND<4 | 3 | ND<1 | ND<1 | ND<10 | ND<1 |
| 87 E. COMM. ST.-INF | 12/21/2001 | ND<5 | ND<5 | ND<5 | ND<5 | ND<20 | ND<5 | ND<5 | NA | ND<100 | ND<5 |
| | 01/04/2002 | ND<5 | ND<5 | ND<5 | ND<5 | ND<20 | ND<5 | ND<5 | NA | ND<100 | ND<5 |
| | 01/16/2002 | ND<1 | ND<1 | ND<1 | ND<1 | ND<4 | 41 | ND<1 | NA | ND<10 | ND<1 |
| | 02/11/2002 | ND<1 | ND<1 | ND<1 | ND<1 | ND<4 | 6 | ND<1 | NA | ND<10 | ND<1 |
| | 03/11/2002 | ND<1 | ND<1 | ND<1 | ND<1 | ND<4 | 8 | ND<1 | ND<1 | ND<10 | ND<1 |
| | 03/26/2002 | ND<1 | ND<1 | ND<1 | ND<1 | ND<4 | 13 | ND<1 | ND<1 | ND<10 | ND<1 |
| | 04/08/2002 | ND<1 | ND<1 | ND<1 | ND<1 | ND<4 | 13 | ND<1 | ND<1 | ND<10 | ND<1 |
| | 04/29/2002 | ND<0.5 | ND<0.7 | ND<0.8 | ND<0.8 | ND<2.8 | 16 | ND<1 | ND<1 | ND<10 | ND<0.8 |
| | 05/20/2002 | ND<0.5 | ND<0.7 | ND<0.8 | ND<0.8 | ND<2.8 | 24 | ND<1 | ND<1 | ND<10 | ND<0.8 |
| | 05/29/2002 | ND<0.5 | ND<0.7 | ND<0.8 | ND<0.8 | ND<2.8 | 25 | ND<1 | ND<1 | ND<10 | ND<0.8 |
| | 06/10/2002 | ND<0.5 | ND<0.7 | ND<0.8 | ND<0.8 | ND<2.8 | 27 | ND<1 | ND<1 | ND<10 | ND<0.8 |
| | 06/24/2002 | ND<0.5 | ND<0.7 | ND<0.8 | ND<0.8 | ND<2.8 | 29 | ND<1 | ND<1 | ND<10 | ND<0.8 |
| | 07/18/2002 | ND<0.5 | ND<0.7 | ND<0.8 | ND<0.8 | ND<2.8 | 26 | ND<1 | ND<1 | ND<10 | 0.8 J |
| | 07/29/2002 | ND<0.5 | ND<0.7 | ND<0.8 | ND<0.8 | ND<2.8 | 21 | ND<1 | - | ND<10 | 0.9 J |
| | 08/07/2002 | ND<0.5 | ND<0.7 | ND<0.8 | ND<0.8 | ND<2.8 | 22 | ND<1 | ND<1 | ND<10 | 1 J |
| | 08/26/2002 | ND<0.5 | ND<0.7 | ND<0.8 | ND<0.8 | ND<2.8 | 25 | ND<1 | ND<1 | ND<10 | 1 J |
| | 09/09/2002 | ND<0.5 | ND<0.7 | ND<0.8 | ND<0.8 | ND<2.8 | 18 | ND<1 | ND<1 | ND<10 | 1 J |
| | 10/14/2002 | ND<0.5 | ND<0.7 | ND<0.8 | ND<0.8 | ND<2.8 | 16 | ND<1 | ND<1 | ND<10 | ND<0.8 |
| | 10/28/2002 | ND<1 | ND<1 | ND<1 | ND<1 | ND<4 | 13 | ND<1 | ND<1 | ND<10 | ND<1 |
| | 11/04/2002 | ND<1 | ND<1 | ND<1 | ND<1 | ND<4 | 12 | ND<1 | ND<1 | ND<10 | ND<1 |
| | 11/20/2002 | ND<1 | ND<1 | ND<1 | ND<1 | ND<4 | 11 | ND<1 | ND<1 | ND<10 | 1 |
| | 12/04/2002 | ND<1 | ND<1 | ND<1 | ND<1 | ND<4 | 11 | ND<1 | ND<1 | ND<10 | 1 |
| | 12/16/2002 | ND<5 | ND<5 | ND<5 | ND<5 | ND<20 | 13 | ND<5 | ND<5 | ND<100 | 1 |
| | 02/05/2003 | ND<5 | ND<5 | ND<5 | ND<5 | ND<20 | 11 | ND<5 | ND<5 | ND<100 | ND<5 |
| | 03/03/2003 | ND<1 | ND<1 | ND<1 | ND<1 | ND<4 | 10 | ND<1 | ND<1 | ND<10 | 2 |
| | 04/23/2003 | ND<1 | ND<1 | ND<1 | ND<1 | ND<4 | 12 | ND<1 | ND<1 | ND<10 | 1 |

FIGURE 4C (TABLE 1)

| Monitoring Well | Date | Benzene (µg/L) | Toluene (µg/L) | Ethylbenzene (µg/L) | Total Xylenes (µg/L) | Total BTEX (µg/L) | MTBE (µg/L) | Isopropyl Benzene (µg/L) | Naphthalene (µg/L) | tert-Butyl Alcohol (µg/L) | tert-amyl methyl ether (µg/L) |
|---|---|---|---|---|---|---|---|---|---|---|---|
| DERBCAP Distance to POE or POC | | 29 | 7,300 | 3,700 | 73,000 | NA | 180 | 3,700 | 15,000 | NA | NA |
| 87 E. COMM. ST.-INF Cont | 05/29/2003 | ND<1 | ND<1 | ND<1 | ND<1 | ND<4 | 8 | ND<1 | ND<1 | ND<10 | - |
| | 06/17/2003 | ND<1 | ND<1 | ND<1 | ND<1 | ND<4 | 7 | ND<1 | ND<1 | ND<10 | - |
| | 07/14/2003 | ND<1 | ND<1 | ND<1 | ND<1 | ND<4 | - | - | - | - | - |
| | 08/18/2003 | ND<1 | ND<1 | ND<1 | ND<1 | ND<4 | 3 | ND<1 | ND<1 | ND<10 | ND<1 |
| | 09/18/2003 | ND<1 | ND<1 | ND<1 | ND<1 | ND<4 | 3 | ND<1 | - | ND<10 | - |
| | 10/21/2003 | ND<1 | ND<1 | ND<1 | ND<1 | ND<4 | 3 | ND<1 | ND<1 | ND<10 | ND<1 |
| | 11/21/2003 | ND<1 | ND<1 | ND<1 | ND<1 | ND<4 | 2 | ND<1 | ND<1 | ND<10 | ND<1 |
| | 12/08/2003 | ND<1 | ND<1 | ND<1 | ND<1 | ND<4 | 1 | ND<1 | ND<1 | ND<10 | ND<1 |
| 102 E. COMM. ST. | 12/14/2001 | ND<1 | ND<1 | ND<1 | ND<3 | ND<6 | ND<1 | ND<1 | NA | ND<100 | NA |
| | 06/24/2002 | ND<0.5 | ND<0.7 | ND<0.8 | ND<0.8 | ND<2.8 | ND<0.5 | ND<1 | ND<1 | ND<10 | ND<0.8 |
| | 09/23/2002 | ND<0.5 | ND<0.7 | ND<0.8 | ND<0.8 | ND<2.8 | ND<0.5 | ND<1 | - | ND<10 | ND<0.8 |
| 103 FRAZIER ST. | 02/11/2002 | ND<1 | ND<1 | ND<1 | ND<1 | ND<4 | ND<1 | ND<1 | - | ND<10 | ND<1 |
| | 06/24/2002 | ND<0.5 | ND<0.7 | ND<0.8 | ND<0.8 | ND<2.8 | ND<0.5 | ND<1 | ND<1 | ND<10 | ND<0.8 |
| | 09/23/2002 | ND<0.5 | ND<0.7 | ND<0.8 | ND<0.8 | ND<2.8 | ND<0.5 | ND<1 | - | ND<10 | ND<0.8 |
| | 12/16/2002 | ND<5 | ND<5 | ND<5 | ND<5 | ND<20 | ND<5 | ND<5 | ND<5 | ND<100 | ND<5 |
| | 03/19/2003 | ND<1 | ND<1 | ND<1 | ND<1 | ND<4 | ND<1 | ND<1 | ND<1 | ND<10 | ND<1 |
| | 05/29/2003 | ND<1 | ND<1 | ND<1 | ND<1 | ND<4 | ND<1 | ND<1 | ND<1 | ND<10 | ND<1 |
| | 12/08/2003 | ND<1 | ND<1 | ND<1 | 2 | 2 | ND<1 | ND<1 | ND<1 | ND<10 | ND<1 |
| 126 FRAZIER ST. | 01/10/2002 | ND<1 | ND<1 | ND<1 | ND<1 | ND<4 | ND<1 | ND<1 | - | ND<10 | ND<1 |
| | 06/24/2002 | ND<0.5 | ND<0.7 | ND<0.8 | ND<0.8 | ND<2.8 | ND<0.5 | ND<1 | ND<1 | ND<10 | ND<0.8 |
| | 09/23/2002 | ND<0.5 | ND<0.7 | ND<0.8 | ND<0.8 | ND<2.8 | ND<0.5 | ND<1 | - | ND<10 | ND<0.8 |
| | 12/16/2002 | ND<5 | ND<5 | ND<5 | ND<5 | ND<20 | ND<5 | ND<5 | ND<5 | ND<100 | ND<5 |
| | 03/18/2003 | ND<1 | ND<1 | ND<1 | ND<1 | ND<4 | ND<1 | ND<1 | ND<1 | ND<10 | ND<1 |
| 170 FRAZIER ST.-EFF | 12/21/2001 | ND<5 | ND<5 | ND<5 | ND<5 | ND<20 | ND<5 | ND<5 | NA | ND<100 | ND<5 |
| | 01/04/2002 | ND<5 | ND<5 | ND<5 | ND<5 | ND<20 | ND<5 | ND<5 | NA | ND<100 | ND<5 |
| | 01/16/2002 | ND<1 | ND<1 | ND<1 | ND<1 | ND<4 | ND<1 | ND<1 | NA | ND<10 | ND<1 |
| | 02/11/2002 | ND<1 | ND<1 | ND<1 | ND<1 | ND<4 | ND<1 | ND<1 | NA | ND<10 | ND<1 |
| | 03/11/2002 | ND<1 | ND<1 | ND<1 | ND<1 | ND<4 | ND<1 | ND<1 | ND<1 | ND<10 | ND<1 |
| | 03/26/2002 | ND<1 | ND<1 | ND<1 | ND<1 | ND<4 | ND<1 | ND<1 | ND<1 | ND<10 | ND<1 |
| | 04/08/2002 | ND<1 | ND<1 | ND<1 | ND<1 | ND<4 | ND<1 | ND<1 | ND<1 | ND<10 | ND<1 |
| | 04/29/2002 | ND<0.5 | ND<0.7 | ND<0.8 | ND<0.8 | ND<2.8 | ND<0.5 | ND<1 | ND<1 | ND<10 | ND<0.8 |
| | 05/20/2002 | ND<0.5 | ND<0.7 | ND<0.8 | ND<0.8 | ND<2.8 | ND<0.5 | ND<1 | ND<1 | ND<10 | ND<0.8 |
| | 05/29/2002 | ND<0.5 | ND<0.7 | ND<0.8 | ND<0.8 | ND<2.8 | ND<0.5 | ND<1 | ND<1 | ND<10 | ND<0.8 |
| | 06/10/2002 | ND<0.5 | ND<0.7 | ND<0.8 | ND<0.8 | ND<2.8 | ND<0.5 | ND<1 | ND<1 | ND<10 | ND<0.8 |
| | 06/24/2002 | ND<0.5 | ND<0.7 | ND<0.8 | ND<0.8 | ND<2.8 | ND<0.5 | ND<1 | ND<1 | ND<10 | ND<0.8 |
| | 07/18/2002 | ND<0.5 | ND<0.7 | ND<0.8 | ND<0.8 | ND<2.8 | ND<0.5 | ND<1 | ND<1 | ND<10 | ND<0.8 |
| | 07/29/2002 | ND<0.5 | ND<0.7 | ND<0.8 | ND<0.8 | ND<2.8 | ND<0.5 | ND<1 | - | ND<10 | ND<0.8 |
| | 08/07/2002 | ND<0.5 | ND<0.7 | ND<0.8 | ND<0.8 | ND<2.8 | ND<0.5 | ND<1 | ND<1 | ND<10 | ND<0.8 |
| | 08/26/2002 | ND<0.5 | ND<0.7 | ND<0.8 | ND<0.8 | ND<2.8 | ND<0.5 | ND<1 | ND<1 | ND<10 | ND<0.8 |

FIGURE 4D (TABLE 1)

| Monitoring Well | Date | Benzene (µg/L) | Toluene (µg/L) | Ethylbenzene (µg/L) | Total Xylenes (µg/L) | Total BTEX (µg/L) | MTBE (µg/L) | Isopropyl Benzene (µg/L) | Naphthalene (µg/L) | tert-Butyl Alcohol (µg/L) | tert-amyl methyl ether (µg/L) |
|---|---|---|---|---|---|---|---|---|---|---|---|
| DERBCAP Distance to POE or POC | | 29 | 7,300 | 3,700 | 73,000 | NA | 180 | 3,700 | 15,000 | NA | NA |
| 170 FRAZIER ST.-EFF Con't | 09/09/2002 | ND<0.5 | ND<0.7 | ND<0.8 | ND<0.8 | ND<2.8 | ND<0.5 | ND<1 | ND<1 | ND<10 | ND<0.8 |
| | 09/25/2002 | ND<0.5 | ND<0.7 | ND<0.8 | ND<0.8 | ND<2.8 | ND<0.5 | ND<1 | ND<1 | ND<10 | ND<0.8 |
| | 10/14/2002 | ND<0.5 | ND<0.7 | ND<0.8 | ND<0.8 | ND<2.8 | ND<0.5 | ND<1 | ND<1 | ND<10 | ND<0.8 |
| | 10/28/2002 | ND<1 | ND<1 | ND<1 | ND<1 | ND<4 | ND<1 | ND<1 | ND<1 | ND<10 | ND<1 |
| | 11/04/2002 | ND<1 | ND<1 | ND<1 | ND<1 | ND<4 | ND<1 | ND<1 | ND<1 | ND<10 | ND<1 |
| | 11/20/2002 | ND<1 | ND<1 | ND<1 | ND<1 | ND<4 | ND<1 | ND<1 | ND<1 | ND<10 | ND<1 |
| | 12/04/2002 | ND<1 | ND<1 | ND<1 | ND<1 | ND<4 | ND<1 | ND<1 | ND<1 | ND<10 | ND<1 |
| | 12/16/2002 | ND<5 | ND<5 | ND<5 | ND<5 | ND<20 | ND<5 | ND<5 | ND<5 | ND<100 | ND<5 |
| | 01/13/2003 | ND<1 | ND<1 | ND<1 | ND<1 | ND<4 | ND<1 | ND<1 | ND<1 | - | - |
| | 02/05/2003 | ND<1 | ND<5 | ND<5 | ND<5 | ND<20 | ND<5 | ND<5 | ND<5 | ND<100 | ND<5 |
| | 03/03/2003 | ND<1 | ND<1 | ND<1 | ND<1 | ND<4 | ND<1 | ND<1 | ND<1 | ND<10 | ND<1 |
| | 04/23/2003 | ND<1 | ND<1 | ND<1 | ND<1 | ND<4 | ND<1 | ND<1 | ND<1 | ND<10 | ND<1 |
| | 05/29/2003 | ND<1 | ND<1 | ND<1 | ND<1 | ND<4 | ND<1 | ND<1 | ND<1 | ND<10 | ND<1 |
| | 06/17/2003 | ND<1 | ND<1 | ND<1 | ND<1 | ND<4 | ND<1 | ND<1 | ND<1 | ND<10 | ND<1 |
| | 07/14/2003 | ND<1 | ND<1 | ND<1 | ND<1 | ND<4 | ND<1 | ND<1 | ND<1 | ND<10 | ND<1 |
| | 08/18/2003 | ND<1 | ND<1 | ND<1 | ND<1 | ND<4 | ND<1 | ND<1 | ND<5 | ND<10 | ND<1 |
| | 09/18/2003 | ND<1 | ND<1 | ND<1 | ND<1 | ND<4 | ND<1 | ND<1 | - | ND<10 | ND<1 |
| | 10/21/2003 | ND<1 | ND<1 | ND<1 | ND<1 | ND<4 | ND<1 | ND<1 | ND<1 | ND<10 | ND<1 |
| | 11/21/2003 | ND<1 | ND<1 | ND<1 | ND<1 | ND<4 | ND<1 | ND<1 | ND<1 | ND<10 | ND<1 |
| | 12/08/2003 | ND<1 | ND<1 | ND<1 | ND<1 | ND<4 | ND<1 | ND<1 | ND<1 | ND<10 | ND<1 |
| 170 FRAZIER ST.-INF | 12/21/2001 | ND<5 | ND<5 | ND<5 | ND<5 | ND<20 | ND<5 | ND<5 | NA | ND<100 | ND<5 |
| | 01/04/2002 | ND<5 | ND<5 | ND<5 | ND<5 | ND<20 | 7 | ND<5 | NA | ND<100 | ND<5 |
| | 01/16/2002 | ND<1 | ND<1 | ND<1 | ND<1 | ND<4 | ND<1 | ND<1 | NA | ND<10 | ND<1 |
| | 02/11/2002 | ND<1 | ND<1 | ND<1 | ND<1 | ND<4 | NA | NA | NA | NA | NA |
| | 03/11/2002 | ND<1 | ND<1 | ND<1 | ND<1 | ND<4 | 7 | ND<1 | ND<1 | ND<10 | 3J |
| | 03/26/2002 | ND<1 | ND<1 | ND<1 | ND<1 | ND<4 | 7 | ND<1 | ND<1 | ND<10 | 3J |
| | 04/08/2002 | ND<1 | ND<1 | ND<0.8 | ND<0.8 | ND<2.8 | 7 | ND<1 | ND<1 | ND<10 | 3J |
| | 04/29/2002 | ND<0.5 | ND<0.7 | ND<0.8 | ND<0.8 | ND<2.8 | 4J | ND<1 | ND<1 | ND<10 | 1J |
| | 05/20/2002 | ND<0.5 | ND<0.7 | ND<0.8 | ND<0.8 | ND<2.8 | 5 | ND<1 | ND<1 | ND<10 | 1J |
| | 05/29/2002 | ND<0.5 | ND<0.7 | ND<0.8 | ND<0.8 | ND<2.8 | 5J | ND<1 | ND<1 | ND<10 | 1J |
| | 06/10/2002 | ND<0.5 | ND<0.7 | ND<0.8 | ND<0.8 | ND<2.8 | 3J | ND<1 | ND<1 | ND<10 | 1J |
| | 07/29/2002 | ND<0.5 | ND<0.7 | ND<0.8 | ND<0.8 | ND<2.8 | 3J | ND<1 | ND<1 | ND<10 | 1J |
| | 09/09/2002 | ND<0.5 | ND<0.7 | ND<0.8 | ND<0.8 | ND<2.8 | 4 | ND<1 | ND<1 | ND<10 | 1J |
| | 10/28/2002 | ND<1 | ND<1 | ND<1 | ND<1 | ND<4 | 7 | ND<1 | ND<1 | ND<100 | - |
| | 12/16/2002 | ND<5 | ND<5 | ND<5 | ND<5 | ND<20 | 6 | ND<5 | ND<5 | ND<10 | <5 |
| | 07/14/2003 | ND<1 | ND<1 | ND<1 | ND<1 | ND<4 | 6 | ND<1 | ND<1 | ND<10 | 2 |
| 212 E. COMM. ST. | 12/21/2001 | ND<5 | ND<5 | ND<5 | ND<5 | ND<20 | ND<5 | ND<5 | NA | ND<100 | ND<5 |
| | 01/04/2002 | ND<5 | ND<5 | ND<5 | ND<5 | ND<20 | ND<5 | ND<5 | NA | ND<100 | ND<5 |
| | 01/16/2002 | ND<1 | ND<1 | ND<1 | ND<1 | ND<4 | ND<1 | ND<1 | NA | ND<10 | ND<1 |
| | 02/11/2002 | ND<1 | ND<1 | ND<1 | ND<1 | ND<4 | ND<1 | ND<1 | NA | ND<10 | ND<1 |
| | 03/11/2002 | ND<1 | ND<1 | ND<1 | ND<1 | ND<4 | ND<1 | ND<1 | ND<1 | ND<10 | ND<1 |
| | 03/26/2002 | ND<1 | ND<1 | ND<1 | ND<1 | ND<4 | ND<1 | ND<1 | ND<1 | ND<10 | ND<1 |
| | 04/08/2002 | ND<1 | ND<1 | ND<1 | ND<1 | ND<4 | ND<1 | ND<1 | ND<1 | ND<10 | ND<1 |
| | 04/29/2002 | ND<0.5 | ND<0.7 | ND<0.8 | ND<0.8 | ND<2.8 | ND<0.5 | ND<1 | ND<1 | ND<10 | ND<0.8 |
| | 05/20/2002 | ND<0.5 | ND<0.7 | ND<0.8 | ND<0.8 | ND<2.8 | ND<0.5 | ND<1 | ND<1 | ND<10 | ND<0.8 |

FIGURE 4E (TABLE 1)

| Monitoring Well | Date | Benzene (µg/L) | Toluene (µg/L) | Ethylbenzene (µg/L) | Total Xylenes (µg/L) | Total BTEX (µg/L) | MTBE (µg/L) | Isopropyl Benzene (µg/L) | Naphthalene (µg/L) | tert-Butyl Alcohol (µg/L) | tert-amyl methyl ether (µg/L) |
|---|---|---|---|---|---|---|---|---|---|---|---|
| DERBCAP Distance to POE or POC | | 29 | 7,300 | 3,700 | 73,000 | NA | 180 | 3,700 | 15,000 | NA | NA |
| 212 E. COMM. ST. Con't | 05/29/2002 | ND<0.5 | ND<0.7 | ND<0.8 | ND<0.8 | ND<2.8 | ND<0.5 | ND<1 | ND<1 | ND<10 | ND<0.8 |
| | 06/10/2002 | ND<0.5 | ND<0.7 | ND<0.8 | ND<0.8 | ND<2.8 | ND<0.5 | ND<1 | ND<1 | ND<10 | ND<0.8 |
| | 06/24/2002 | ND<0.5 | ND<0.7 | ND<0.8 | ND<0.8 | ND<2.8 | 2 J | ND<1 | ND<1 | ND<10 | ND<0.8 |
| | 07/18/2002 | ND<0.5 | ND<0.7 | ND<0.8 | ND<0.8 | ND<2.8 | ND<0.5 | ND<1 | | ND<10 | ND<0.8 |
| | 07/29/2002 | ND<0.5 | ND<0.7 | ND<0.8 | ND<0.8 | ND<2.8 | ND<0.5 | ND<1 | ND<1 | ND<10 | ND<0.8 |
| | 08/07/2002 | ND<0.5 | ND<0.7 | ND<0.8 | ND<0.8 | ND<2.8 | ND<0.5 | ND<1 | ND<1 | ND<10 | ND<0.8 |
| | 08/26/2002 | ND<0.5 | ND<0.7 | ND<0.8 | ND<0.8 | ND<2.8 | ND<0.5 | ND<1 | ND<1 | ND<10 | ND<0.8 |
| | 09/09/2002 | ND<0.5 | ND<0.7 | ND<0.8 | ND<0.8 | ND<2.8 | ND<0.5 | ND<1 | ND<1 | ND<10 | ND<0.8 |
| | 09/25/2002 | ND<0.5 | ND<0.7 | ND<0.8 | ND<0.8 | ND<2.8 | ND<0.5 | ND<1 | ND<1 | ND<10 | ND<0.8 |
| | 10/14/2002 | ND<0.5 | ND<0.7 | ND<0.8 | ND<0.8 | ND<2.8 | ND<0.5 | ND<1 | ND<1 | ND<10 | ND<0.8 |
| | 10/28/2002 | ND<1 | ND<1 | ND<1 | ND<1 | ND<4 | ND<1 | ND<1 | ND<1 | ND<10 | ND<1 |
| | 11/04/2002 | ND<1 | ND<1 | ND<1 | ND<1 | ND<4 | ND<1 | ND<1 | ND<1 | ND<10 | ND<1 |
| | 11/20/2002 | ND<1 | ND<1 | ND<1 | ND<1 | ND<4 | ND<1 | ND<1 | ND<1 | ND<10 | ND<1 |
| | 12/04/2002 | ND<1 | ND<1 | ND<1 | ND<1 | ND<4 | ND<1 | ND<1 | ND<1 | ND<10 | ND<1 |
| | 12/16/2002 | ND<5 | ND<5 | ND<5 | ND<5 | ND<20 | ND<5 | ND<5 | ND<5 | ND<100 | ND<5 |
| | 03/19/2003 | ND<1 | ND<1 | ND<1 | ND<1 | ND<4 | ND<1 | ND<1 | ND<1 | ND<10 | ND<1 |
| | 05/29/2003 | ND<1 | ND<1 | ND<1 | ND<1 | ND<4 | ND<1 | ND<1 | ND<1 | ND<10 | ND<1 |
| | 12/08/2003 | ND<1 | ND<1 | ND<1 | ND<1 | ND<4 | ND<1 | ND<1 | ND<1 | ND<10 | ND<1 |
| 256 E. COMM. ST. | 12/21/2001 | ND<5 | ND<5 | ND<5 | ND<5 | ND<20 | ND<5 | ND<5 | NA | ND<100 | ND<5 |
| | 01/04/2002 | ND<5 | ND<5 | ND<5 | ND<5 | ND<20 | ND<5 | ND<5 | NA | ND<100 | ND<5 |
| | 01/16/2002 | ND<1 | ND<1 | ND<1 | ND<1 | ND<4 | 2 J | ND<1 | NA | ND<10 | ND<1 |
| | 02/11/2002 | ND<1 | ND<1 | ND<1 | ND<1 | ND<4 | 2 J | ND<1 | NA | ND<10 | ND<1 |
| | 03/11/2002 | ND<1 | ND<1 | ND<1 | ND<1 | ND<4 | 2 J | ND<1 | ND<1 | ND<10 | ND<1 |
| | 03/26/2002 | ND<1 | ND<1 | ND<1 | ND<1 | ND<4 | 3 J | ND<1 | ND<1 | ND<10 | ND<1 |
| | 04/08/2002 | ND<1 | ND<1 | ND<1 | ND<1 | ND<4 | 2 J | ND<1 | ND<1 | ND<10 | ND<1 |
| | 04/29/2002 | ND<0.5 | ND<0.7 | ND<0.8 | ND<0.8 | ND<2.8 | 3 J | ND<1 | ND<1 | ND<10 | ND<0.8 |
| | 05/20/2002 | ND<0.5 | ND<0.7 | ND<0.8 | ND<0.8 | ND<2.8 | 3 J | ND<1 | ND<1 | ND<10 | ND<0.8 |
| | 05/29/2002 | ND<0.5 | ND<0.7 | ND<0.8 | ND<0.8 | ND<2.8 | 3 J | ND<1 | ND<1 | ND<10 | ND<0.8 |
| | 06/10/2002 | ND<0.5 | ND<0.7 | ND<0.8 | ND<0.8 | ND<2.8 | 3 J | ND<1 | ND<1 | ND<10 | ND<0.8 |
| | 06/24/2002 | ND<0.5 | ND<0.7 | ND<0.8 | ND<0.8 | ND<2.8 | 3 J | ND<1 | ND<1 | ND<10 | ND<0.8 |
| | 07/18/2002 | ND<0.5 | ND<0.7 | ND<0.8 | ND<0.8 | ND<2.8 | 3 J | ND<1 | ND<1 | ND<10 | ND<0.8 |
| | 07/29/2002 | ND<0.5 | ND<0.7 | ND<0.8 | ND<0.8 | ND<2.8 | 2 J | ND<1 | ND<1 | ND<10. | ND<0.8 |
| | 08/07/2002 | ND<0.5 | ND<0.7 | ND<0.8 | ND<0.8 | ND<2.8 | 2 J | ND<1 | ND<1 | ND<10 | ND<0.8 |
| | 08/26/2002 | ND<0.5 | ND<0.7 | ND<0.8 | ND<0.8 | ND<2.8 | 2 J | ND<1 | ND<1 | ND<10 | ND<0.8 |
| | 09/09/2002 | ND<0.5 | ND<0.7 | ND<0.8 | ND<0.8 | ND<2.8 | 3 J | ND<1 | ND<1 | ND<10 | ND<0.8 |
| | 09/25/2002 | ND<0.5 | ND<0.7 | ND<0.8 | ND<0.8 | ND<2.8 | 2 J | ND<1 | ND<1 | ND<10 | ND<0.8 |
| | 10/14/2002 | ND<0.5 | ND<0.7 | ND<0.8 | ND<0.8 | ND<2.8 | 2 | ND<1 | | ND<10 | ND<0.8 |
| | 10/28/2002 | ND<1 | ND<1 | ND<1 | ND<1 | ND<4 | ND<0.5 | ND<1 | ND<1 | ND<10 | ND<1 |
| | 11/04/2002 | ND<1 | ND<1 | ND<1 | ND<1 | ND<4 | 3 | ND<1 | ND<1 | ND<10 | ND<1 |
| | 11/20/2002 | ND<1 | ND<1 | ND<1 | ND<1 | ND<4 | 3 | ND<1 | ND<1 | ND<10 | ND<1 |
| | 12/04/2002 | ND<1 | ND<1 | ND<1 | ND<1 | ND<4 | 2 | ND<1 | ND<1 | ND<10 | ND<1 |
| | 12/16/2002 | ND<5 | ND<5 | ND<5 | ND<5 | ND<20 | <5 | ND<5 | ND<5 | ND<100 | ND<5 |
| | 03/19/2003 | ND<1 | ND<1 | ND<1 | ND<1 | ND<4 | 2 | ND<1 | ND<1 | ND<10 | ND<1 |

FIGURE 4F (TABLE 1)

| Monitoring Well | Date | Benzene (µg/L) | Toluene (µg/L) | Ethylbenzene (µg/L) | Total Xylenes (µg/L) | Total BTEX (µg/L) | MTBE (µg/L) | Isopropyl Benzene (µg/L) | Naphthalene (µg/L) | tert-Butyl Alcohol (µg/L) | tert-amyl methyl ether (µg/L) |
|---|---|---|---|---|---|---|---|---|---|---|---|
| DERBCAP Distance to POE or POC | | 29 | 7,300 | 3,700 | 73,000 | NA | 180 | 3,700 | 15,000 | NA | NA |
| 256 E. COMM. ST. | 05/29/2003 | ND<1 | ND<1 | ND<1 | ND<1 | ND<4 | 2 | ND<1 | ND<1 | ND<10 | ND<1 |
| Con't | 12/08/2003 | ND<1 | ND<1 | ND<1 | ND<1 | ND<4 | 2 | ND<1 | ND<1 | ND<10 | ND<1 |

< = Indicates that the concentration of the compound is below the laboratory's limit of quatitation
µg/L = Micrograms/liter
BTEX = Benzene, toluene, ethylbenzene, xylenes
J = Estimated Concentration
MTBE = Methyl tertiary butyl ether
NA = Not Analyzed
ND = Not Detected

FIGURE 5A (TABLE 2)

| Monitoring Well | Date | Top of Casing (ft) POE or POC | Depth to Water (ft) | GW Elevation (ft) | Benzene (µg/L) | Toluene (µg/L) | Ethylbenzene (µg/L) | Total Xylenes (µg/L) | Total BTEX (µg/L) | MTBE (µg/L) | Isopropyl Benzene (µg/L) | Naphthalene (µg/L) | tert-Butyl Alcohol (µg/L) | tert-amyl methyl ether (µg/L) |
|---|---|---|---|---|---|---|---|---|---|---|---|---|---|---|
| DERBCAP Distance to POE or POC | | | | | 29 | 7,300 | 3,700 | 73,000 | NA | 180 | 3,700 | 15,000 | NA | NA |
| AS-1 | 01/26/2002 | 98.04 | 11.81 | 86.23 | NS | NS | NS | NS | NS | NS | NS | NS | NS | NS |
| AS-2 | 01/26/2002 | 98.36 | 12.18 | 86.18 | NS | NS | NS | NS | NS | NS | NS | NS | NS | NS |
| AS-3 | 01/26/2002 | 98.39 | 12.25 | 86.14 | NS | NS | NS | NS | NS | NS | NS | NS | NS | NS |
| AS-4 | 01/26/2002 | 97.97 | 11.9 | 86.07 | NS | NS | NS | NS | NS | NS | NS | NS | NS | NS |
| AS-5 | 01/26/2002 | 98.51 | 12.37 | 86.14 | NS | NS | NS | NS | NS | NS | NS | NS | NS | NS |
| AS-13 | 06/28/2002 | 60.03 | 12.24 | 47.79 | ND<0.5 | ND<0.7 | ND<0.8 | ND<0.8 | ND<2.8 | 11 | ND<1 | ND<1 | ND<10 | 4 J |
|  | 12/18/2002 | 60.03 | 8.00 | 52.03 | ND<5 | ND<5 | ND<5 | ND<5 | ND<20 | 5 | ND<5 | ND<5 | ND<100 | <5 |
|  | 03/17/2003 | 60.03 | 5.57 | 54.46 | ND<1 | ND<1 | ND<1 | ND<1 | ND<4 | 3 | ND<1 | ND<1 | ND<10 | ND<1 |
| AS-14 | 06/27/2002 | 59.40 | 13.05 | 46.35 | 0.6 J | 2 J | ND<0.8 | 3 J | 5.6 | 9 | ND<1 | ND<1 | ND<10 | 2 J |
|  | 09/25/2002 | 59.40 | 12.01 | 47.39 | ND<0.5 | ND<0.8 | ND<0.8 | ND<0.8 | ND<2.8 | 0.9 | ND<5 | ND<1 | ND<10 | ND<0.8 |
|  | 12/18/2002 | 59.40 | 8.49 | 50.91 | ND<5 | ND<5 | ND<5 | ND<5 | ND<20 | 6 | ND<5 | ND<5 | ND<100 | ND<5 |
|  | 03/17/2003 | 59.40 | 5.37 | 54.03 | ND<1 | ND<1 | ND<1 | ND<1 | ND<4 | ND<1 | ND<1 | ND<1 | ND<10 | ND<1 |
|  | 06/17/2003 | 59.40 | 5.87 | 53.53 | ND<1 | ND<1 | ND<1 | ND<1 | ND<4 | ND<1 | ND<1 | ND<1 | ND<10 | ND<1 |
|  | 08/18/2003 | 59.40 | 7.33 | 52.07 | ND<1 | ND<1 | ND<1 | ND<1 | ND<4 | ND<1 | ND<1 | ND<1 | ND<10 | ND<1 |
|  | 12/08/2003 | 59.40 | 7.56 | 51.84 | ND<1 | ND<1 | ND<1 | ND<1 | ND<4 | ND<1 | ND<1 | ND<1 | ND<10 | ND<1 |
| AS-15 | 06/28/2002 | 60.01 | 12.04 | 47.97 | ND<0.5 | ND<0.7 | ND<0.8 | ND<0.8 | ND<2.8 | 6 | ND<1 | ND<1 | ND<10 | 2 J |
|  | 12/18/2002 | 60.01 | 9.14 | 50.87 | ND<5 | ND<5 | ND<5 | ND<5 | ND<20 | ND<5 | ND<5 | ND<5 | ND<100 | ND<5 |
|  | 03/17/2003 | 60.01 | 6.10 | 53.91 | ND<1 | ND<1 | ND<1 | ND<1 | ND<4 | ND<1 | ND<1 | ND<1 | ND<10 | ND<1 |
| AS-16 | 06/28/2002 | 61.59 | 13.68 | 47.91 | ND<0.5 | ND<0.7 | ND<0.8 | ND<0.8 | ND<2.8 | 11 | ND<1 | ND<1 | ND<10 | ND<0.8 |
|  | 09/25/2002 | 61.59 | 13.68 | 47.91 | ND<0.5 | ND<0.7 | ND<0.8 | ND<0.8 | ND<2.8 | ND<0.5 | ND<1 | ND<1 | ND<10 | ND<0.8 |
|  | 12/18/2002 | 61.59 | 10.16 | 51.43 | ND<5 | ND<5 | ND<5 | ND<5 | ND<20 | ND<5 | ND<5 | ND<5 | ND<100 | ND<5 |
|  | 03/17/2003 | 61.59 | 6.72 | 54.87 | ND<1 | ND<1 | ND<1 | ND<1 | ND<4 | ND<1 | ND<1 | ND<1 | ND<10 | ND<1 |
| INJ-1B | 07/29/2002 | 60.84 | 11.78 | 49.06 | ND<0.5 | ND<0.7 | ND<0.8 | ND<0.8 | ND<2.8 | 2 J | ND<1 | ND<1 | ND<10 | ND<0.8 |
| INJ-2B | 07/29/2002 | 61.07 | 12.02 | 49.05 | ND<0.5 | ND<0.7 | ND<0.8 | ND<0.8 | ND<2.8 | ND<0.5 | ND<1 | ND<1 | ND<10 | ND<0.8 |
| INJ-3B | 07/29/2002 | 61.10 | 7.95 | 53.15 | ND<0.5 | ND<0.7 | ND<0.8 | ND<0.8 | ND<2.8 | ND<0.5 | ND<1 | ND<1 | ND<10 | ND<0.8 |
| INJ-4B | 07/29/2002 | 61.56 | 12.55 | 49.01 | ND<0.5 | ND<0.7 | ND<0.8 | ND<0.8 | ND<2.8 | ND<0.5 | ND<1 | ND<1 | ND<10 | ND<0.8 |
| INJ-5B | 07/29/2002 | 61.07 | 12.02 | 49.05 | ND<0.5 | ND<0.7 | ND<0.8 | ND<0.8 | ND<2.8 | ND<0.5 | ND<1 | ND<1 | ND<10 | ND<0.8 |
| INJ-6B | 07/29/2002 | 60.94 | 11.92 | 49.02 | ND<0.5 | ND<0.7 | ND<0.8 | ND<0.8 | ND<2.8 | ND<0.5 | ND<1 | ND<1 | ND<10 | ND<0.8 |
| INJ-7B | 07/24/2002 | 62.18 | 14.34 | 47.84 | ND<0.5 | ND<0.7 | ND<0.8 | ND<0.8 | ND<2.8 | ND<0.5 | ND<1 | ND<1 | ND<10. | ND<0.8 |
| INJ-8B | 07/24/2002 | 61.55 | 12.93 | 48.62 | ND<0.5 | ND<0.7 | ND<0.8 | ND<0.8 | ND<2.8 | 0.7 J | ND<1 | ND<1 | ND<10. | ND<0.8 |
| INJ-9B | 07/24/2002 | 60.11 | 11.46 | 48.65 | ND<0.5 | ND<0.7 | ND<0.8 | ND<0.8 | ND<2.8 | ND<0.5 | ND<1 | ND<1. | ND<10. | ND<0.8 |
| INJ-10B | 07/24/2002 | 59.96 | 11.65 | 48.31 | ND<0.5 | ND<0.7 | ND<0.8 | ND<0.8 | ND<2.8 | ND<0.5 | ND<1 | ND<1. | ND<10. | ND<0.8 |

FIGURE 5B (TABLE 2)

| Monitoring Well | Date | Top of Casing (ft) | Depth to Water (ft) | GW Elevation (ft) | Benzene (µg/L) | Toluene (µg/L) | Ethylbenzene (µg/L) | Total Xylenes (µg/L) | Total BTEX (µg/L) | MTBE (µg/L) | Isopropyl Benzene (µg/L) | Naphthalene (µg/L) | tert-Butyl Alcohol (µg/L) | tert-amyl methyl ether (µg/L) |
|---|---|---|---|---|---|---|---|---|---|---|---|---|---|---|
| DERBCAP | Distance to POE or POC | | | | 29 | 7,300 | 3,700 | 73,000 | NA | 180 | 3,700 | 15,000 | NA | NA |
| MW-1 | 01/10/2002 | 98.35 | 12.12 | 86.23 | NS | NS | NS | NS | NS | NS | NS | NS | NS | NS |
|  | 06/27/2002 | 98.35 | 11.87 | 86.48 | 2,900 | 7,400 | 1,800 | 9,100 | 21,200 | 5,700 | 74 | 630 | 3,500 | 1,000 |
|  | 09/25/2002 | 61.04 | 10.31 | 50.73 | 2,100 | 11,000 | 2,200 | 11,000 | 26,300 | 3,700 | 71 | 560 | 27,000 | 920 |
|  | 12/17/2002 | 61.04 | 7.50 | 53.54 | ND<25 | ND<25 | ND<25 | <25 | ND<100 | 13,000 | ND<5 | ND<5 | 6,200 | <25 |
|  | 02/12/2003 | 61.04 | 10.54 | 50.50 | ND<1 | ND<1 | ND<1 | ND<1 | ND<4 | 5 | - | - | ND<10 | ND<1 |
|  | 03/17/2003 | 61.04 | 5.48 | 55.56 | ND<1 | ND<1 | ND<1 | ND<1 | ND<4 | 8 | ND<1 | ND<1 | ND<10 | ND<1 |
|  | 06/17/2003 | 61.04 | 5.74 | 55.30 | 9 | 64 | 77 | 2 | 2 | 26 | ND<1 | ND<1 | 33 | 2 |
|  | 08/18/2003 | 61.04 | 7.08 | 53.96 | 9 | 64 | 77 | 460 | 610 | 150 | 17 | 83 | 130 | 4 |
|  | 12/08/2003 | 61.04 | 7.51 | 53.53 | 4 | 1 | 27 | 12 | 44 | 210 | 10 | 80 | 340 | 4 |
| MW-2 | 01/10/2002 | 94.79 | 8.51 | 86.28 | ND<1 | ND<0.7 | ND<1 | ND<1 | ND<4 | ND<1 | ND<1 | ND<1 | NS<10 | ND<1 |
|  | 06/26/2002 | 94.79 | 8.25 | 86.54 | ND<0.5 | ND<0.7 | ND<0.8 | ND<0.8 | ND<2.8 | 1.1 | ND<1 | ND<1 | ND<10 | ND<0.8 |
|  | 09/24/2002 | 57.79 | 9.18 | 48.61 | ND<0.5 | ND<0.7 | ND<0.8 | ND<0.8 | ND<2.8 | ND<0.5 | ND<1 | ND<1 | ND<10 | ND<0.8 |
|  | 12/18/2002 | 57.79 | 5.79 | 52.00 | ND<5 | ND<5 | ND<5 | ND<5 | ND<20 | ND<5 | ND<5 | ND<5 | ND<100 | ND<5 |
|  | 03/17/2003 | 57.79 | 2.44 | 55.35 | ND<1 | ND<1 | ND<1 | ND<1 | ND<4 | ND<1 | ND<1 | ND<1 | ND<10 | ND<1 |
|  | 06/17/2003 | 57.79 | 2.85 | 54.94 | - | - | - | - | - | - | - | - | - | - |
| MW-3 | 01/10/2002 | 98.36 | 12.51 | 85.85 | ND<1 | ND<1 | ND<1 | ND<1 | ND<4 | 64 | ND<1 | ND<1 | 40J | 6 |
|  | 02/11/2002 | 98.36 | 12.17 | 86.19 | ND<1 | ND<1 | ND<1 | ND<1 | ND<4 | 260 | ND<1 | NA | 62J | 7 |
|  | 03/11/2002 | 98.36 | 12.84 | 85.52 | ND<1 | ND<1 | ND<1 | ND<1 | ND<4 | 440 | ND<1 | ND<1 | 30J | 10 |
|  | 04/29/2002 | 98.36 | 12.46 | 85.90 | ND<0.5 | ND<0.7 | ND<0.8 | ND<0.8 | ND<2.8 | 160 | ND<1 | ND<1 | 34J | 3J |
|  | 06/25/2002 | 98.36 | 12.14 | 86.22 | ND<0.5 | ND<0.7 | ND<0.8 | ND<0.8 | ND<2.8 | 12 | ND<1 | ND<1 | ND<10 | ND<0.8 |
|  | 10/03/2002 | 62.14 | 12.71 | 49.43 | ND<0.5 | ND<0.7 | ND<0.8 | ND<0.8 | ND<2.8 | ND<0.5 | ND<1 | ND<5 | ND<100 | ND<5 |
|  | 12/16/2002 | 62.14 | 9.57 | 52.57 | ND<5 | ND<5 | ND<5 | ND<5 | ND<20 | <5 | ND<5 | ND<5 | ND<10 | ND<5 |
|  | 03/18/2003 | 62.14 | 6.3 | 55.84 | ND<1 | ND<1 | ND<1 | ND<1 | ND<4 | ND<1 | ND<1 | ND<1 | ND<10 | ND<1 |
| MW-4 | 01/10/2002 | 98.67 | 12.64 | 86.03 | 3J | ND | 5 | ND | 8 | 5J | ND | 5 | ND | ND |
|  | 06/26/2002 | 98.67 | 12.33 | 86.34 | ND<0.5 | ND<0.7 | ND<0.8 | ND<0.8 | ND<2.8 | 17 | ND<1 | ND<1 | ND<10 | 0.9J |
|  | 09/24/2002 | 61.70 | 13.33 | 48.37 | ND<0.5 | ND<0.7 | ND<0.8 | ND<0.8 | ND<2.8 | 12 | ND<1 | ND<1 | ND<10 | - |
|  | 12/18/2002 | 61.7 | 9.92 | 51.78 | ND<5 | ND<5 | ND<5 | ND<5 | ND<20 | 7 | ND<5 | ND<5 | ND<100 | ND<5 |
|  | 03/17/2003 | 61.7 | 6.36 | 55.34 | 1 | ND<1 | ND<1 | ND<1 | 1 | 8 | ND<1 | 2 | ND<10 | ND<1 |
|  | 06/17/2003 | 61.7 | 6.50 | 55.20 | - | - | - | - | - | - | - | - | - | - |
| MW-5A | 01/10/2002 | 96.38 | 8.21 | 88.17 | ND<1 | 24 | ND<0.8 | ND<0.8 | 24 | ND<1 | ND<1 | ND<1 | ND<10 | ND<1 |
|  | 06/25/2002 | 96.38 | 5.22 | 91.16 | ND<0.5 | 140 | ND<0.8 | ND<0.8 | 140.0 | ND<0.5 | ND<1 | ND<1 | ND<10 | ND<0.8 |
|  | 09/23/2002 | 59.37 | 3.66 | 55.71 | ND<0.5 | 39 | ND<0.8 | ND<0.8 | 39.0 | ND<0.5 | ND<1 | ND<1 | ND<10 | ND<0.8 |
|  | 12/17/2002 | 59.37 | 3.87 | 55.50 | ND<5 | 30 | ND<5 | ND<5 | 30 | ND<5 | ND<5 | ND<5 | ND<100 | ND<5 |
|  | 03/17/2003 | 59.37 | 2.64 | 56.73 | ND<1 | 8 | ND<1 | ND<1 | 8 | ND<1 | ND<1 | ND<1 | ND<10 | ND<1 |
|  | 06/17/2003 | 59.37 | 3.13 | 56.24 | - | - | - | - | - | - | - | - | - | - |
| MW-5B | 01/10/2002 | 96.38 | 10.71 | 85.67 | ND<1 | ND<1 | ND<1 | ND<0.8 | ND<4 | ND<1 | ND<1 | ND<1 | ND<10 | ND<1 |
|  | 06/25/2002 | 96.38 | 10.36 | 86.02 | ND<0.5 | ND<0.7 | ND<0.8 | ND<0.8 | ND<2.8 | 2J | ND<1 | ND<1 | ND<10 | ND<0.8 |
|  | 09/23/2002 | 59.86 | 11.44 | 48.42 | ND<0.5 | ND<0.7 | ND<0.8 | ND<0.8 | ND<2.8 | ND<0.5 | ND<1 | ND<1 | ND<10 | ND<0.8 |
|  | 12/17/2002 | 59.86 | 7.88 | 51.98 | ND<5 | ND<5 | ND<5 | ND<5 | ND<20 | ND<5 | ND<5 | ND<5 | ND<100 | ND<5 |
|  | 03/17/2003 | 59.86 | 4.52 | 55.34 | ND<1 | ND<1 | ND<1 | ND<1 | ND<4 | ND<1 | ND<1 | ND<1 | ND<10 | ND<1 |
| MW-5C | 01/10/2002 | 96.48 | 10.48 | 86.00 | ND<1 | ND<1 | ND<1 | ND<0.8 | ND<4 | ND<1 | ND<1 | ND<1 | ND<10 | ND<1 |
|  | 06/25/2002 | 96.48 | 9.96 | 86.52 | ND<0.5 | 120 | ND<0.8 | ND<0.8 | 120.0 | ND<0.5 | ND<1 | ND<1 | ND<10 | ND<0.8 |
|  | 09/23/2002 | 59.46 | 10.54 | 48.92 | ND<0.5 | 6 | ND<0.8 | ND<0.8 | 6.0 | 2J | ND<1 | ND<1 | ND<10 | ND<0.8 |
|  | 12/17/2002 | 59.46 | 7.59 | 51.87 | ND<5 | <5 | ND<5 | ND<5 | ND<20 | ND<5 | ND<5 | ND<5 | ND<100 | ND<5 |
|  | 03/17/2003 | 59.46 | 5.31 | 54.15 | ND<1 | 2 | ND<1 | ND<1 | 2 | ND<1 | ND<1 | ND<1 | ND<10 | ND<1 |

FIGURE 5C (TABLE 2)

| Monitoring Well | Date | Top of Casing (ft) | Depth to Water (ft) | GW Elevation (ft) | Benzene (µg/L) | Toluene (µg/L) | Ethylbenzene (µg/L) | Total Xylenes (µg/L) | Total BTEX (µg/L) | MTBE (µg/L) | Isopropyl Benzene (µg/L) | Naphthalene (µg/L) | tert-Butyl Alcohol (µg/L) | tert-amyl methyl ether (µg/L) |
|---|---|---|---|---|---|---|---|---|---|---|---|---|---|---|
| DERBCAP | Distance to POE or POC | | | | 29 | 7,300 | 3,700 | 73,000 | NA | 180 | 3,700 | 15,000 | NA | NA |
| MW-6 | 01/10/2002 | 98.93 | 12.57 | 86.36 | ND<1 | ND<1 | 6 | 9 | 15 | 34 | ND<1 | ND<1 | ND<10 | 8 |
| | 06/27/2002 | 98.93 | 12.27 | 86.66 | 15 | 38 | 6 | 28 | 87 | 10 | ND<1 | 2 J | ND<10 | 4 J |
| | 09/23/2002 | 62.02 | 13.21 | 48.81 | 0.9 J | ND<0.7 | 31 | 8 | 39.9 | 89 | 4 J | 6 | ND<10 | 27 |
| | 12/17/2002 | 62.02 | 9.92 | 52.10 | ND<5 | ND<5 | ND<5 | ND<5 | ND<20 | <5 | ND<5 | ND<5 | ND<100 | ND<5 |
| | 03/17/2003 | 62.02 | 6.21 | 55.81 | ND<1 | ND<1 | ND<1 | ND<1 | ND<4 | ND<1 | ND<1 | ND<1 | ND<10 | ND<1 |
| | 06/17/2003 | 62.02 | 6.51 | 55.51 | ND<1 | ND<1 | ND<1 | ND<1 | ND<4 | ND<1 | ND<1 | ND<1 | ND<10 | ND<1 |
| | 08/18/2003 | 62.02 | 7.78 | 54.24 | ND<1 | ND<1 | ND<1 | ND<1 | ND<4 | ND<1 | ND<1 | ND<1 | ND<10 | ND<1 |
| | 12/08/2003 | 62.02 | 8.31 | 53.71 | ND<1 | ND<1 | ND<1 | ND<1 | ND<4 | ND<1 | ND<1 | ND<1 | ND<10 | ND<1 |
| MW-7 | 01/10/2002 | 96.82 | 10.5 | 86.32 | ND<1 | ND<1 | ND<0.8 | ND<1 | ND<4 | 3 J | ND<1 | ND<1 | ND<10 | ND<1 |
| | 06/25/2002 | 96.82 | 10.22 | 86.60 | ND<0.5 | ND<0.7 | ND<0.8 | ND<0.8 | ND<2.8 | ND<0.5 | ND<1 | ND<1 | ND<10 | ND<0.8 |
| | 09/23/2002 | 60.86 | 12.10 | 48.76 | ND<0.5 | ND<0.7 | ND<0.8 | ND<0.8 | ND<2.8 | ND<0.5 | ND<1 | ND<1 | ND<10 | ND<0.8 |
| | 12/18/2002 | 60.86 | 8.68 | 52.18 | ND<5 | ND<5 | ND<5 | ND<5 | ND<20 | <5 | ND<5 | ND<5 | ND<100 | ND<5 |
| | 03/17/2003 | 60.86 | 5.35 | 55.51 | ND<1 | ND<1 | ND<1 | ND<1 | ND<4 | 17 | ND<1 | ND<1 | ND<10 | ND<1 |
| | 06/17/2003 | 60.86 | 5.98 | 54.88 | . | . | . | . | . | . | . | . | . | . |
| MW-9A | 01/10/2002 | 99.53 | 13 | 86.53 | ND<1 | ND<1 | ND<0.8 | ND<1 | ND<4 | ND<1 | ND<1 | ND<1 | ND<10 | ND<1 |
| | 06/26/2002 | 99.53 | 12.74 | 86.79 | ND<0.5 | ND<0.7 | ND<0.8 | ND<0.8 | ND<2.8 | 3 J | ND<1 | ND<1 | ND<10 | 0.9 J |
| | 09/25/2002 | 62.45 | 13.67 | 48.78 | . | . | . | . | . | . | . | . | . | . |
| | 12/19/2002 | 62.45 | 10.30 | 52.15 | ND<5 | ND<5 | ND<5 | ND<5 | ND<20 | <5 | ND<5 | ND<5 | ND<100 | ND<5 |
| | 03/18/2003 | 62.45 | 6.60 | 55.85 | ND<1 | ND<1 | ND<1 | ND<1 | ND<4 | 17 | ND<1 | ND<1 | ND<10 | ND<1 |
| | 06/17/2003 | 62.45 | 6.76 | 55.69 | . | . | . | . | . | . | . | . | . | . |
| MW-9B | 01/10/2002 | 99.6 | 13.12 | 86.48 | ND<1 | ND<1 | ND<0.8 | ND<1 | ND<4 | ND<0.5 | ND<1 | ND<1 | ND<10 | ND<1 |
| | 06/26/2002 | 99.6 | 12.82 | 86.78 | ND<0.5 | ND<0.7 | ND<0.8 | ND<0.8 | ND<2.8 | ND<0.5 | ND<1 | ND<1 | ND<10 | ND<0.8 |
| | 09/25/2002 | 62.45 | 13.75 | 48.70 | ND<0.5 | ND<0.7 | ND<0.8 | ND<0.8 | ND<2.8 | ND<0.5 | ND<1 | . | ND<10 | ND<0.8 |
| | 12/19/2002 | 62.45 | 10.38 | 52.07 | ND<5 | ND<5 | ND<5 | ND<5 | ND<20 | ND<5 | <5 | ND<5 | ND<100 | ND<5 |
| | 03/18/2003 | 62.45 | 6.67 | 55.78 | ND<1 | ND<1 | ND<1 | ND<1 | ND<4 | ND<1 | ND<1 | ND<1 | ND<10 | ND<1 |
| | 06/17/2003 | 62.45 | 6.82 | 55.63 | . | . | . | . | . | . | . | . | . | . |
| MW-9C | 01/10/2002 | 99.4 | 12.92 | 86.48 | ND<1 | ND<1 | ND<0.8 | ND<1 | ND<4 | 3 J | ND<1 | ND<1 | ND<10 | 1 J |
| | 06/26/2002 | 99.4 | 12.98 | 86.42 | ND<0.5 | ND<0.7 | ND<0.8 | ND<0.8 | ND<2.8 | 0.7 J | ND<1 | ND<1 | ND<10 | ND<0.8 |
| | 09/25/2002 | 62.44 | 13.51 | 48.93 | ND<0.5 | ND<0.7 | ND<0.8 | ND<0.8 | ND<2.8 | ND<0.5 | ND<1 | ND<1 | ND<10 | ND<0.8 |
| | 12/19/2002 | 62.44 | 10.17 | 52.27 | ND<5 | ND<5 | ND<5 | ND<5 | ND<20 | ND<5 | ND<5 | ND<5 | ND<100 | ND<5 |
| | 03/18/2003 | 62.44 | 6.58 | 55.86 | ND<1 | ND<1 | ND<1 | ND<1 | ND<4 | ND<1 | ND<1 | ND<1 | ND<10 | ND<1 |
| | 06/17/2003 | 62.44 | 6.88 | 55.56 | . | . | . | . | . | . | . | . | . | . |
| MW-10A | 01/10/2002 | 94.66 | 9.26 | 85.40 | ND<1 | 2 J | ND<0.8 | ND<0.8 | 2 | 5 J | ND<1 | ND<1 | ND<10 | ND<1 |
| | 06/25/2002 | 94.66 | 8.87 | 85.79 | ND<0.5 | ND<0.7 | ND<0.8 | ND<0.8 | ND<2.8 | 9 | ND<1 | ND<1 | ND<10 | 3 J |
| | 09/23/2002 | 57.62 | 9.91 | 47.71 | ND<0.5 | ND<0.7 | ND<0.8 | ND<0.8 | ND<2.8 | 14 | ND<1 | ND<1 | ND<10 | 6 |
| | 12/17/2002 | 57.62 | 6.21 | 51.41 | ND<5 | ND<5 | ND<5 | ND<5 | ND<20 | ND<0.5 | <5 | ND<5 | ND<100 | ND<5 |
| | 03/18/2003 | 57.62 | 2.76 | 54.86 | ND<1 | ND<1 | ND<1 | ND<1 | ND<4 | ND<1 | ND<1 | ND<1 | ND<10 | ND<1 |
| | 06/17/2003 | 57.62 | 3.75 | 53.87 | . | . | . | . | . | . | . | . | . | . |
| MW-10B | 01/10/2002 | 94.66 | 9.25 | 85.41 | ND<1 | ND<1 | ND<0.8 | ND<1 | ND<4 | ND<1 | ND<1 | ND<1 | ND<10 | ND<1 |
| | 06/25/2002 | 94.66 | 8.86 | 85.80 | ND<0.5 | ND<0.7 | ND<0.8 | ND<0.8 | ND<2.8 | 1 J | ND<1 | ND<1 | ND<10 | ND<0.8 |
| | 09/23/2002 | 57.66 | 9.92 | 47.74 | ND<0.5 | ND<0.7 | ND<0.8 | ND<0.8 | ND<2.8 | 0.6 J | ND<1 | ND<1 | ND<10 | ND<0.8 |
| | 12/17/2002 | 57.66 | 6.12 | 51.54 | ND<5 | ND<5 | ND<5 | ND<5 | ND<20 | ND<5 | ND<5 | ND<5 | ND<100 | ND<5 |
| | 03/18/2003 | 57.66 | 3.09 | 54.57 | ND<1 | ND<1 | ND<1 | ND<1 | ND<4 | ND<1 | ND<1 | ND<1 | ND<10 | ND<1 |
| | 06/17/2003 | 57.66 | 3.34 | 54.32 | . | . | . | . | . | . | . | . | . | . |

FIGURE 5D (TABLE 2)

| Monitoring Well | Date | Top of Casing (ft) | Depth to Water (ft) | GW Elevation (ft) | Benzene (µg/L) | Toluene (µg/L) | Ethylbenzene (µg/L) | Total Xylenes (µg/L) | Total BTEX (µg/L) | MTBE (µg/L) | Isopropyl Benzene (µg/L) | Naphthalene (µg/L) | tert-Butyl Alcohol (µg/L) | tert-amyl methyl ether (µg/L) |
|---|---|---|---|---|---|---|---|---|---|---|---|---|---|---|
| DERBCAP | Distance to POE or POC | | | | 29 | 7,300 | 3,700 | 73,000 | NA | 180 | 3,700 | 15,000 | NA | NA |
| MW-10C | 01/10/2002 | 94.64 | 10.01 | 84.63 | ND<1 | 4 J | ND<1 | ND<1 | 4 | 4 J | ND<1 | ND<1 | ND<10 | ND<1 |
| | 06/25/2002 | 94.64 | NM | . | ND<0.5 | ND<0.7 | ND<0.8 | ND<0.8 | ND<2.8 | ND<0.5 | ND<1 | ND<1 | ND<10 | ND<0.8 |
| | 09/23/2002 | 57.66 | 10.34 | 47.32 | ND<0.5 | ND<0.7 | ND<0.8 | ND<0.8 | ND<2.8 | ND<0.5 | ND<1 | ND<1 | ND<10 | ND<0.8 |
| | 12/17/2002 | 57.66 | 7.18 | 50.48 | ND<5 | ND<5 | ND<5 | ND<5 | ND<20 | ND<5 | ND<5 | ND<5 | ND<100 | ND<5 |
| | 03/18/2003 | 57.66 | 3.94 | 53.72 | ND<1 | ND<1 | ND<1 | ND<1 | ND<4 | ND<1 | ND<1 | ND<1 | ND<10 | ND<1 |
| | 06/17/2003 | 57.66 | 3.26 | 54.40 | . | . | . | . | . | . | . | . | . | . |
| MW-11 | 01/10/2002 | 93.5 | 7.88 | 85.62 | ND<1 | ND<1 | ND<1 | ND<1 | ND<4 | ND<1 | ND<1 | ND<1 | ND<10 | ND<1 |
| | 06/26/2002 | 93.5 | 7.57 | 85.93 | ND<0.5 | ND<0.7 | ND<0.8 | ND<0.8 | ND<2.8 | ND<0.5 | ND<1 | ND<1 | ND<10 | ND<0.8 |
| | 09/24/2002 | 56.54 | 8.51 | 48.03 | ND<0.5 | ND<0.7 | ND<0.8 | ND<0.8 | ND<2.8 | ND<0.5 | ND<1 | ND<1 | ND<10 | ND<0.8 |
| | 11/20/2002 | 56.54 | 4.57 | 51.97 | ND<5 | ND<5 | ND<5 | ND<5 | ND<20 | ND<5 | ND<5 | ND<5 | ND<100 | ND<5 |
| | 12/19/2002 | 56.54 | 2.18 | 54.36 | ND<1 | ND<1 | ND<1 | ND<1 | ND<4 | ND<1 | ND<1 | ND<1 | ND<10 | ND<1 |
| | 06/17/2003 | 56.54 | 2.34 | 54.20 | . | . | . | . | . | . | . | . | . | . |
| MW-12 | 01/10/2002 | 99.69 | 15.25 | 84.44 | ND<1 | ND<1 | ND<1 | ND<1 | ND<4 | ND<1 | ND<1 | ND<1 | ND<10 | ND<1 |
| | 06/28/2002 | 99.69 | 14.64 | 85.05 | ND<0.5 | ND<0.7 | ND<0.8 | ND<0.8 | ND<2.8 | ND<0.5 | ND<1 | ND<1 | ND<10 | ND<0.8 |
| | 09/24/2002 | 62.59 | 15.75 | 46.84 | ND<0.5 | ND<0.7 | ND<0.8 | ND<0.8 | ND<2.8 | ND<0.5 | ND<1 | ND<1 | ND<10 | ND<0.8 |
| | 11/20/2002 | 62.59 | 13.12 | 49.47 | ND<5 | ND<5 | ND<5 | ND<5 | ND<20 | ND<5 | ND<5 | ND<5 | ND<100 | ND<5 |
| | 12/19/2002 | 62.59 | 11.90 | 50.69 | ND<5 | ND<5 | ND<5 | ND<5 | ND<20 | ND<5 | ND<5 | ND<5 | ND<100 | ND<5 |
| | 03/18/2003 | 62.59 | 8.69 | 53.90 | ND<1 | ND<1 | ND<1 | ND<1 | ND<4 | ND<1 | ND<1 | ND<1 | ND<10 | ND<1 |
| | 06/17/2003 | 62.59 | 9.26 | 53.33 | . | . | . | . | . | . | . | . | . | . |
| MW-13A | 01/10/2002 | 98.8 | 14.59 | 84.21 | 21 | 6 | 1 J | 6 | 15 | 210 | ND<1 | ND<1 | ND<10 | 100 |
| | 06/27/2002 | 98.8 | 14.05 | 84.75 | 2 J | 6 | 1 J | ND<1 | 15 | 2 J | ND<1 | ND<1 | ND<10 | 1 J |
| | 09/24/2002 | 61.88 | DRY | . | NS | NS | NS | NS | NS | NS | NS | NS | NS | NS |
| | 11/20/2002 | 61.88 | 12.41 | 49.47 | ND<1 | ND<1 | ND<1 | ND<1 | ND<4 | ND<1 | ND<1 | ND<1 | ND<10 | ND<1 |
| | 12/19/2002 | 61.88 | 11.36 | 50.52 | ND<5 | ND<5 | ND<5 | ND<5 | ND<20 | <5 | ND<5 | ND<5 | ND<100 | ND<5 |
| | 03/18/2003 | 61.88 | 8.28 | 53.60 | ND<1 | ND<1 | ND<1 | ND<1 | ND<4 | ND<1 | ND<1 | ND<1 | ND<10 | ND<1 |
| | 06/17/2003 | 61.88 | 8.79 | 53.09 | . | . | . | . | . | . | . | . | . | . |
| MW-13B | 01/10/2002 | 98.89 | 14.68 | 84.21 | 21 | ND<1 | ND<1 | ND<1 | 21 | 800 | ND<1 | ND<1 | 20 J | 410 |
| | 06/27/2002 | 98.89 | 14.14 | 84.75 | 40 | 5 | 1 J | 5 | 51 | 520 | ND<1 | 1 J | ND<10 | 290 |
| | 09/24/2002 | 61.99 | 15.20 | 46.79 | 40 | ND<0.7 | ND<0.8 | ND<0.8 | 40.0 | 530 | ND<1 | ND<1 | ND<10 | 300 |
| | 11/20/2002 | 61.99 | 12.48 | 49.51 | 9 | ND<1 | ND<1 | ND<1 | 9 | 280 | ND<1 | ND<1 | ND<10 | 180 |
| | 12/19/2002 | 61.99 | 11.47 | 50.52 | <5 | ND<5 | ND<5 | ND<5 | ND<20 | 370 | ND<5 | ND<5 | ND<100 | 200 |
| | 02/12/2003 | 61.99 | 11.24 | 50.75 | ND<1 | ND<1 | ND<1 | ND<1 | ND<4 | 140 | ND<1 | . | ND<10 | 62 |
| | 03/18/2003 | 61.99 | 8.43 | 53.56 | 1 | ND<1 | ND<1 | ND<1 | 1 | 140 | ND<1 | ND<1 | ND<10 | 62 |
| | 06/17/2003 | 61.99 | 8.90 | 53.09 | ND<1 | ND<1 | ND<1 | ND<1 | ND<4 | 190 | ND<1 | ND<1 | 21 | 63 |
| | 08/18/2003 | 61.99 | 10.47 | 51.52 | ND<1 | ND<1 | ND<1 | ND<1 | ND<4 | 77 | ND<1 | 2 | ND<10 | 98 |
| | 12/08/2003 | 61.99 | 10.80 | 51.19 | ND<1 | ND<1 | ND<1 | ND<1 | ND<4 | 3 | ND<1 | ND<1 | ND<10 | 24 |
| MW-13C | 01/10/2002 | 99.06 | 14.82 | 84.24 | 1 J | ND<1 | ND<1 | ND<1 | 1 | 290 | ND<1 | ND<1 | ND<10 | 170 |
| | 06/27/2002 | 99.06 | 14.29 | 84.77 | 2 J | 4 J | 0.9 J | 5 J | 11.9 | 220 | ND<1 | ND<1 | 10 J | 92 |
| | 09/24/2002 | 62.11 | 15.25 | 46.86 | 0.5 | ND<0.7 | ND<0.8 | ND<0.8 | 0.5 | 150 | ND<1 | ND<1 | ND<10 | 70 |
| | 11/20/2002 | 62.11 | 12.64 | 49.47 | ND<1 | ND<1 | ND<1 | ND<1 | ND<4 | 150 | ND<1 | ND<1 | ND<10 | 64 |
| | 12/19/2002 | 62.11 | 11.45 | 50.66 | ND<5 | ND<5 | ND<5 | ND<5 | ND<20 | 150 | ND<5 | ND<5 | ND<100 | 62 |
| | 02/12/2003 | 62.11 | 11.25 | 50.86 | ND<1 | ND<1 | ND<1 | ND<1 | ND<4 | 7 | . | . | ND<10 | 2 |
| | 03/18/2003 | 62.11 | 8.51 | 53.60 | ND<1 | ND<1 | ND<1 | ND<1 | ND<4 | 1 | ND<1 | ND<1 | ND<10 | ND<1 |
| | 06/17/2003 | 62.11 | 9.10 | 53.01 | . | . | . | . | . | . | . | . | . | . |

FIGURE 5E (TABLE 2)

| Monitoring Well | Date | Top of Casing (ft) POE or POC | Depth to Water (ft) | GW Elevation (ft) | Benzene (μg/L) | Toluene (μg/L) | Ethylbenzene (μg/L) | Total Xylenes (μg/L) | Total BTEX (μg/L) | MTBE (μg/L) | Isopropyl Benzene (μg/L) | Naphthalene (μg/L) | tert-Butyl Alcohol (μg/L) | tert-amyl methyl ether (μg/L) |
|---|---|---|---|---|---|---|---|---|---|---|---|---|---|---|
| DERBCAP Distance to POE or POC | | | | | 29 | 7,300 | 3,700 | 73,000 | NA | 180 | 3,700 | 15,000 | NA | NA |
| MW-16 | 01/10/2002 | 92.46 | 7.51 | 84.95 | ND<1 | ND<1 | ND<0.8 | ND<1 | ND<4 | 11 | ND<1 | ND<1 | ND<10 | ND<1 |
|  | 06/26/2002 | 92.46 | 7.07 | 85.39 | ND<0.5 | ND<0.7 | ND<0.8 | ND<0.8 | ND<2.8 | 3J | ND<1 | ND<1 | ND<10 | 0.9J |
|  | 09/24/2002 | 54.92 | 8.20 | 46.72 | ND<0.5 | ND<0.7 | ND<0.8 | ND<0.8 | ND<2.8 | 4 | ND<1 | ND<1 | ND<10 | - |
|  | 12/18/2002 | 54.92 | 4.55 | 50.37 | ND<5 | ND<5 | ND<5 | ND<5 | ND<20 | <5 | ND<5 | ND<5 | ND<100 | ND<5 |
|  | 03/18/2003 | 54.92 | 2.65 | 52.27 | ND<1 | ND<1 | ND<1 | ND<1 | ND<4 | 1 | ND<1 | ND<1 | ND<10 | ND<1 |
|  | 06/17/2003 | 54.92 | 2.98 | 51.94 | - | - | - | - | - | - | - | - | - | - |
| RW-1 | 01/10/2002 | 99.19 | 13.21 | 85.98 | 180 | 31 | 82 | 12 | 277 | 1,600 | 11 | 58 | 420 | 810 |
|  | 06/27/2002 | 99.19 | 12.9 | 86.29 | 140 | 56 | 36 | 190 | 422 | 1,500 | 9 | 56 | 790 | 750 |
|  | 09/24/2002 | 61.20 | 11.56 | 49.64 | 14 | 3 | 5 | 8 | 30 | 180 | 1 | 4 | 670 | 44 |
|  | 11/12/2002 | 61.20 | NM | - | ND<0.5 | ND<0.7 | ND<0.8 | ND<0.8 | ND<2.8 | 13 | ND<1 | ND<5 | ND<10 | ND<0.8 |
|  | 12/18/2002 | 61.20 | 8.78 | 52.42 | ND<5 | ND<5 | ND<5 | ND<5 | ND<20 | ND<5 | ND<5 | ND<5 | ND<100 | ND<5 |
|  | 03/17/2003 | 61.20 | 5.89 | 55.31 | ND<1 | ND<1 | ND<1 | ND<1 | ND<4 | ND<1 | ND<1 | ND<1 | ND<10 | ND<1 |
|  | 04/29/2003 | 61.20 | - | - | - | - | - | - | - | - | - | - | - | - |
|  | 06/17/2003 | 61.20 | 6.08 | 55.12 | ND<1 | - | ND<1 | ND<1 | ND<4 | - | ND<1 | - | ND<10 | ND<1 |
|  | 08/18/2003 | 61.20 | 7.47 | 53.73 | ND<1 | ND<1 | ND<1 | ND<1 | ND<4 | ND<1 | ND<1 | ND<1 | ND<10 | ND<1 |
|  | 12/08/2003 | 61.20 | 7.78 | 53.42 | ND<1 | ND<1 | ND<1 | ND<1 | ND<4 | ND<1 | ND<1 | ND<1 | ND<10 | ND<1 |
| SVE-1 | 01/26/2002 | 98.62 | 12.42 | 86.20 | NS | NS | NS | NS | NS | NS | NS | NS | NS | NS |
|  | 06/27/2002 | 98.62 | 12.12 | 86.50 | 84 | 250 | 150 | 740 | 1,224 | 1,500 | 14 | 70 | 95J | 200 |
|  | 09/24/2002 | 61.38 | 11.58 | 49.80 | 220 | 2,000 | 530 | 2,900 | 5,650 | 9,800 | 16 | 170 | 2,400 | 650 |
|  | 12/18/2002 | 61.38 | 9.21 | 52.17 | <5 | 7 | <5 | 39 | 46 | 1,100 | ND<5 | <5 | 1,400 | 41 |
|  | 02/12/2003 | 61.38 | 11.92 | 49.46 | ND<1 | ND<1 | ND<1 | ND<1 | ND<4 | 39 | - | - | 170 | 1 |
|  | 03/17/2003 | 61.38 | 5.88 | 55.50 | ND<1 | ND<1 | ND<1 | ND<1 | ND<4 | 45 | ND<1 | ND<1 | ND<10 | ND<1 |
| SVE-2 | 01/26/2002 | 98.15 | 12.05 | 86.10 | NS | NS | NS | NS | NS | NS | NS | NS | NS | NS |
|  | 06/26/2002 | 98.15 | 11.34 | 86.81 | 0.9J | ND<0.7 | ND<0.8 | ND<0.8 | 0.9 | 300 | ND<1 | ND<1 | 22J | 24 |
|  | 09/24/2002 | 60.59 | 10.73 | 49.86 | ND<0.5 | ND<0.7 | ND<0.8 | ND<0.8 | ND<2.8 | 6 | ND<1 | ND<1 | 19 | ND<0.8 |
|  | 12/17/2002 | 60.59 | 8.53 | 52.06 | ND<5 | ND<5 | ND<5 | ND<5 | ND<20 | ND<5 | ND<5 | ND<5 | ND<100 | ND<5 |
|  | 03/17/2003 | 60.59 | 5.19 | 55.40 | ND<1 | ND<1 | ND<1 | ND<1 | ND<4 | ND<1 | ND<1 | ND<1 | ND<10 | ND<1 |
| SVE-3 | 06/26/2002 | 60.90 | 11.93 | 48.97 | 73 | 150 | 190 | 1,400 | 1,813 | 990 | 10 | 92 | 300 | 300 |
|  | 12/18/2002 | 60.90 | 8.57 | 52.33 | ND<5 | ND<5 | ND<5 | ND<5 | ND<20 | 24 | ND<5 | ND<5 | <100 | <5 |
|  | 02/12/2003 | 60.90 | 9.94 | 50.96 | ND<1 | ND<1 | ND<1 | ND<1 | ND<4 | 60 | - | - | ND<10 | 4 |
|  | 03/17/2003 | 60.90 | 5.49 | 55.41 | ND<1 | ND<1 | ND<1 | ND<1 | ND<4 | 5 | ND<1 | ND<1 | ND<10 | ND<1 |
| SVE-4 | 06/27/2002 | 61.28 | 12.54 | 48.74 | 5J | 14 | 2J | 12 | 33 | 25 | ND<1 | 1J | ND<10 | 7 |
|  | 09/24/2002 | 61.28 | 11.34 | 49.94 | ND<0.5 | ND<0.7 | ND<0.8 | ND<0.8 | ND<2.8 | 9 | ND<1 | ND<5 | ND<10 | 1 |
|  | 12/18/2002 | 61.28 | 8.49 | 52.79 | ND<5 | ND<5 | ND<5 | ND<5 | ND<20 | <5 | ND<5 | ND<5 | ND<100 | ND<5 |
|  | 03/17/2003 | 61.28 | 5.99 | 55.29 | ND<1 | ND<1 | ND<1 | ND<1 | ND<4 | 4 | ND<1 | ND<1 | ND<10 | ND<1 |
| SVE-5 | 06/26/2002 | 61.83 | 12.51 | 49.32 | 26 | 14 | 11 | 120 | 171 | 950 | 10 | 3J | 260 | 170 |
|  | 09/24/2002 | 61.83 | 12.86 | 48.97 | 32 | 270 | 490 | 1,800 | 2,592 | 7,000 | 30 | 130 | 7,500 | 520 |
|  | 12/18/2002 | 61.83 | 9.09 | 52.74 | ND<5 | <5 | <5 | 250 | 250 | 17 | ND<5 | <5 | ND<100 | ND<5 |
|  | 02/12/2003 | 61.83 | 10.34 | 51.49 | ND<1 | ND<1 | ND<1 | ND<1 | ND<4 | 6 | - | - | ND<10 | ND<1 |
|  | 03/17/2003 | 61.83 | 6.24 | 55.59 | ND<1 | ND<1 | ND<1 | ND<1 | ND<4 | 24 | ND<1 | ND<1 | ND<10 | ND<1 |

FIGURE 5F (TABLE 2)

| Monitoring Well | Date | Top of Casing (ft) | Depth to Water (ft) | GW Elevation (ft) | Benzene (µg/L) | Toluene (µg/L) | Ethylbenzene (µg/L) | Total Xylenes (µg/L) | Total BTEX (µg/L) | MTBE (µg/L) | Isopropyl Benzene (µg/L) | Naphthalene (µg/L) | tert-Butyl Alcohol (µg/L) | tert-amyl methyl ether (µg/L) |
|---|---|---|---|---|---|---|---|---|---|---|---|---|---|---|
| DERBCAP Distance to POE or POC | | | | | 29 | 7,300 | 3,700 | 73,000 | NA | 180 | 3,700 | 15,000 | NA | NA |
| SVE-6 | 12/18/2002 | 59.86 | 7.49 | 52.37 | <5 | ND<5 | ND<5 | ND<5 | ND<20 | 920 | ND<5 | ND<5 | <100 | ND<5 |
| | 02/12/2003 | 59.86 | 10.54 | 49.32 | ND<1 | ND<1 | ND<1 | ND<1 | ND<4 | 18 | - | - | ND<10 | ND<1 |
| | 03/17/2003 | 59.86 | 4.42 | 55.44 | ND<1 | ND<1 | ND<1 | ND<1 | ND<4 | 260 | ND<1 | ND<1 | ND<10 | ND<1 |

< = Indicates that the concentration of the compound is below the laboratory's limit of quatitation
µg/L = Micrograms/liter
BTEX = Benzene, toluene, ethylbenzene, xylenes
DRY = No water for sampling
J = Estimated Concentration
MTBE = Methyl tertiary butyl ether
NA = Not Analyzed
ND = Not Detected
NM = Not Measured
NS = Not Sampled

Figure 6
Dissolved BTEX Comparison
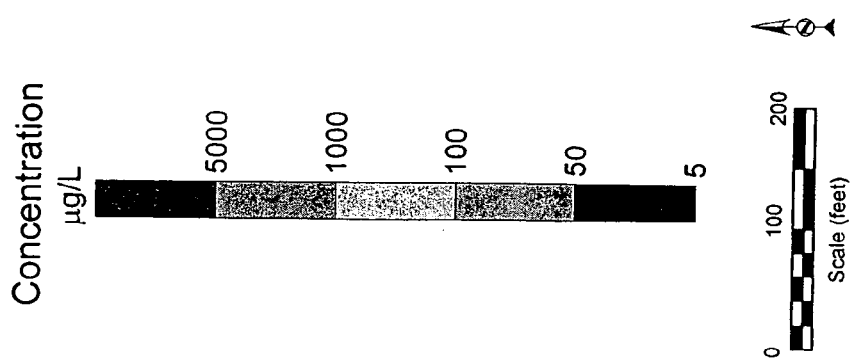
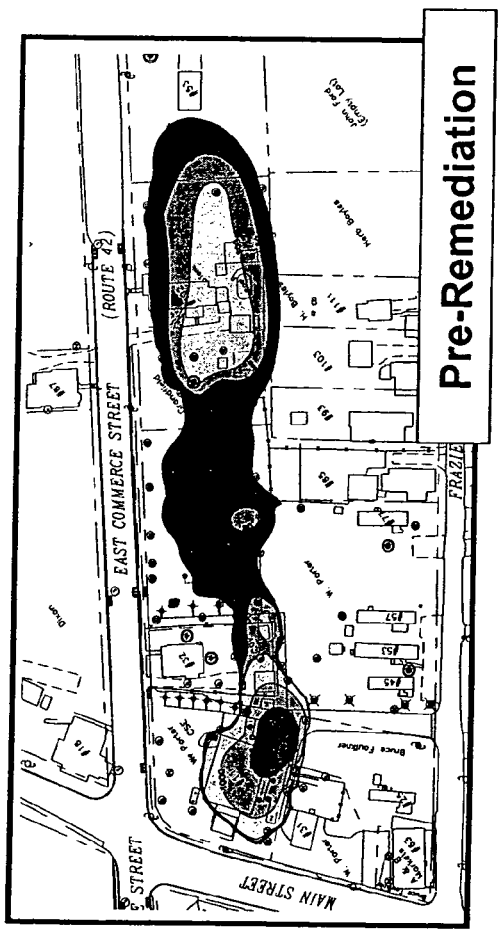
Pre-Remediation
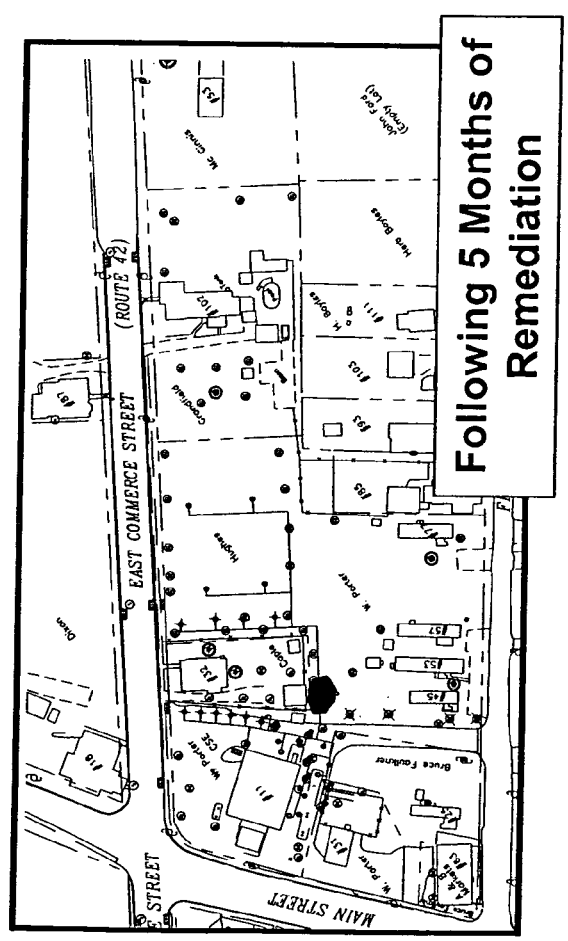
Following 5 Months of Remediation

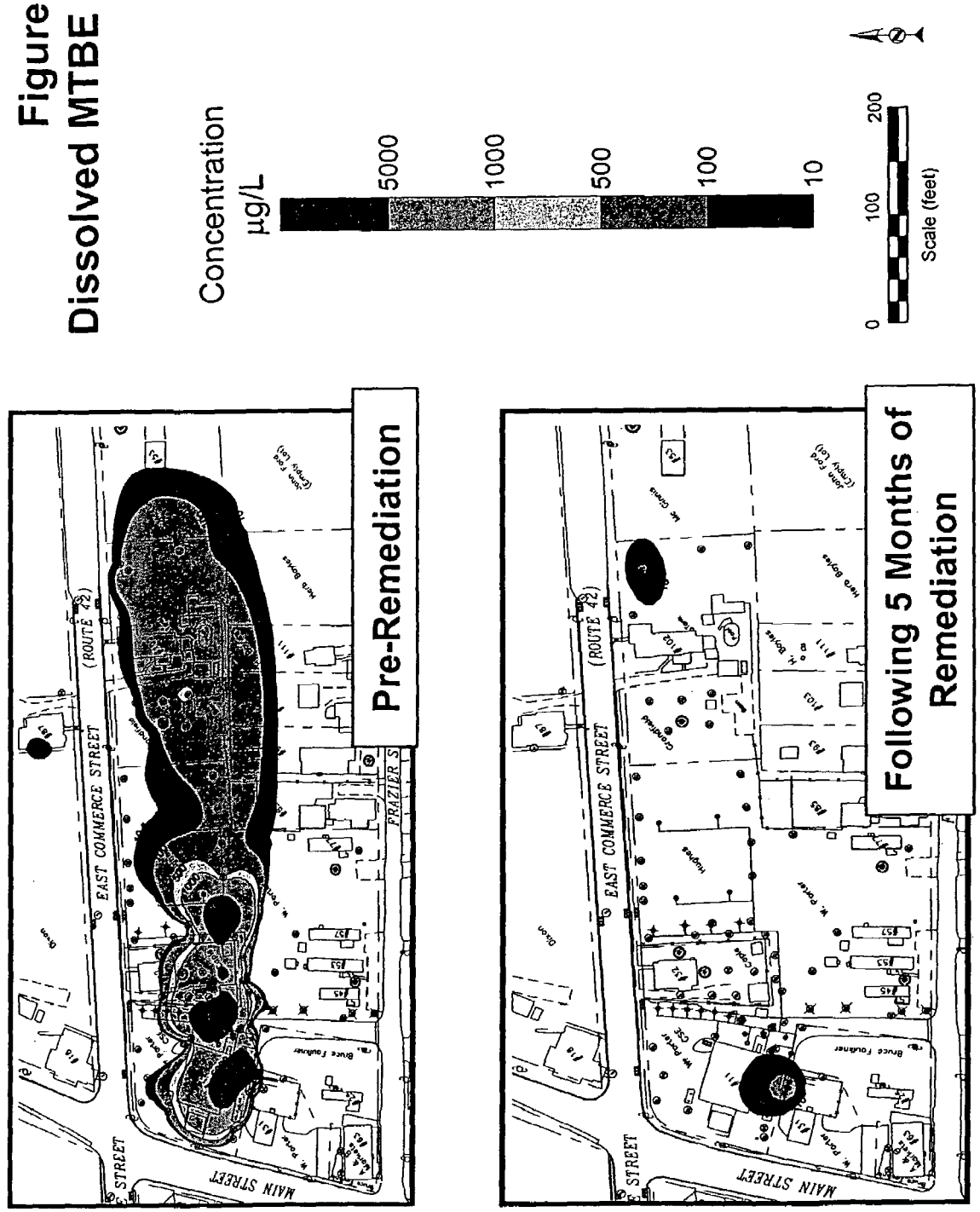

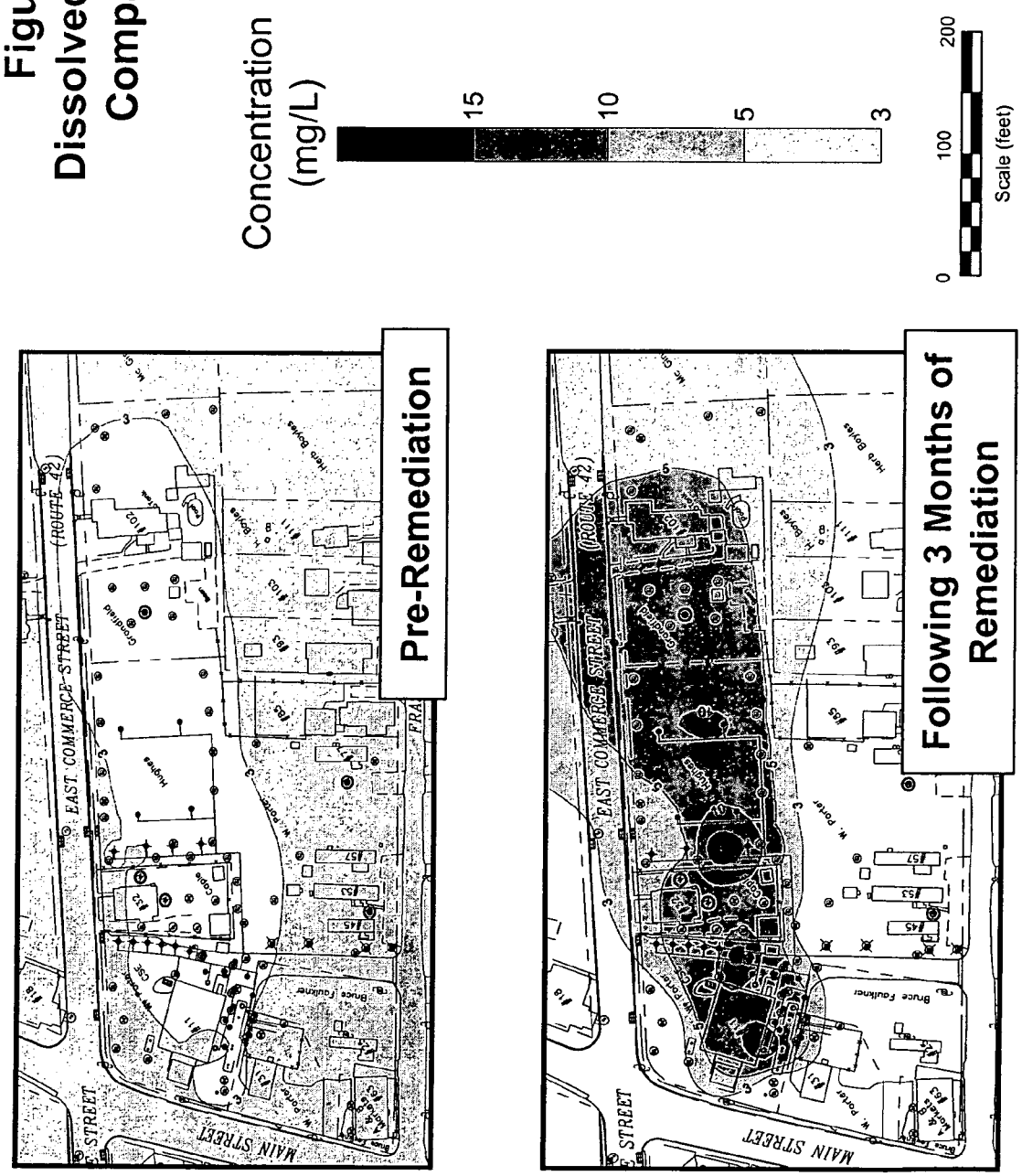

Groundwater Elevation and Concentrations vs. Time in MW-6

Groundwater Elevation and Concentrations vs. Time in RW-1

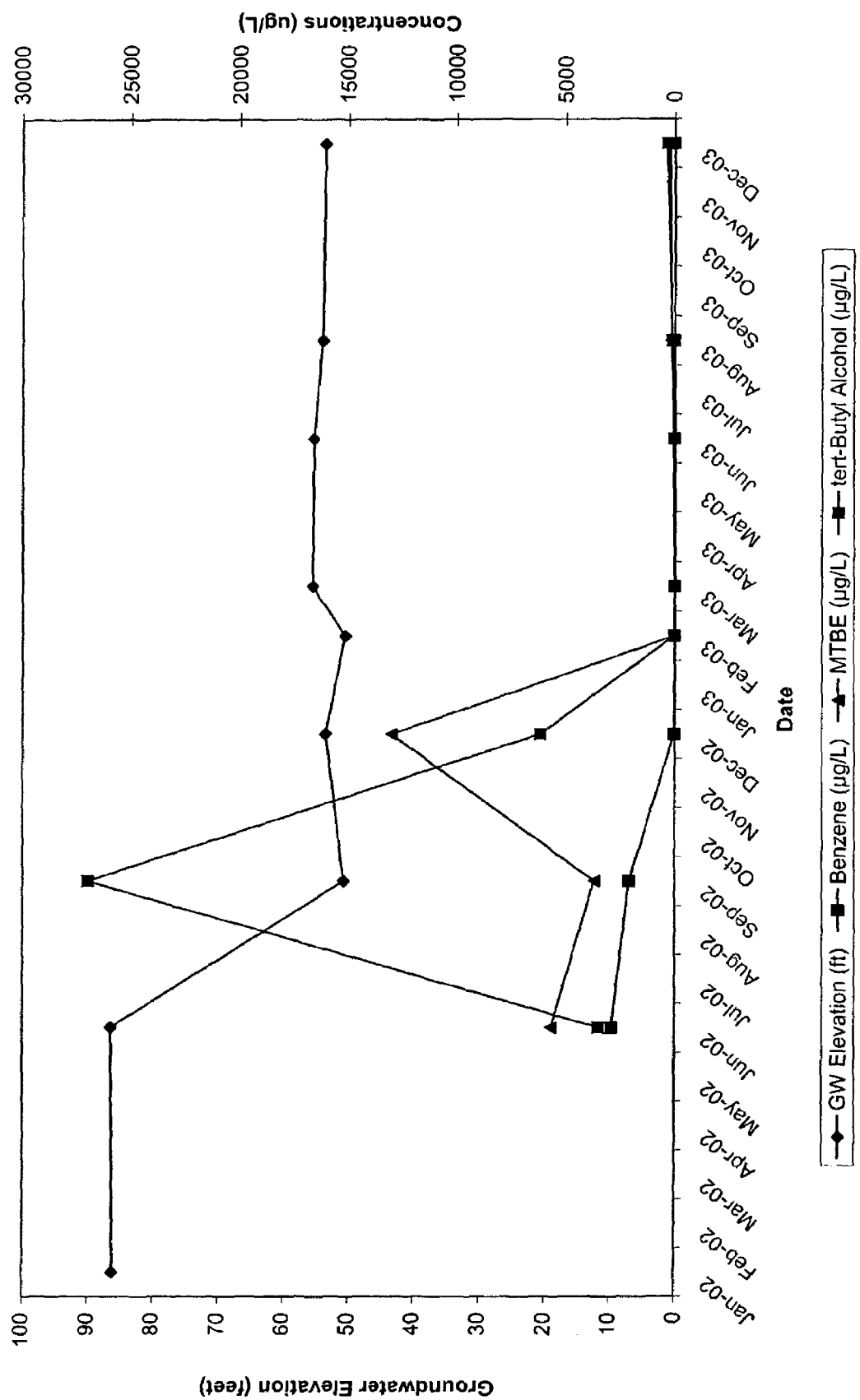

Groundwater Elevation and Concentrations vs. Time in MW-13B

Groundwater Elevation and Concentrations vs. Time in AS-14

FIGURE 10A (TABLE 3)
DISSOLVED OXYGEN RESPONSE IN GROUNDWATER

| Well I.D. | Date | pH | Temperature (Celcius) | Dissolved Oxygen (mg/L) |
|---|---|---|---|---|
| INJ-1 | 4-Oct-02 | 2.3 | 22.3 | 15.59 |
| | 19-Dec-02 | NM | NM | 19.60 |
| INJ-2 | 3-Oct-02 | 5.3 | 22.19 | 2.75 |
| | 19-Dec-02 | NM | NM | 6.78 |
| INJ-3 | 3-Oct-02 | NM | NM | 1.53 |
| | 19-Dec-02 | NM | NM | 7.26 |
| INJ-4 | 3-Oct-02 | 5.29 | 20.56 | 0.44 |
| | 19-Dec-02 | NM | NM | 6.01 |
| INJ-5 | 3-Oct-02 | 5.6 | 19.86 | 2.76 |
| | 19-Dec-02 | NM | NM | 5.68 |
| INJ-6 | 3-Oct-02 | 5.82 | 19.65 | 4.05 |
| INJ-7 | 4-Oct-02 | 5.78 | 20.52 | 6.14 |
| | 19-Dec-02 | NM | NM | 14.78 |
| INJ-8 | 4-Oct-02 | 4.85 | 18.83 | 6.44 |
| | 19-Dec-02 | NM | NM | 19.99 |
| INJ-9 | 4-Oct-02 | 4.85 | 20.39 | 3.17 |
| | 19-Dec-02 | NM | NM | 3.77 |
| INJ-10 | 3-Oct-02 | 6.42 | 20.35 | 2.60 |
| | 4-Oct-02 | 3.66 | 19.27 | 4.38 |
| AS-13 | 28-Jun-02 | 5.75 | 15.8 | 3.30 |
| | 8-Oct-02 | 5.47 | 17.01 | 0.30 |
| | 14-Oct-02 | 5.74 | 17.76 | 0.42 |
| | 30-Oct-02 | 3.45 | 16.73 | 4.49 |
| | 19-Dec-02 | 2.72 | 15.6 | 0.00 |
| | 18-Mar-03 | 2.18 | 14.43 | 0.00 |
| AS-14 | 27-Jun-02 | 5.41 | 16.2 | 3.80 |
| | 8-Oct-02 | 5.86 | 17.49 | 0.52 |
| | 14-Oct-02 | 6.76 | 16.41 | 0.65 |
| | 30-Oct-02 | 3.56 | 15.22 | 5.22 |
| | 19-Dec-02 | 3.9 | 14.4 | 9.78 |
| | 18-Mar-03 | 3.42 | 14.01 | 9.01 |

FIGURE 10B (TABLE 3)
DISSOLVED OXYGEN RESPONSE IN GROUNDWATER

| Well I.D. | Date | pH | Temperature (Celcius) | Dissolved Oxygen (mg/L) |
|---|---|---|---|---|
| AS-15 | 28-Jun-02 | 5.85 | 14.9 | 5.00 |
| | 8-Oct-02 | 6 | 17.37 | 0.71 |
| | 14-Oct-02 | 6.9 | 16.31 | 0.68 |
| | 30-Oct-02 | 6.96 | 13.7 | 4.34 |
| | 19-Dec-02 | 5.9 | 14.1 | 10.59 |
| | 18-Mar-03 | 5.72 | 14.18 | 3.96 |
| AS-16 | 28-Jun-02 | 6.18 | 15.5 | 3.40 |
| | 8-Oct-02 | 6.1 | 16.44 | 0.48 |
| | 14-Oct-02 | 6.21 | 17.23 | 0.39 |
| | 30-Oct-02 | 5.68 | 13.76 | 3.00 |
| | 19-Dec-02 | 5.98 | 14.9 | 9.93 |
| | 18-Mar-03 | 6.6 | 12.9 | 13.09 |
| RW-1 | 27-Jun-02 | 6.62 | 17 | 3.30 |
| | 30-Sep-02 | 6.6 | 24.8 | 1.46 |
| | 3-Oct-02 | 6.55 | 22.12 | 13.01 |
| | 4-Oct-02 | 5.68 | 20.96 | 18.50 |
| | 4-Oct-02 | 6.4 | 21.53 | 8.01 |
| | 7-Oct-02 | 6.8 | 20.5 | 7.79 |
| | 8-Oct-02 | 6.94 | 20.59 | 14.42 |
| | 14-Oct-02 | 6.84 | 19.87 | 8.60 |
| | 30-Oct-02 | 8.5 | 17.6 | 13.08 |
| | 19-Dec-02 | 6.59 | 16 | 12.98 |
| | 18-Mar-03 | 7.29 | 17.98 | 19.99 |
| MW-1 | 27-Jun-02 | 6.48 | 17.8 | 2.70 |
| | 19-Dec-02 | 7.59 | 14.9 | 5.29 |
| | 18-Mar-03 | 6.94 | 13.44 | 19.99 |
| MW-3 | 25-Jun-02 | 5.78 | 15.3 | 3.60 |
| | 3-Oct-02 | 6 | 17.48 | 2.08 |
| | 8-Oct-02 | 6.2 | 17.59 | 2.45 |
| | 14-Oct-02 | 6.31 | 16.9 | 2.34 |
| | 30-Oct-02 | 6.8 | 16.97 | 6.40 |
| | 19-Dec-02 | NM | NM | NM |
| | 18-Mar-03 | 6.1 | 11.28 | 15.07 |

FIGURE 10C (TABLE 3)
DISSOLVED OXYGEN RESPONSE IN GROUNDWATER

| Well I.D. | Date | pH | Temperature (Celcius) | Dissolved Oxygen (mg/L) |
|---|---|---|---|---|
| MW-6 | 27-Jun-02 | 6.33 | 17.5 | 2.5 |
| | 17-Dec-02 | 6.81 | 17.6 | 0 |
| | 18-Mar-03 | 6.6 | 13.4 | 12.53 |
| MW-7 | 25-Jun-02 | 6.82 | 16.2 | 4.10 |
| | 19-Dec-02 | 6.52 | 15.3 | 3.65 |
| | 18-Mar-03 | 6 | 12.1 | 12.28 |
| MW-13A | 27-Jun-02 | 6.3 | 15.1 | 7.60 |
| | 19-Dec-02 | 6.23 | 14 | 5.64 |
| | 18-Mar-03 | 5.5 | 12 | 19.99 |
| MW-13B | 27-Jun-02 | 5.95 | 15.3 | 2.90 |
| | 19-Dec-02 | 6.1 | 13.6 | 0.00 |
| | 18-Mar-03 | 4.2 | 13.8 | 19.99 |
| MW-13C | 27-Jun-02 | 5.54 | 16 | 2.90 |
| | 19-Dec-02 | 5.9 | 13 | 0.00 |
| | 18-Mar-03 | 2.9 | 12.9 | 19.99 |
| SVE-1 | 26-Jun-02 | 6.14 | 17 | 2.80 |
| | 19-Dec-02 | 6.86 | 17.8 | 0.00 |
| | 18-Mar-03 | 7.99 | 13.6 | 8.53 |
| SVE-2 | 25-Jun-02 | 6.03 | 18.3 | 2.80 |
| | 3-Oct-02 | 6.43 | 21.94 | 2.32 |
| | 7-Oct-02 | 6.33 | 23.19 | 0.71 |
| | 8-Oct-02 | 6.49 | 23.22 | 1.85 |
| | 14-Oct-02 | 6.86 | 22.86 | 3.03 |
| | 30-Oct-02 | 6.82 | 19.34 | 4.96 |
| | 19-Dec-02 | 6.56 | 14.6 | 6.61 |
| | 18-Mar-03 | 6.94 | 15.4 | 11.58 |
| SVE-3 | 25-Jun-02 | 6.09 | 17.9 | 2.90 |
| | 3-Oct-02 | 6.58 | 21.16 | 2.49 |
| | 7-Oct-02 | 6.37 | 21.73 | 0.52 |
| | 8-Oct-02 | 6.7 | 22.26 | 3.80 |
| | 14-Oct-02 | 6.94 | 21.36 | 4.06 |
| | 30-Oct-02 | 7.38 | 19.41 | 4.44 |
| | 19-Dec-02 | 6.45 | 14.9 | 6.49 |
| | 18-Mar-03 | 7.63 | 14.06 | 11.68 |

FIGURE 10D (TABLE 3)
DISSOLVED OXYGEN RESPONSE IN GROUNDWATER

| Well I.D. | Date | pH | Temperature (Celcius) | Dissolved Oxygen (mg/L) |
|---|---|---|---|---|
| SVE-4 | 27-Jun-02 | 5.88 | 17.8 | 3.60 |
|  | 3-Oct-02 | 6.16 | 22.59 | 2.51 |
|  | 7-Oct-02 | 6.07 | 22.24 | 1.40 |
|  | 8-Oct-02 | 6.18 | 20.5 | 1.15 |
|  | 14-Oct-02 | 6.35 | 19.62 | 1.64 |
|  | 30-Oct-02 | 7.63 | 18.49 | 4.66 |
|  | 19-Dec-02 | 6.46 | 13.3 | 10.42 |
|  | 18-Dec-03 | 6.59 | 16 | 12.98 |
|  | 18-Mar-03 | 7.57 | 13.21 | 6.87 |
| SVE-6 | 19-Dec-02 | 6.51 | 14.6 | 4.69 |
|  | 18-Mar-03 | 6.8 | 11.1 | 9.37 |

Notes: Chemical oxidation system was activated on October 2, 2002.
Air sparge system was activated on November 13, 2002.
NM - not measured
mg/L - milligrams per liter

FIGURE 11 (TABLE 4)

Temperature, Dissolved Oxygen, and pH Field Readings
June 26, 2003

Initial Readings (8:30)

| Well ID | Temperature °C | Dissolved Oxygen (%) | Dissolved Oxygen (mg/L) | pH (standard units) |
|---|---|---|---|---|
| MW-1 | 16 | 66 | 6.51 | 7.24 |
| MW-2 | 15.35 | 17.6 | 1.76 | 7.10 |
| MW-3 | 14.95 | 24.4 | 2.46 | 10.20 |
| MW-4 | 15.31 | 21.3 | 2.4 | 10.36 |
| MW-5 | 16.51 | 25.3 | 2.56 | 6.66 |
| MW-6 | 16.02 | 20.9 | 2.05 | 11.62 |
| MW-7 | 14.76 | 10.2 | 1.02 | 6.38 |
| MW-8 | NM | NM | NM | NM |
| MW-9 | 14.05 | 57.7 | 5.89 | 6.77 |
| MW-10 | 15.3 | 11.1 | 1.11 | 6.76 |
| MW-11 | 14.42 | 17.4 | 1.77 | 6.64 |
| MW-12 | 13.79 | 12.2 | 1.23 | 6.10 |
| RW-1 | 16.03 | 19.7 | 1.82 | 11.47 |
| RW-1A | 14.91 | 12.3 | 1.16 | 11.56 |
| RW-2 | 15.18 | 8.8 | 0.8 | 7.27 |

12:00

| Well ID | Temperature °C | Dissolved Oxygen (%) | Dissolved Oxygen (mg/L) | pH (standard units) |
|---|---|---|---|---|
| MW-1 | NM | NM | NM | NM |
| MW-2 | 15.9 | 1.5 | 0.15 | 7.12 |
| MW-3 [3] | 24.67 | 491.7 | 40.97 | 7.37 |
| MW-4 | 14.4 | 1.9 | 0.18 | 10.78 |
| MW-5 | 13.95 | 11.7 | 1.2 | 7.27 |
| MW-6 | 15.32 | 1 | 0.1 | 11.83 |
| MW-7 | NM | NM | NM | NM |
| MW-8 | NM | NM | NM | NM |
| MW-9 | NM | NM | NM | NM |
| MW-10 | NM | NM | NM | NM |
| MW-11 | NM | NM | NM | NM |
| MW-12 | NM | NM | NM | NM |
| RW-1 | 14.63 | 1.1 | 0.11 | 11.92 |
| RW-1A | NM | NM | NM | NM |
| RW-2 | NM | NM | NM | NM |

12:45

| Well ID | Temperature °C | Dissolved Oxygen (%) | Dissolved Oxygen (mg/L) | pH (standard units) |
|---|---|---|---|---|
| MW-1 | NM | NM | NM | NM |
| MW-2 | 14.76 | 1.2 | 0.12 | 7.08 |
| MW-3 | NM | NM | NM | NM |
| MW-4 | 14.31 | 1.5 | 0.15 | 10.79 |
| MW-5 | 13.87 | 11.8 | 1.22 | 7.30 |
| MW-6 | 15.19 | 0.7 | 0.07 | 11.85 |
| MW-7 | NM | NM | NM | NM |
| MW-8 | NM | NM | NM | NM |
| MW-9 | NM | NM | NM | NM |
| MW-10 | NM | NM | NM | NM |
| MW-11 | NM | NM | NM | NM |
| MW-12 | NM | NM | NM | NM |
| RW-1 [2] | 21.62 | 534.5 | 46.99 | 5.75 |
| RW-1A | NM | NM | NM | NM |
| RW-2 | 51.67 | 427.3 | 22.86 | 7.56 |

14:00

| Well ID | Temperature °C | Dissolved Oxygen (%) | Dissolved Oxygen (mg/L) | pH (standard units) |
|---|---|---|---|---|
| MW-1 | NM | NM | NM | NM |
| MW-2 | 14.62 | 1.6 | 0.16 | 7.08 |
| MW-3 | 14.4 | 0.5 | 0.05 | 10.83 |
| MW-4 | 13.82 | 14 | 1.45 | 7.33 |
| MW-5 | 18.47 | 570.9 | 53.44 | 8.65 |
| MW-6 | NM | NM | NM | NM |
| MW-7 | NM | NM | NM | NM |
| MW-8 | NM | NM | NM | NM |
| MW-9 | NM | NM | NM | NM |
| MW-10 | NM | NM | NM | NM |
| MW-11 [3] | NM | NM | NM | NM |
| MW-12 | NM | NM | NM | NM |
| RW-1 | NM | NM | NM | NM |
| RW-1A | NM | NM | NM | NM |
| RW-2 | NM | NM | NM | NM |

Notes:
NM: Not Measured
(1) Reading collected at 12:25
(2) Reading collected at 13:25
(3) Reading collected at 14:20. MW-3 was utilized as an injection well; data represents conditions in the well.

Total BTEX Reductions in MW-2 from June 2002 to January 2004

Total BTEX Reductions in MW-3 from June 2002 to January 2004

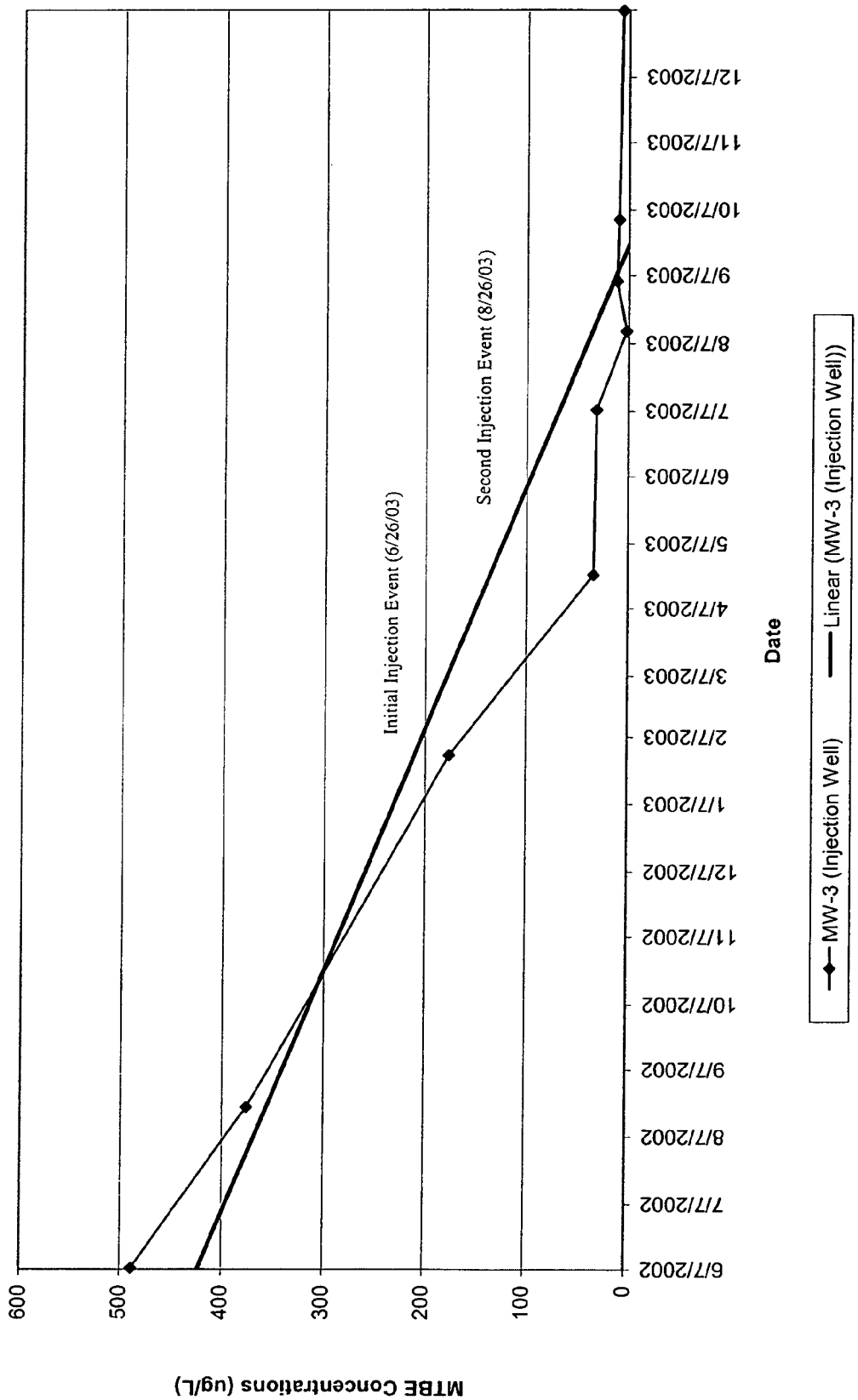

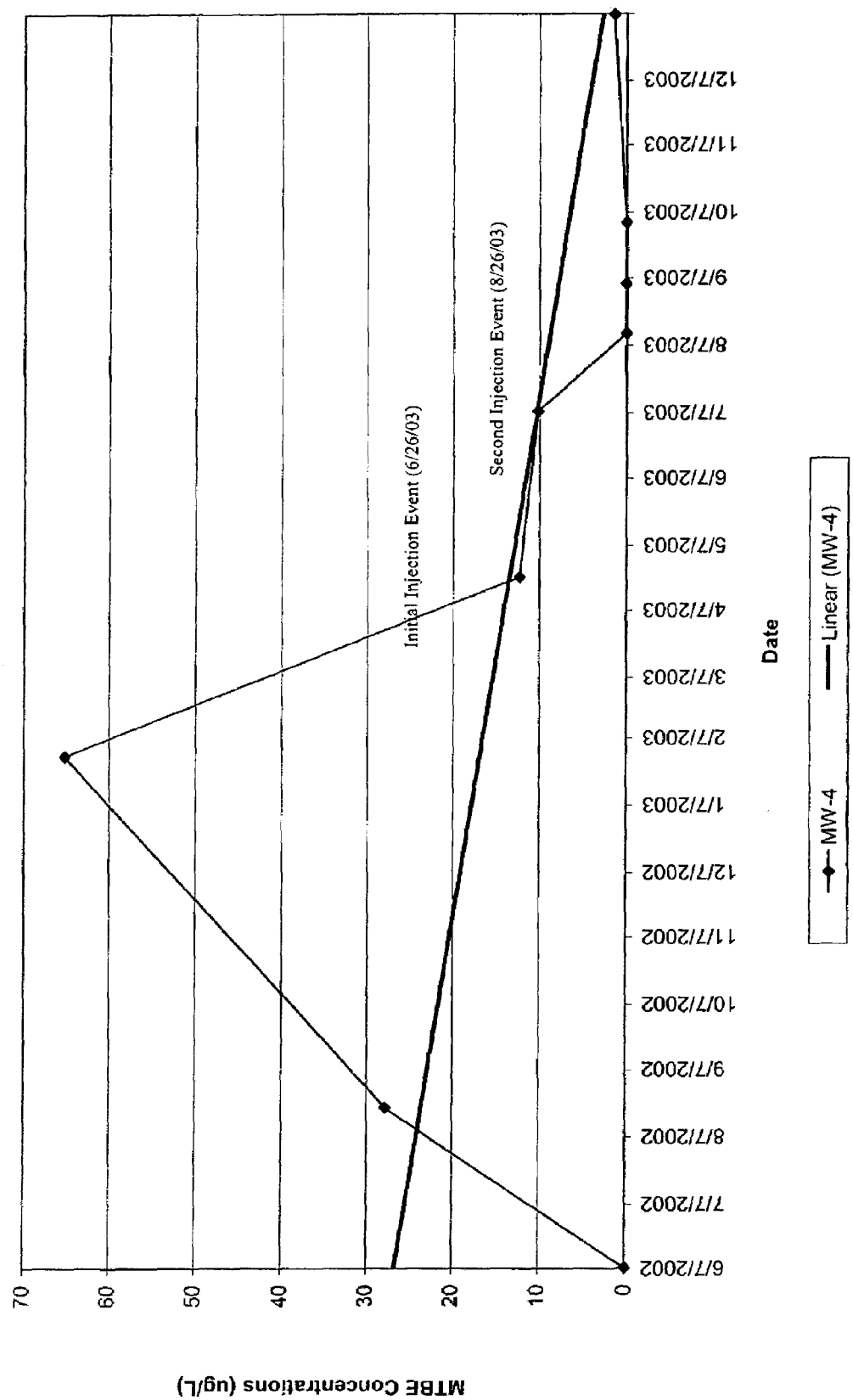

MTBE Reductions in MW-5 from June 2002 to January 2004

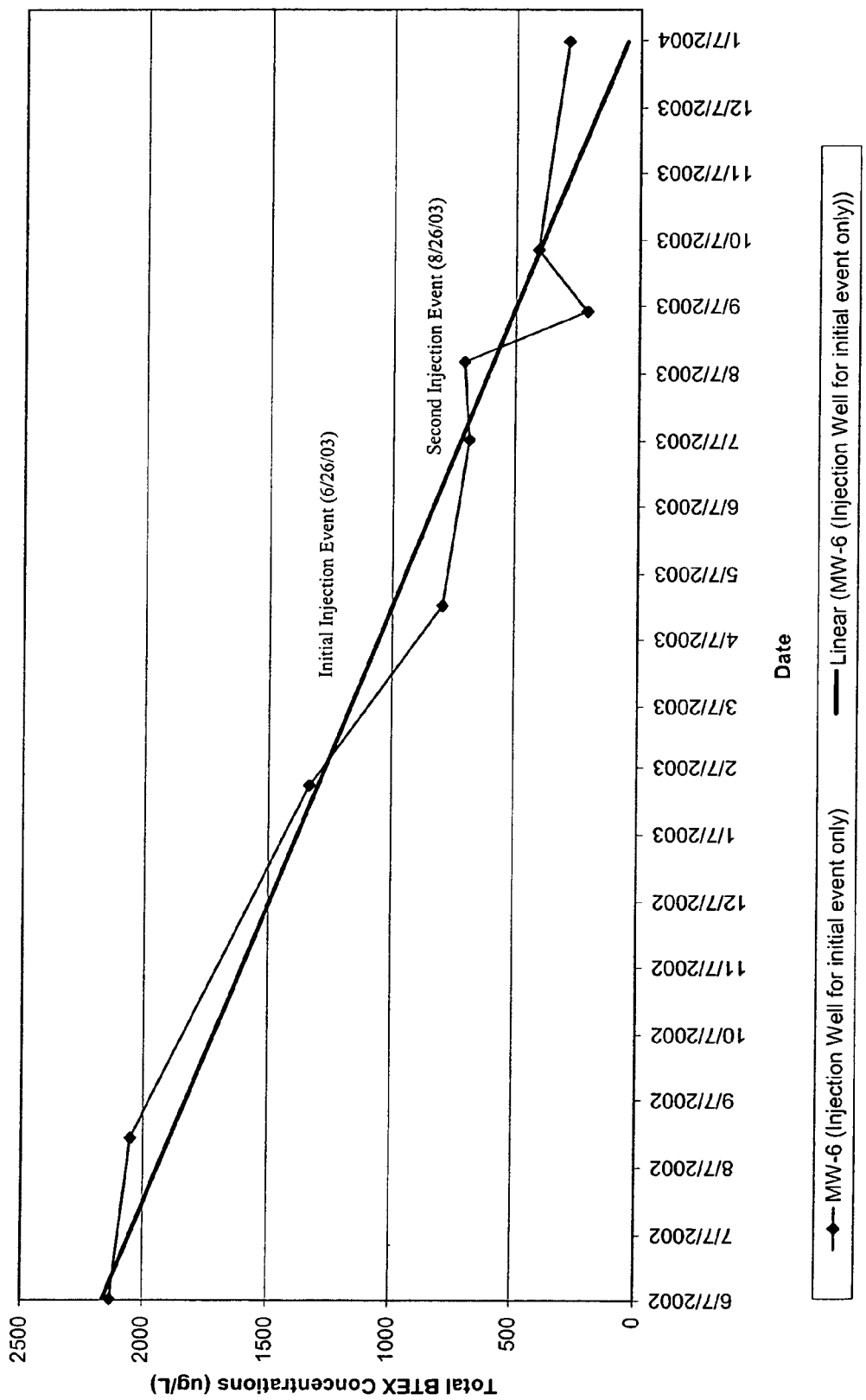

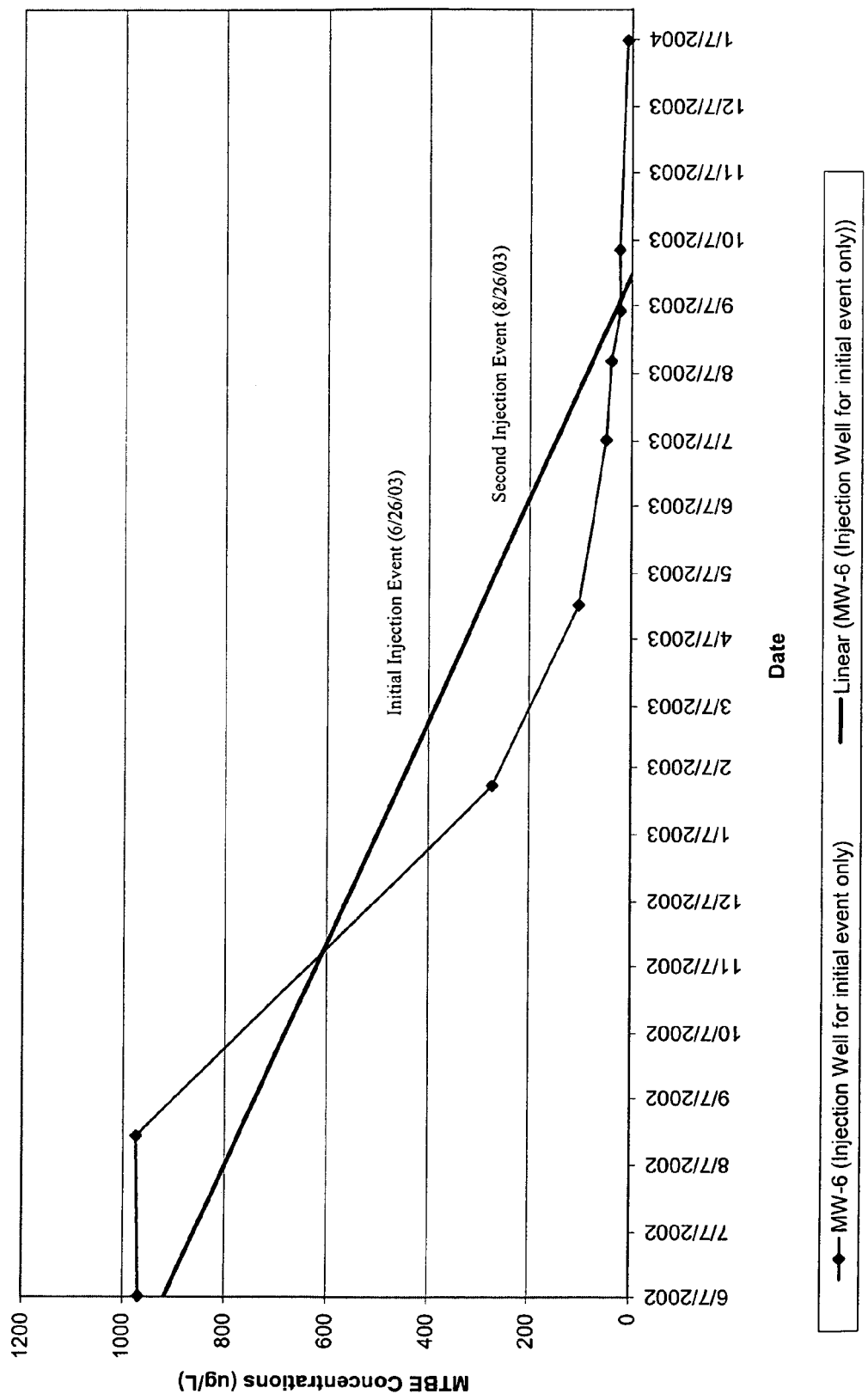

MTBE Concentrations in MW-8 from June 2002 to January 2004

MTBE Concentrations in MW-9 from June 2002 to January 2004

Total BTEX Reductions in MW-10 from June 2002 to January 2004

MTBE Concentrations in MW-10 from June 2002 to January 2004

Total BTEX Reductions in MW-11 from June 2002 to January 2004

MTBE Concentrations in MW-12 from June 2002 to January 2004

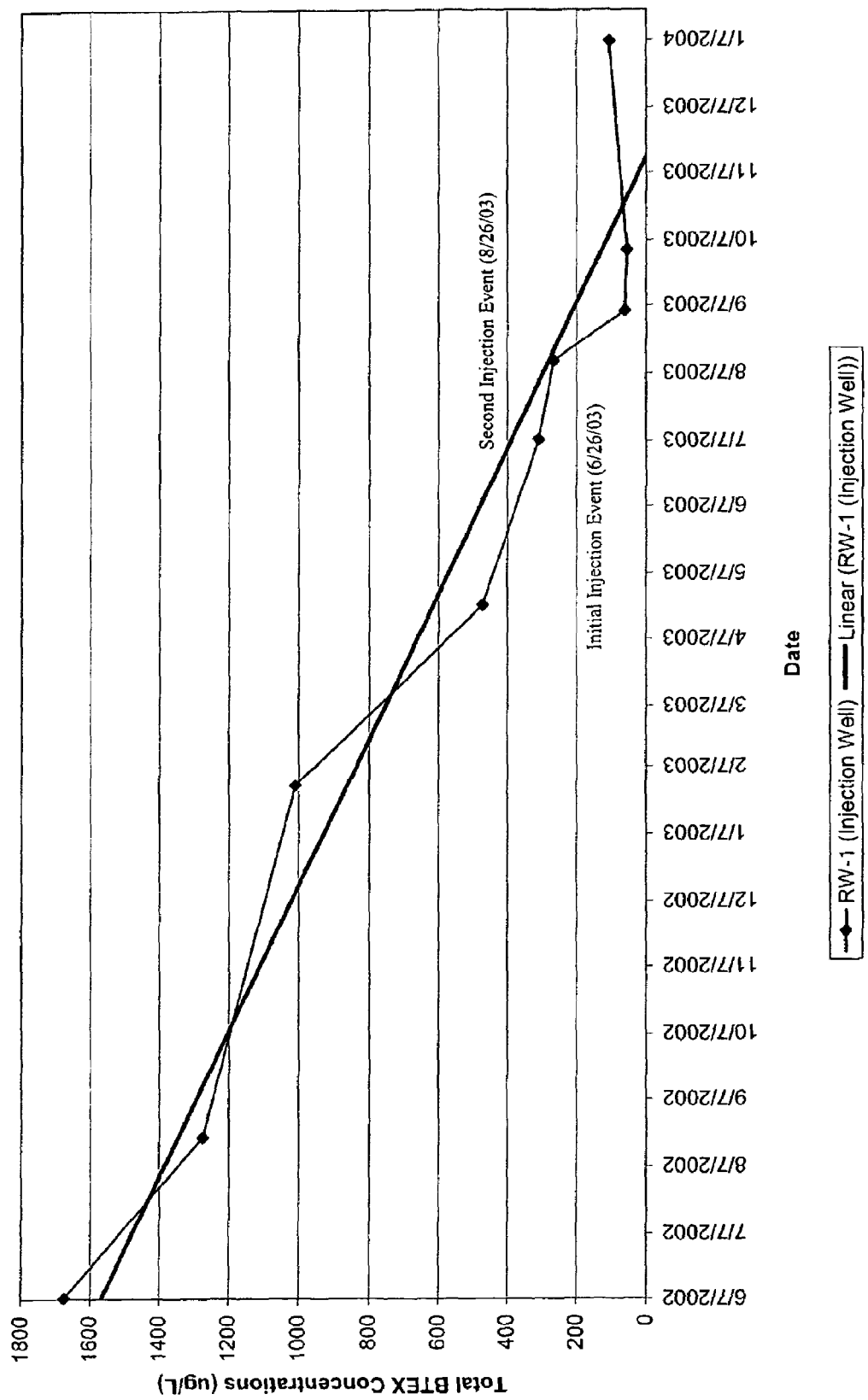

MTBE Concentrations in RW-1 from June 2002 to January 2004

Total BTEX Reductions in RW-1A from June 2002 to January 2004

MTBE Concentrations in RW-1A from June 2002 to January 2004

MTBE Concentrations in RW-2 from June 2002 to January 2004

Total BTEX Reductions in RW-2 from June 2002 to January 2004

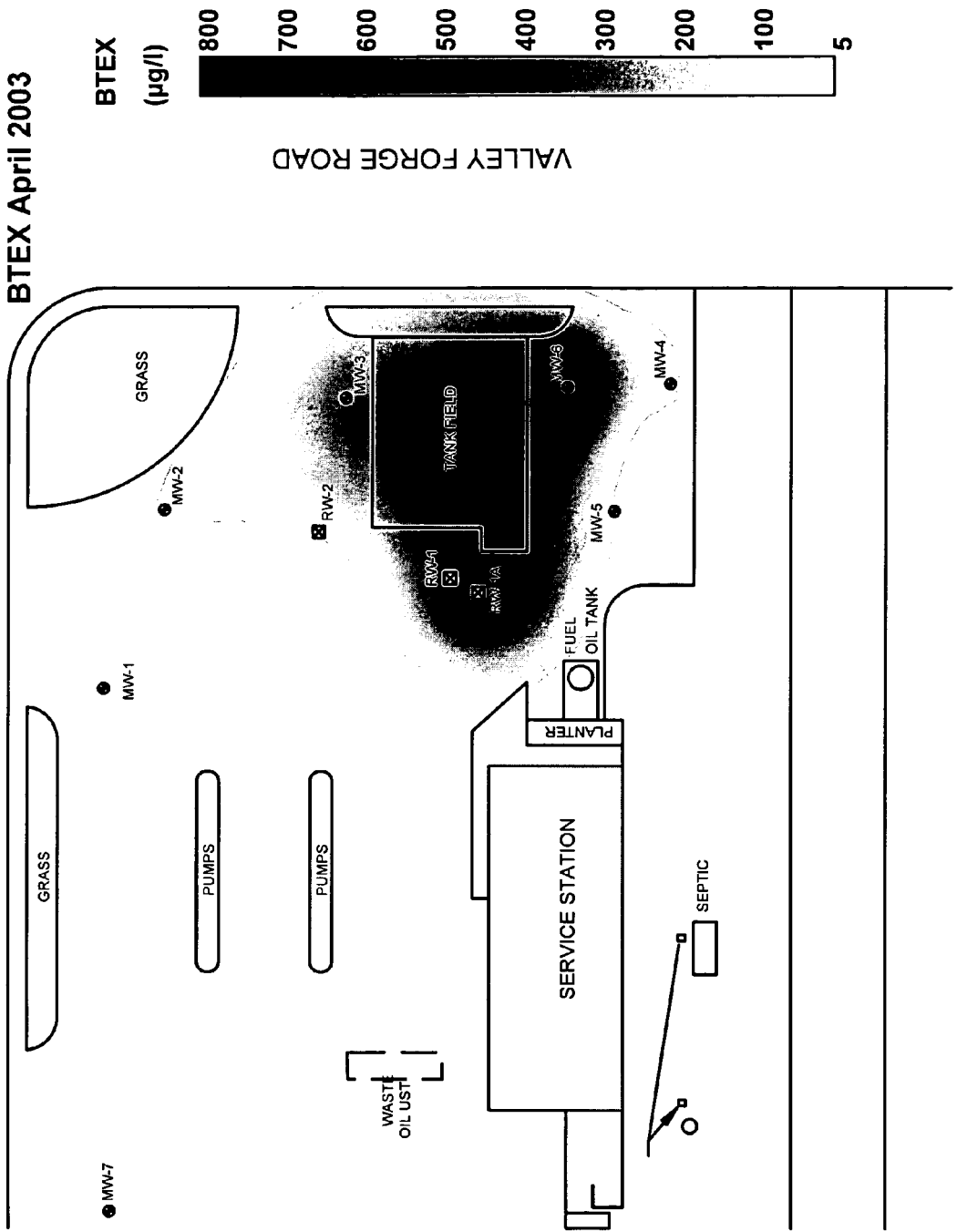

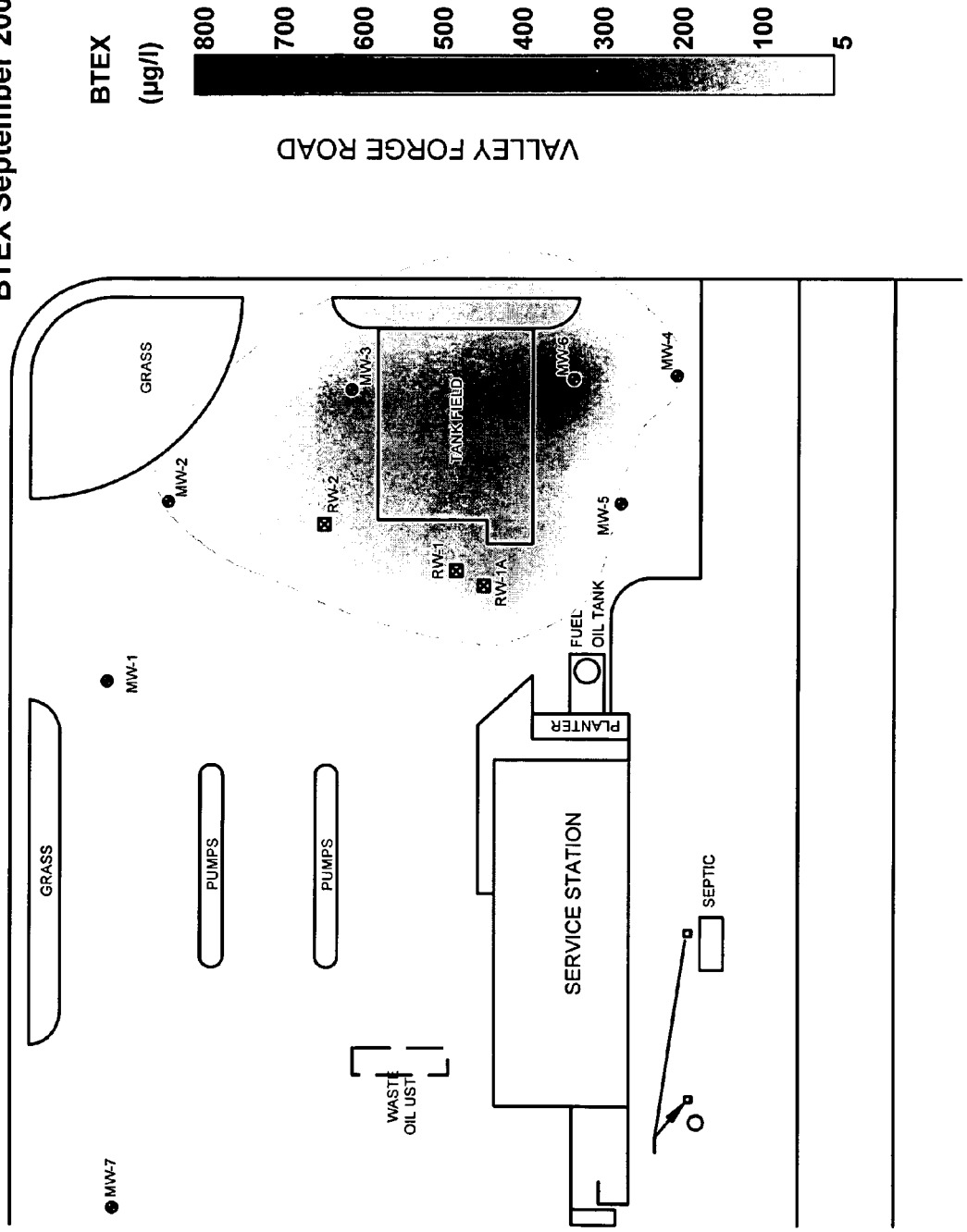

Former Service Station #2-1279
BTEX January 2004

Former Service Station #2-1279
MTBE April 2003

Former Service Station #2-1279
MTBE September 2003

Former Service Station #2-1279
MTBE January 2004

FIGURE 14 (TABLE 7)

Groundwater Concentration Comparison
April 7, 2003 to September 4, 2003

| Well ID | Benzene Concentrations on April 22, 2003 (µg/L) | Benzene Concentrations on July 7, 2003 (µg/L) | Benzene Concentrations on September 4, 2003 (µg/L) | Total BTEX Concentrations on April 22, 2003 (µg/L) | Total BTEX Concentrations on July 7, 2003 (µg/L) | Total BTEX Concentrations on September 4, 2003 (µg/L) | MTBE Concentrations on April 22, 2003 (µg/L) | MTBE Concentrations on July 7, 2003 (µg/L) | MTBE Concentrations on September 4, 2003 (µg/L) | Naphthalene Concentrations on April 22, 2003 (µg/L) | Naphthalene Concentrations on July 7, 2003 (µg/L) | Naphthalene Concentrations on September 4, 2003 (µg/L) |
|---|---|---|---|---|---|---|---|---|---|---|---|---|
| MW-1 | ND(1.0) | ND(1.0) | NS | ND(4.0) | 1.3 | NS | ND(1.0) | ND(1.0) | NS | ND(5.0) | ND(5.0) | NS |
| MW-2 | 5.5 | 2.3 | 2.2 | 8.9 | 5.4 | 7.0 | ND(1.0) | ND(1.0) | ND(1.0) | ND(5.0) | ND(5.0) | ND(5.0) |
| MW-3 | 4.0 | 9.4 | 2.1 | 312.2 | 748.1 | 172.7 | 31.7 | 31.2 | 11.6 | 18.2 | 62.8 | 12.7 |
| MW-4 | ND(1.0) | ND(1.0) | ND(1.0) | 3.6 | ND(4.0) | 2.5 | 12.3 | ND(1.0) | ND(1.0) | ND(5.0) | ND(5.0) | ND(5.0) |
| MW-5 | ND(1.0) | ND(1.0) | ND(1.0) | ND(4.0) | ND(4.0) | ND(4.0) | ND(1.0) | 13.2 | 3.2 | ND(5.0) | ND(5.0) | ND(5.0) |
| MW-6 | 8.6 | 8.5 | 2.7 | 793.6 | 687.4 | 209.8 | 102 | 49.8 | 22.4 | 69.9 | 58.9 | 28.7 |
| MW-7 | ND(1.0) | ND(1.0) | NS | ND(4.0) | ND(4.0) | NS | 465 | 922 | NS | ND(5.0) | ND(5.0) | NS |
| MW-8 | ND(5.0) | ND(1.0) | NS | ND(20.0) | ND(4.0) | NS | 2580 | 438 | NS | ND(25) | ND(5.0) | NS |
| MW-9 | ND(1.0) | ND(1.0) | NS | ND(4.0) | ND(4.0) | NS | 1.7 | 17.8 | NS | ND(5.0) | ND(5.0) | NS |
| MW-10 | 4.3 | ND(1.0) | NS | 5.7 | ND(4.0) | NS | 45.5 | 15.3 | NS | ND(5.0) | ND(5.0) | NS |
| MW-11 | ND(1.0) | ND(1.0) | NS | 30.2 | ND(4.0) | NS | ND(1.0) | 1.4 | NS | ND(5.0) | ND(5.0) | NS |
| MW-12 | ND(1.0) | ND(1.0) | NS | ND(4.0) | ND(4.0) | NS | 19.7 | 392 | NS | ND(5.0) | ND(5.0) | NS |
| RW-1 | 63.0 | 79.1 | 8.7 | 471.5 | 309.3 | 62.1 | 157 | 183 | 44.7 | 108 | 350 | 31.5 |
| RW-1A | 113.0 | 6.0 | 3.4 | 771.8 | 93.6 | 85.8 | 319 | 85.8 | 63.4 | 169 | 81.6 | 50.6 |
| RW-2 | ND(1.0) | 45.4 | 21.3 | ND(4.0) | 118.8 | 66.1 | 2.8 | 23.3 | 8.7 | ND(5.0) | 40.3 | 33.2 |

Notes:
ND: Below laboratory detection limits
NS: Not Sampled

Ozone, Hydrogen Peroxide, Oxygen, & Air Injection: Feasibility Testing Using Oxidation Equipment
Unleaded Gasoline Release

METHODS AND SYSTEMS FOR GROUNDWATER REMEDIATION

CROSS REFERENCE TO RELATED APPLICATIONS

This application claims the benefit of U.S. Ser. No. 60/455,527, filed Mar. 17, 2003, the disclosure of which is incorporated herein by reference in its entirety.

FIELD OF THE INVENTION

The present invention is directed, in part, to systems and methods for the remediation of water, soils and sediment bodies.

BACKGROUND OF THE INVENTION

There is a well-recognized need for remediation, or cleanup, of contaminants (e.g. chemicals) that exist in a variety of settings, including ground and surface water, aquifers, water supply pipes, soil, and sediment collections. Such contaminated sites pose significant health risks to human and animal populations. Accordingly, new and improved remediation techniques are of critical importance. The present invention is directed to these, as well as other, important ends.

SUMMARY OF THE INVENTION

The present invention provides, inter alia, systems and methods for the remediation of contaminated water, soils and/or sediments.

In some embodiments, the treatment system comprises:

a) two or more conduits for conducting two or more different reagents;

b) at least one injection port associated with each of the two or more conduits, the injection ports separately dispensing the two or more different reagents; and c) a diffusion barrier placed between at least two of the injection ports dispensing different reagents.

In some embodiments, the system for treating groundwater and/or soil comprises:

a) two or more conduits for conducting two or more different reagents into the groundwater through a bore hole;

b) at least one injection port associated with each of the two or more conduits for dispensing the two or more different reagents, wherein at least two of the injection ports are at different points along the length of the bore hole;

c) a diffusion barrier placed in the bore hole between the at least two injection ports, preventing substantial contacting of at least two different reagents within the bore hole.

In some embodiments, the system for treating groundwater and/or soil comprises:

a) two conduits for separately conducting a first reagent comprising hydrogen peroxide and a second reagent comprising ozone into the groundwater through a bore hole;

b) an injection port at the end of each conduit, wherein the injection ports are at different points along the length of the bore hole;

c) a diffusion barrier placed in the bore hole between the two injection ports, preventing substantial contacting of the hydrogen peroxide and the ozone within the bore hole prior to their diffusing out of the bore hole.

In some embodiments, the system for treating groundwater and/or soil comprises:

a) one conduit for conducting two or more different reagents into the groundwater through a bore hole;

b) one injection port associated with the conduit for dispensing the two or more different reagents;

c) a diffusion barrier placed in the conduit above the injection port, isolating reagent injection location to a minimum depth within the borehole.

The present invention further provides methods of treating a body of water and/or soil comprising injecting two or more reagents into the body of water and/or soil using one or more of the systems described herein.

The present invention further provides methods of reducing organic compounds dissolved or suspended in a body of water and/or soil comprising injecting two or more reagents into the body of water and/or soil using one or more of the systems described herein.

The present invention further provides methods of treating groundwater and/or soil comprising contacting two or more reagents, wherein the contacting occurs after the two or more reagents have diffused into the groundwater and/or soil from separate conduits or separate points at an injection port within a single conduit, where the separate conduits or separate points are separated by a diffusion barrier.

BRIEF DESCRIPTION OF THE DRAWINGS

FIGS. 2a–b show diagrams of example in-situ remediation single conduit injection systems according to the present invention.

FIG. 3 shows a typical ozone and hydrogen peroxide injection regime in accordance with the invention.

FIGS. 4a–f summarize the historical domestic well analytical data collected to date at the site of remediation in Example 1.

FIGS. 5a–f show the historical recovery and monitoring well analytical data collected to date at the site of remediation in Example 1.

FIG. 6 represents total BTEX concentrations in groundwater prior to remediation and after five months of remediation at the site of remediation in Example 1.

FIG. 7 represents MTBE concentrations in groundwater before remediation and after five months of remediation at the site of remediation in Example 1.

FIG. 8 represents dissolved oxygen concentrations groundwater prior to remediation and after three months of remediation at the site of remediation in Example 1.

FIGS. 9a–e show groundwater elevation, BTEX, and MTBE concentration trends for select wells over time at the site of remediation in Example 1.

FIGS. 10a–d show enhancement of dissolved oxygen concentrations after remediation at the site of remediation in Example 1.

FIG. 11 summarizes the temperature, dissolved oxygen, and pH measurements collected at the site of remediation in Example 2.

FIGS. 13a–f illustrate the site wide reduction in BTEX and MTBE at the site of remediation in Example 2.

FIG. 14 shows a comparison of groundwater concentrations of contaminants before and after chemical oxidation activities at the site of remediation in Example 2.

DESCRIPTION OF EMBODIMENTS

The present invention provides, inter alia, chemical oxidation systems that are useful for the remediation of water, soils and sediment bodies. In accordance with some embodiments of the invention, the treatment system includes one or more injection sites (or injection points) for injection of reagents that effect remediation. Each of the injection sites can be a bore hole that contains one or more conduits (or wells) through which reagents are dispensed into the surrounding water, soils or sediments. When a bore hole contains two or more conduits, the site can be referred to as a "nested injection site." In some embodiments, nested injection may be conducted in existing polyvinylchloride (PVC) or stainless steel wells via well-packing materials.

In one aspect of the invention, the remediation system includes at least one nested injection site in which two conduits are disposed along the length of the bore hole. Each of the conduits terminates at an injection port where reagents dispensed therethrough exit into the surroundings. In some embodiments, the injection ports occur at different points along the length of the bore hole and/or each conduit dispenses a different reagent. The bore hole can be packed with any of numerous packing materials. In some embodiments, the bore hole is packed with diffusing media, such as sand, around the injection ports. Additionally, diffusion barriers comprised of, for example, bentonite or grout, can be placed at various points along the length of the bore hole. In some embodiments, a diffusion barrier is placed between injection ports when the injection ports occur at different points along the bore hole. This arrangement facilitates the movement of reagents out of the injection site into the surrounding water, soils or sediments and helps prevent reagents from contacting one another within the bore hole. In further embodiments, a diffusion barrier can be placed within the bore hole above all of the injection ports to help prevent diffusion of reagents upward and/or away from the desired site of remediation.

Figure 1:
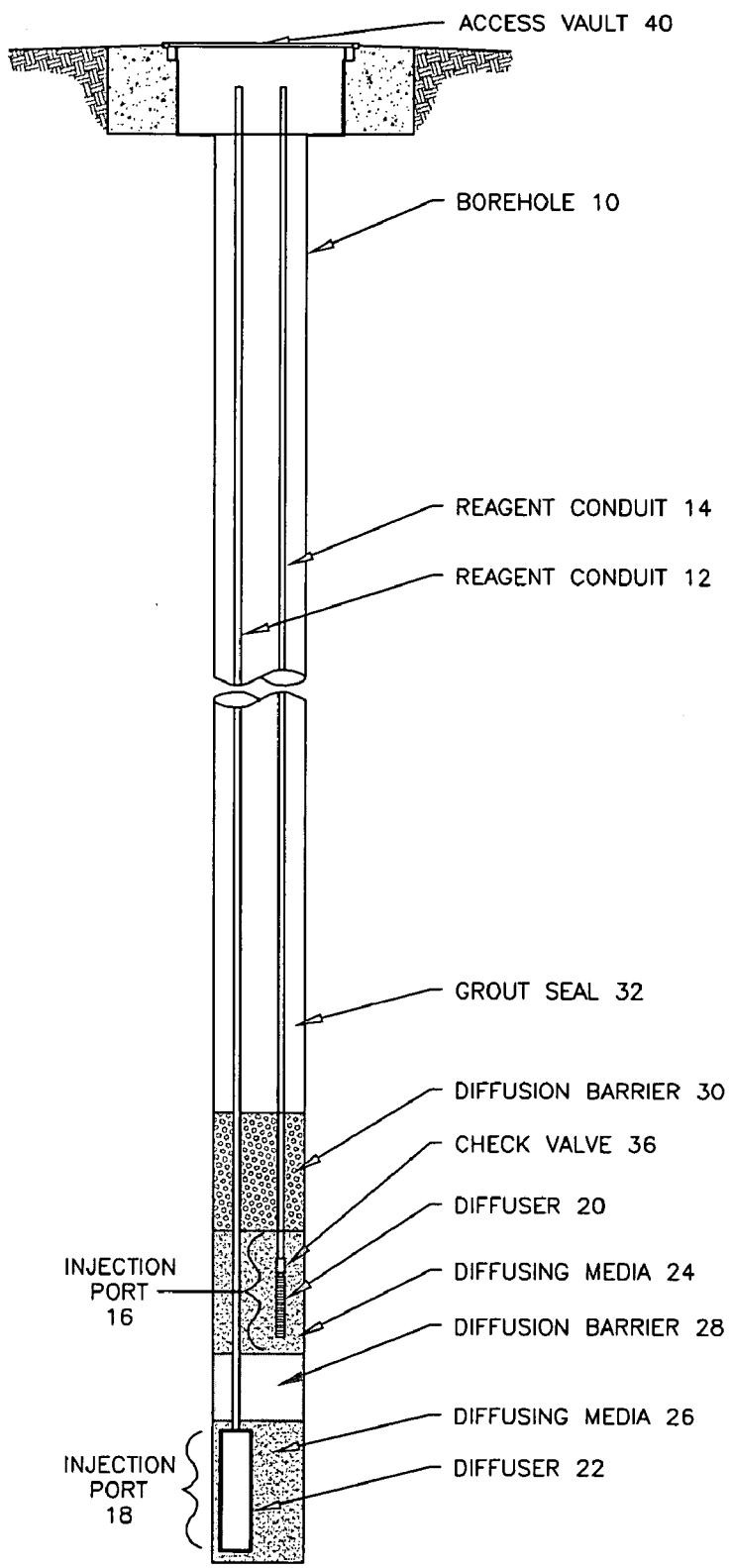
FIG. 1 shows a diagram of an example in-situ remediation nested conduit injection system according to the present invention.

An example nested injection site, according to the first aspect of the invention, is shown in FIG. 1. Bore hole 10 contains nested conduits 12 and 14, terminated with injection ports 16 and 18, through which reagents are dispensed (i.e., injected). The bore hole can be any convenient diameter, typically from about 2 to about 12 inches in diameter. The bore hole can be vertical, horizontal, or at a convenient angle to the ground surface. The length of the bore hole will vary depending on the location of the contaminants to be remediated, but is typically from 2 to about 100 feet in length.

Conduit 14 extends beyond conduit 12 such that injection port 18 is further along bore hole 10 than injection port 16. Injection ports 16 and 18 contain diffusers 20 and 22.

Injection ports 16 and 18 are contained within diffusing media 24 and 26, respectively, which can be any suitable media for facilitating diffusion of reagents, for example, sand. Diffusing media 24 and 26 are separated by diffusion barrier 28, which can be any material that substantially prevents the mixture within the bore hole of reagents dispensed by conduits 12 and 14. Diffusion barrier 30 can likewise be of any material that resists diffusion of reagents. Preferred materials for diffusion barriers 28 and 30 include suitable clays, such as bentonite or grout. Grout seal 32 is typically concrete or a similar material that can resist the pressure of the injected reagents. Conduit 12 also contains check valve 36, which resists backflow of reagent through conduit 12.

In the embodiment of FIG. 1, reagents are dispensed through conduits 12 and 14, and exit through the diffusers 20 and 22 of injection ports 16 and 18. The reagents diffuse through diffusion media 24 and 26, and are prevented from mixing within the bore hole 10 by diffusion barriers 28 and 30. The reagents diffuse into the water, soil, sediment bodies or mixtures thereof outside of the bore hole, where they then react.

Conduits 12 and 14 can be of any material suitable to dispense the reagents. One suitable material is stainless steel tubing, for example ½-inch diameter stainless steel tubing. The ends of conduits 12 and 14 are within access vault 40, which extends from the ground surface down to a point approximately 2 to 10 feet deep. The ends of conduits 12 and 14 are in fluid communication with the sources of the reagents to be dispensed through the conduits.

In the embodiment of FIG. 1, conduit 12 dispenses fluid reagents such as, for example, hydrogen peroxide and conduit 14 dispenses gaseous reagents such as ozone, air, and/or oxygen. Upon injection, the reagents come into contact with each other substantially outside of the bore hole, in the surrounding waters, soils or sediments.

In some embodiments, the liquid reagent injected through conduit 12 is provided via a holding tank (not shown) and injection pump (not shown). In some embodiments, the holding tank is double-walled. In further embodiments, the holding tank contains a hydrogen peroxide solution, typically between about 5 and about 50%, about 10 and about 40%, about 30 and about 40%, or about 35% hydrogen peroxide solution. The hydrogen peroxide in the holding tank is pumped to the conduit or conduits at varying flow rates, for example, about 5 to about 75, about 10 to about 60, or about 12 to about 50 mL/min, at a pressure of at least about 10, about 15, about 18, about 20, about 22, or about 25 psig. In further embodiments, the hydrogen peroxide solution flows through the conduit at a flow rate between about 0.5 and 25 gpm.

Further in connection with the embodiment of FIG. 1, an ozone containing reagent is provided to conduit 14 from an ozone generator, via any suitable ozone-compatible material, for example Teflon®.

In a second aspect of the invention, an injection site can contain a single conduit, through which one reagent or a mixture of reagents is dispensed into the surrounding water, soils or sediments. The conduit can be encased by any suitable material that does not substantially react with or decompose the reagents such as, for example, PVC, stainless steel, or the like. By "substantially react" is meant that less than about 5% of the injected reagents are degraded or rendered inactive by their contact with conduit. Reagents are conducted through a reagent line into and along the length of the conduit terminating at an injection port. The reagent line can be tubing or piping comprised of any material substantially inert to the reagents such as Teflon or stainless steel. By "substantially inert" is meant that less than about 5% of the injected reagents are degraded or rendered inactive by their contact with the reagent line. In some embodiments, a well packer is placed in the conduit upstream of the injection port, effectively preventing diffusion of reagent or reagents into the conduit upstream of the well packer. In addition, the bore hole through which the conduit extends can contain diffusing media around the injection port as well as a diffusion barrier (e.g., grout and/or bentonite) above the injection port. The bore hole can be any convenient diameter, typically from about 2 to about 12 inches in diameter. The bore hole can be vertical, horizontal, or at a convenient angle to the ground surface. The length of the bore hole will vary depending on the location of the contaminants to be remediated, but is typically from 2 to about 100 feet in length.

The single conduit system of the second aspect of the invention can be prepared by retrofitting an existing well, such as a well originally used to monitor ground water and/or subsoil composition. For example, a reagent line can be inserted into an existing conduit, and the reagent line can be terminated at an existing diffuser. To facilitate the diffusion of injected reagent into the surrounding water, soils and/or sediments, a well packer can be placed within the existing conduit upstream of the reagent line terminus.

An injection site according to the second aspect of the invention is shown in FIG. 2a in which an existing well is retrofitted with additional components to form an injection site according to the present invention. Bore hole 42 contains existing conduit 44, terminated with injection port 46, at which points reagents are dispensed (i.e., injected). Injection port 46 contains existing diffuser 48.

Injection port 46 is contained within diffusing media 50, which can be any suitable media for facilitating diffusion of reagents, for example, sand. Well-packer 52 is installed at a variable distance 54 along the length of injection port 46 to seal off the upper portion of injection port 46 and thus restrict the dispersion of reactants from the depth of the distance 54 to out beyond the borehole. Grout seal 56 is typically concrete or a similar material that can resist the pressure of the injected reagents.

In the embodiment of FIG. 2a, reagents are dispensed through conduit 44 via a reagent line, and exit through the diffuser 48 of injection port 46. The reagents diffuse through diffusion media 50, and are prevented from diffusing along the entire length of injection port 46 by well packer 52. The reagents diffuse into the water, soil, sediment bodies or mixtures thereof outside of the bore hole.

The upper end of conduit 44 is within access vault 58, which extends from the ground surface down to point approximately 1 to 10 feet deep. The upper end (upstream end) of conduit 44 is in fluid communication with the sources of the reagents to be dispensed through the conduits.

In the embodiment of FIG. 2a, conduit 44 dispenses fluid reagents such as, for example, a mixture of hydrogen peroxide and air. As in previous embodiments, liquid components of the injected reagent can be provided via a holding tank (not shown) and injection pump (not shown). In some embodiments, the holding tank is double-walled. In further embodiments, the holding tank contains a hydrogen peroxide solution, typically about 5 to about 50%, about 10 to about 30%, about 10 to about 20%, about 10%, or about 15% hydrogen peroxide solution. The hydrogen peroxide in the holding tank is pumped at varying flow rates, for example, about 0.5 to about 25, about 0.5 to about 10, about 1 to about 8, or about 2 to about 5 gallons per minute (gpm), at a pressure of at least about 5 psi. Air can be provided to conduit 44 from an air compressor. The compressed air is delivered at flow rates from about 5 scfm to about 30 scfm and at pressures of about 1 psi to about 100 psi. In some embodiments, the compressed air is delivered at flow rates from 5 to about 20, about 5 to about 10, about 10 to about 30, about 20 to about 30, or about 10 to about 20 scfm. In further embodiments, the compressed air can be delivered at a pressure of about 1 to about 75, about 1 to about 50, about 15 to about 30, 1 to about 15, about 1 to about 10, about 5 to about 20, about 10 to about 20, or about 15 to about 20 psi.

In a third aspect of the invention, an injection site can contain a single conduit, through which two or more different reagents are dispensed into the surrounding water, soils or sediments. The conduit can be encased by any suitable material that does not substantially react with or decompose the reagents such as, for example, PVC, stainless steel, or the like. The two or more reagents are conducted through separate reagent lines into and along the length of the conduit, each line terminating at different points along the conduit within the injection port. The reagent lines can be made of tubing or piping comprised of any material substantially inert to the injected reagents such as, for example, Teflon or stainless steel. In some embodiments, a well packer is placed in the conduit upstream of the injection port, effectively preventing diffusion of reagents into the conduit upstream of the well packer. In addition, a second well packer can be placed between the termini of the separate reagent lines, preventing contacting or mixing of reagent within the conduit and facilitating diffusion of the reagent into the surrounding water, soil or sediments. In addition, the bore hole through which the conduit extends can contain diffusing media around the injection port as well as a diffusion barrier (e.g., grout and/or bentonite) above the injection port. The bore hole can be any convenient diameter, typically from about 2 to about 12 inches in diameter. The bore hole can be vertical, horizontal, or at a convenient angle to the ground surface. The length of the bore hole will vary depending on the location of the contaminants to be remediated, but is typically from 2 to about 100 feet in length.

The single conduit system of the third aspect of the invention, as with the second aspect, can be prepared by retrofitting an existing well, such as a well originally used to monitor ground water and/or subsoil composition. For example, reagent lines can be inserted into an existing conduit, and the reagent lines can be terminated at an existing diffuser. To facilitate the diffusion of injected reagent into the surrounding water, soils and/or sediments, a well packer can be placed within the existing conduit at the points described above FIG. 2b provides an example injection site according to the third aspect of the invention. Reagents are dispensed through conduit 44 (e.g., via reagent lines), and exit through the diffuser 48 of injection port 46. The reagents are distributed separately along injection port 46 and are prevented from diffusing along the entire length of injection port 46 by well-packers 52 and 60. The reagents diffuse through diffusion media 50 and then out into the water, soil, sediment bodies or mixtures thereof outside of the bore hole.

Conduit 44 can be of any material suitable to dispense the reagents. An exemplary suitable material is polyvinylchloride (PVC). The upper end of conduit 44 is within access vault 58, which extends from the ground surface down to a point approximately 0.5 to 10 feet deep. The end of conduit 44 is in fluid communication with the sources of the reagents to be dispensed through the conduit. The reagents may be dispersed jointly (i.e., as a mixture) or separately. In some embodiments, the hydrogen peroxide-containing reagent is provided via a holding tank and injection pump. In some embodiments, the holding tank is double-walled. In further embodiments, the holding tank contains a hydrogen peroxide solution, typically about 5 to about 50%, about 10 to about 30%, about 10 to about 20%, about 10%, or about 15% hydrogen peroxide solution. The hydrogen peroxide in the holding tank is pumped at varying flow rates, for example, about 0.5 to about 25, about 0.5 to about 10, about 1 to about 8, or about 2 to about 5 gallons per minute (gpm), at a pressure of at least about 5 psi. Air can be provided to conduit 44 from an air compressor. The compressed air is delivered at flow rates from about 5 scfm to about 30 scfm and at pressures of about 1 psi to about 100 psi. In some embodiments, the compressed air is delivered at flow rates from 5 to about 20, about 5 to about 10, about 10 to about 30, about 20 to about 30, or about 10 to about 20 scfm. In further embodiments, the compressed air can be delivered at a pressure of about 1 to about 75, about 1 to about 50, about 15 to about 30, 1 to about 15, about 1 to about 10, about 5 to about 20, about 10 to about 20, or about 15 to about 20 psi.

Definitions

The terms and phrases used herein, including the terms below, have their usual meanings associated with the art and are used herein as further described.

As used herein, the term "bore hole" refers to a hole, passage or tunnel made typically into soils, rock or other material through which one or more conduits (i.e., wells) is placed. The bore hole can be optionally filled with various media around the conduit(s), including, for example, diffusing media (e.g., sand), diffusion barriers (e.g., bentonite or grout), and/or sealant (e.g., grout or concrete). The bore hole is typically longer than it is wide, having a length that corresponds to its largest dimension of length x width x height.

As used herein, the term "conduit" refers to a hole, passage or tunnel within and running along the length of the bore hole. The conduit can be encased in a casing such as PVC, stainless steel, or other piping. The conduit can include a diffuser through which reagents dispensed from the conduit diffuse into the bore hole and into the surroundings. The conduit terminus where reagents are introduced is referred to as the "upstream terminus" and the conduit terminus where reagents exit into the immediate surroundings is referred to as the "downstream terminus."

As used herein, the term "diffusion barrier" refers to a medium that substantially blocks or slows diffusion of reagents to undesired regions, such as regions where the reagents would not have the desired remediation effect. A diffusion barrier also directs the diffusion of reagents toward regions within the water, soil or sediments needing treatment by the reagents. Exemplary diffusion barriers include grout or bentonite in a bore hole, or a well packer in a conduit.

As used herein, the term "reagent line" refers to a means for introducing reagents into a conduit. The reagent line can be tubing or piping that is in communication with the reagent source and is inserted into a conduit such that the reagents are dispensed through the conduit such as, for example, to an injection port at the downstream terminus of a conduit.

As used herein, the term "injection port" refers to the region of conduit where reagents are dispensed into the bore hole and into surrounding water, soil, and/or sediments. The injection port can include, for example, a diffuser, well screen, or sprayer for dispensing reagents. The injection port can also include one or more valves such as, for example, a check valve for resisting back blow of fluid reagents.

The term "underground" describes and object or system that is situated below the surface of the earth. A system that is "substantially underground" has at least a portion that is situated below the surface of the earth. In some embodiments, a system that is substantially under ground has at least an injection port that is situated below the surface of the earth.

The term "contacting" refers to the molecular interaction of substances including, for example, reagents, such that a chemical transformation of one or more of the contacting substances can occur.

Further Embodiments

The following embodiments are associated with all aspects of the invention described herein.

In some embodiments, the injection of ozone, oxygen, air and/or hydrogen peroxide is cycled to various injection points to aggressively pulse the operation of the system while minimizing the likelihood of the development of preferential injection pathways. Thus, in some embodiments it is preferred to mix varying injection recipes to nested conduits, by alternating, for example, pulse injection points and flow rates.

In some embodiments, such cycling and mixing functions are performed by a programmable logic controller (PLC) or electronic timers, which control the operation of the ozone and hydrogen peroxide injection system. The PLC or timers are used to ensure that injection flow rates at each point are controlled, and in some embodiments, to pulse the operation of the system to cycle the reagents through the conduits, and to control flow rates. It will be appreciated that it also is beneficial to control the hydrogen peroxide injection rates to eliminate the potential to cause significant temperature increases in the subsurface.

In some embodiments, the systems of the present invention have a plurality of bore holes, each containing one or more conduits, for the introduction of reagents such as ozone containing reagents and hydrogen peroxide containing reagents, and each of which can be operated individually. Typically, a system of the invention can have 5, 10, 15, 20 or more such injection locations.

In some embodiments, the flow rates of reagents through the injection ports (such as through a diffuser) are varied in a pulsatile fashion (i.e., the reagents are injected in pulses, as opposed to a continuous flow), to achieve optimum results. Each of the pulses can be of the same or different reagent composition and/or flow rate. A typical pulsed scheme can include:

1) ozone/oxygen/air injection at low flow rates and high concentrations;

2) ozone/oxygen/air injection at high flow rates and moderate concentrations;

3) hydrogen peroxide with and without simultaneous ozone/oxygen/air injection;

4) ozone/oxygen injection at low flow rates and high concentrations.

A further example of a typical ozone and hydrogen peroxide injection regime in accordance with the invention can be seen in FIG. 3.

Thus, the combinations of reactants, cycling durations, injection locations, and injection flow rates are advantageously controlled to achieve the benefits of the invention, for example and without limitation: High flow rates of ozone and air (up to about 40 scfm) are dissolved or distributed into the groundwater and saturated soils to address adsorbed-phase and dissolved or distributed phase contaminants; ozone, oxygen and/or air injection aids in mixing and distributing hydrogen peroxide to increase the radius-of-influence of hydroxyl radical production; and low flow rate ozone injection at approximately one to two scfm can be used, typically pulsed, to inject high concentrations of ozone of up to about 100,000 ppm for rapid contaminant breakdown.

In some embodiments, the systems of the invention utilize atmospheric air or oxygen to create ozone via an ozone generator. In some embodiments, the systems of invention utilize a holding tank and transfer pump to direct hydrogen peroxide into the nested conduits.

In some embodiments, the systems of the invention can conveniently be housed in a portable carrier, for example in a trailer that can be brought directly to the remediation site. In some embodiments, the systems of the invention can include safety features, for example an ozone detector, in the trailer to shut down the system; ozone destruction media on the system exhaust fan, and temperature and pressure controls at suitable locations in the system.

Figure 2B:
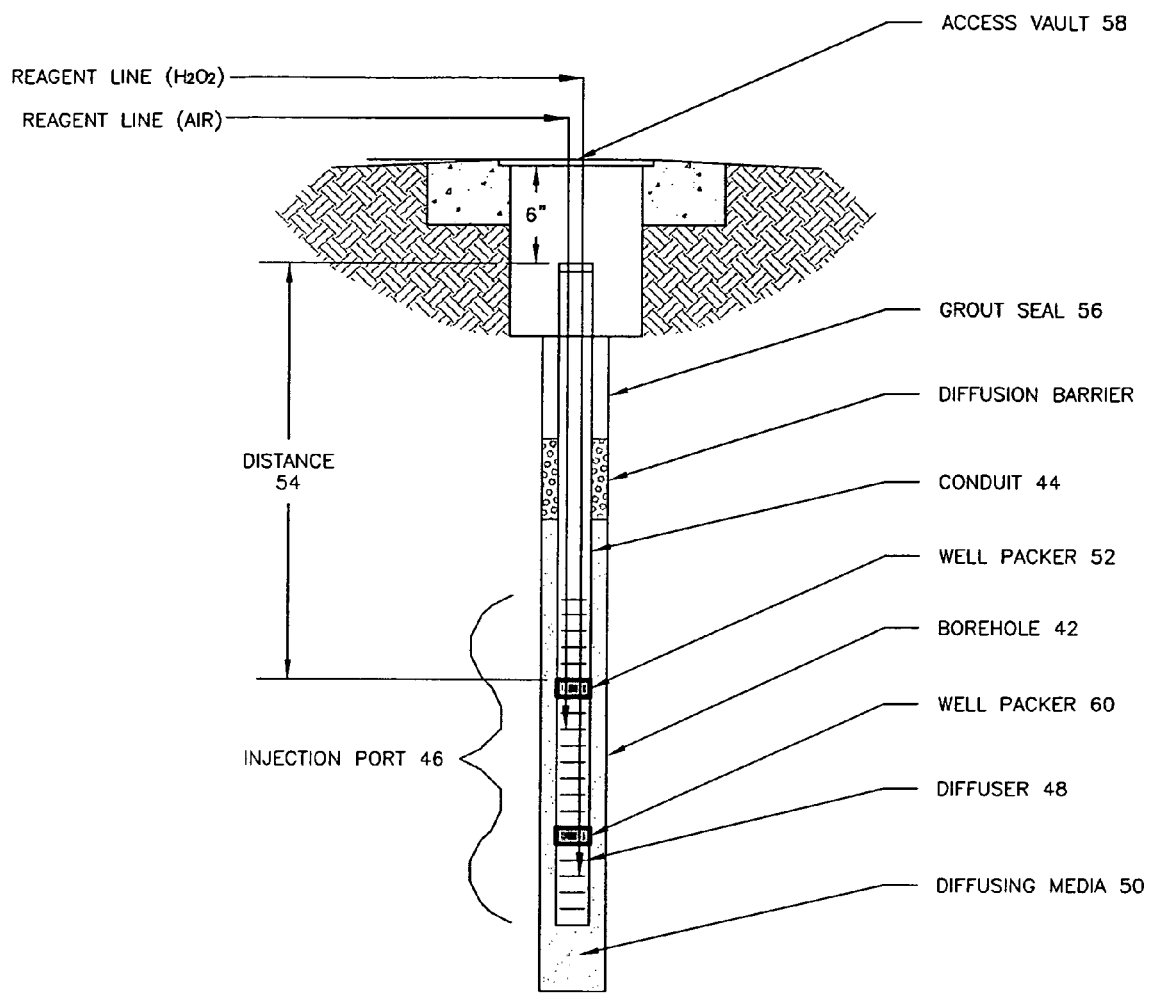
Figure 9A:
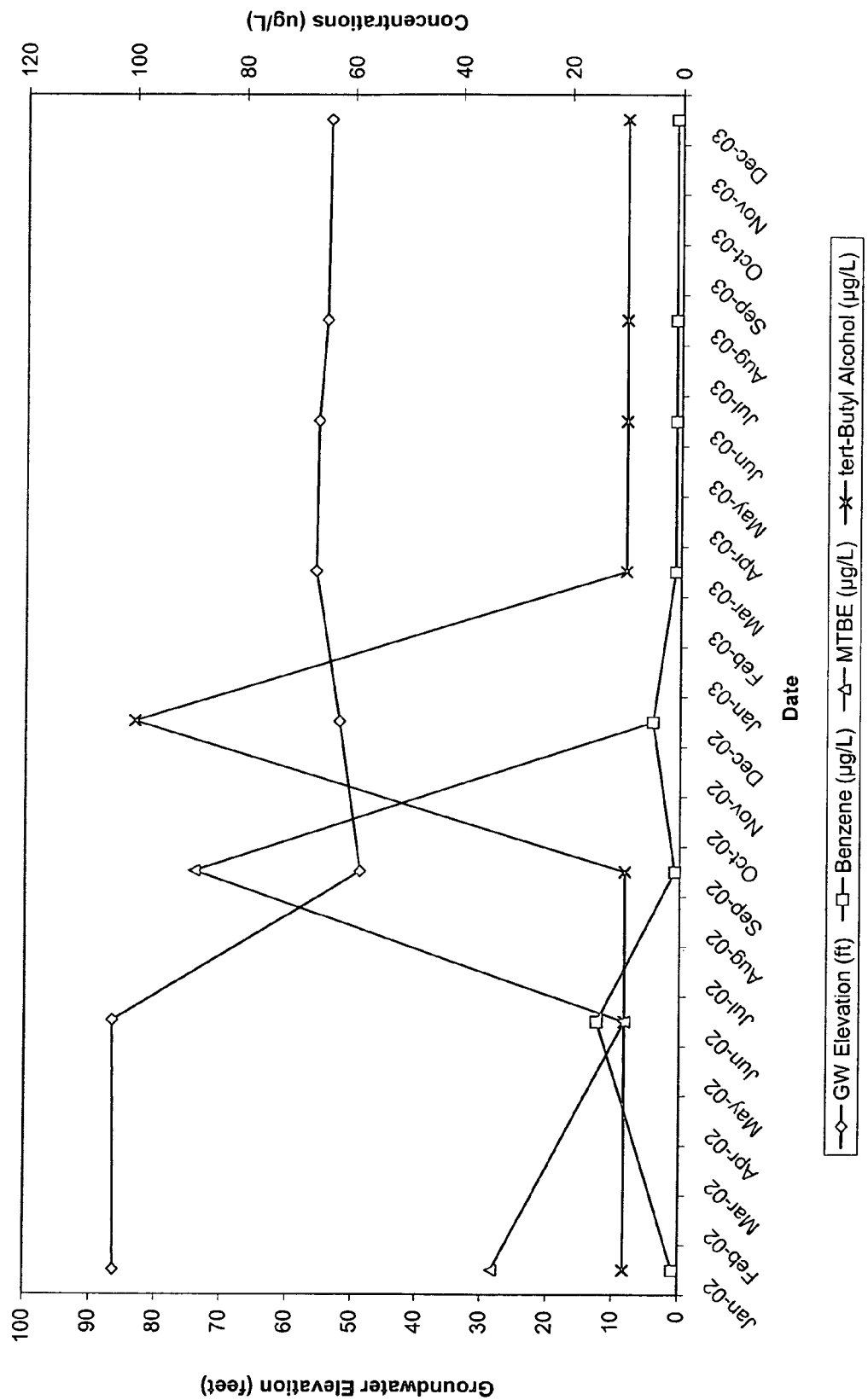
Figure 9B:
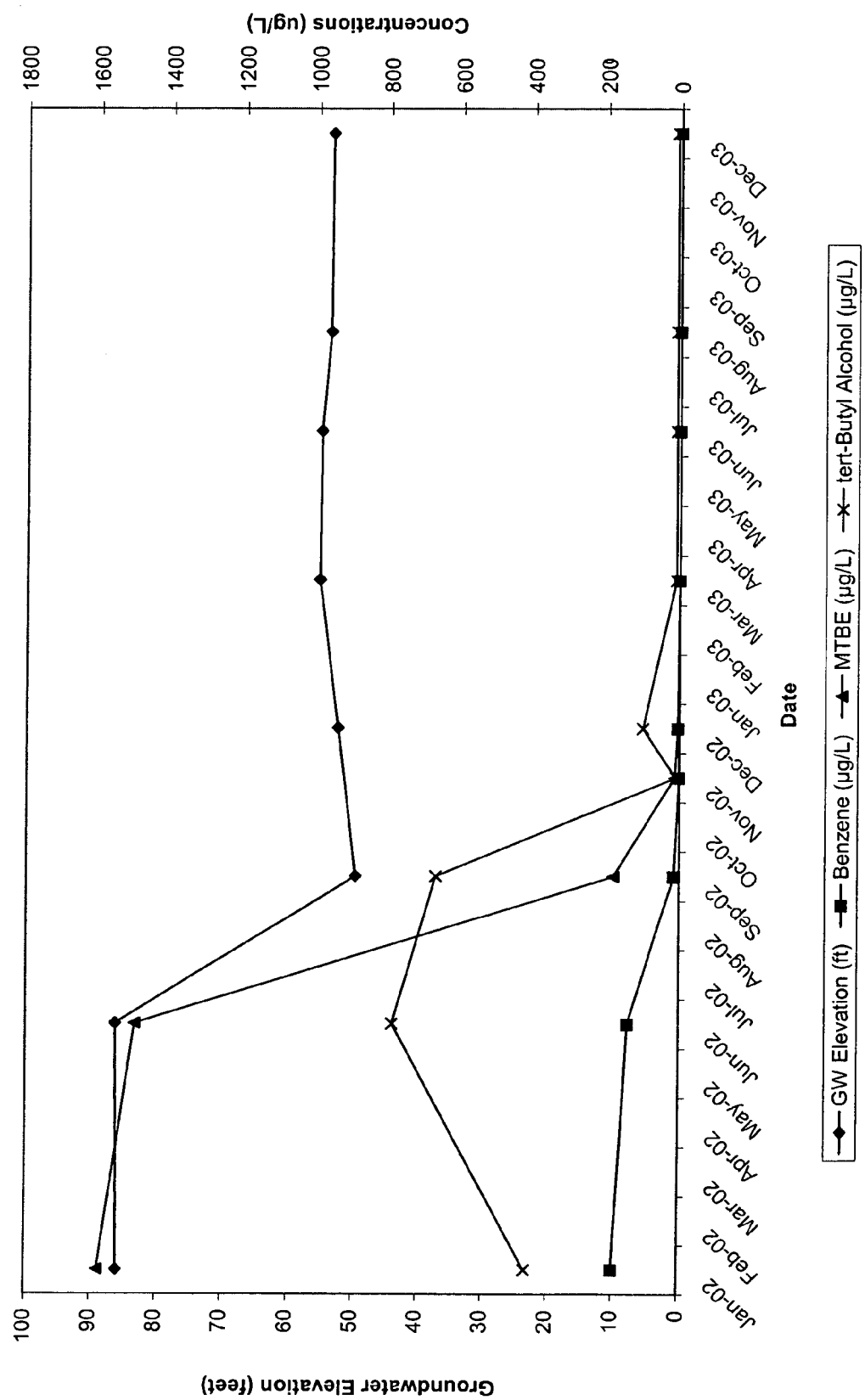
Figure 9D:
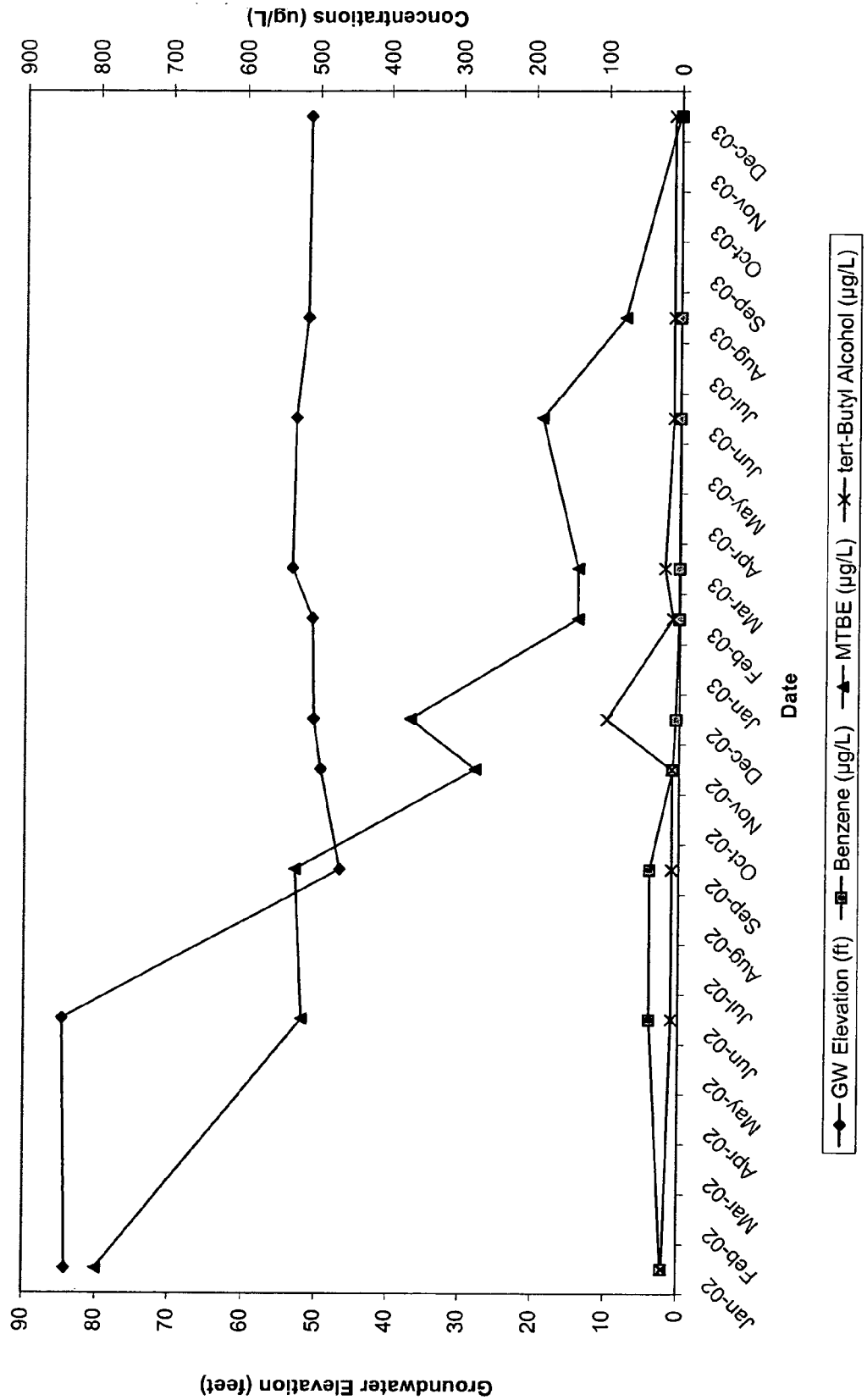
Figure 9E:
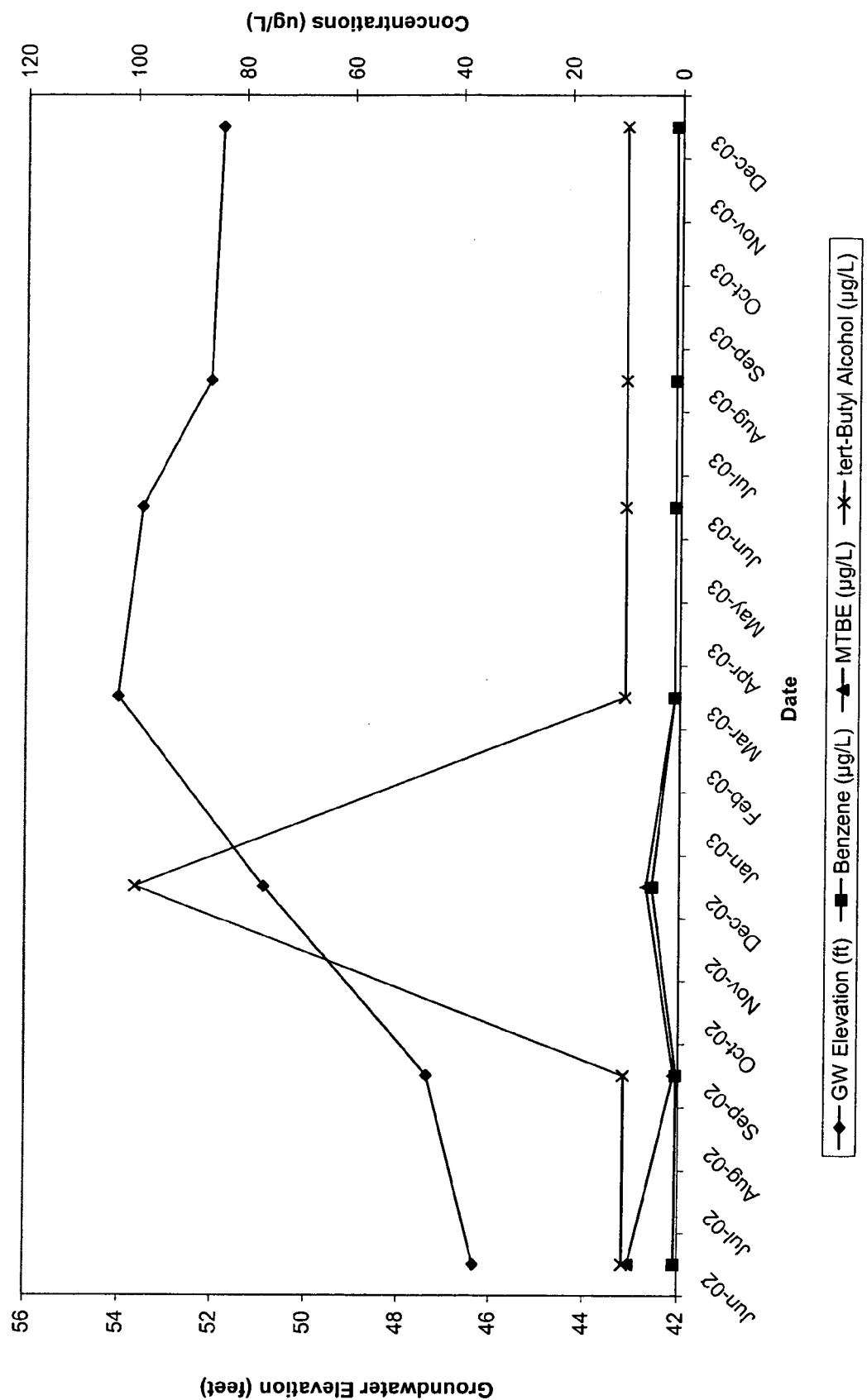

In accordance with the methods of the invention, the conduits dispense reagents that, when reacted together, are beneficial in the treatment of contaminants, particularly pollutants, that reside in the water, soil, sediment or mixtures thereof. As used herein, the term "reagents" when used in connection with the materials dispensed by the conduits, may refer to agents that react together to form a chemical oxidizing agent that can react with organic molecules dissolved or suspended in the groundwater, soil, sediment or mixture thereof, preferably to oxidize such organic molecules. In some embodiments of the invention, one of the reagents is ozone, or a mixture of ozone with one or more of air or oxygen, and the other reagent is hydrogen peroxide. However, it will be appreciated that the present invention is amendable to any reagents that react together to effect a reduction in amounts of contaminant in the groundwater, soil, sediment or mixture thereof, for example by oxidation. Thus, each of the reagents dispensed by the conduits can contain one, or more than one, chemical agent. In the embodiment of FIG. 1, a reagent including hydrogen peroxide is dispensed through conduit 12, and ozone is dispensed through conduit 14. In the embodiment of FIG. 2a and FIG. 2b, a reagent including hydrogen peroxide and/or air is dispensed through conduit 44.

Any of the many known chemical agents useful for remediation can be used with the systems and methods described herein. For example, and without limitation, reagents include hydrogen peroxide, ozone, oxygen, air, sodium permanganate, potassium permanganate, calcium peroxide, persulfate, catalysts (e.g., iron solutions), nutrients including sources of nitrogen, phosphorus and potassium, carbon, acids, and water solutions of one or more of the preceding. Reagents can be injected simultaneously (e.g., both air and hydrogen peroxide are injected at the same time) or sequentially (e.g., hydrogen peroxide is injected into the surroundings followed by injection of ozone).

In some embodiments, the systems and methods of the invention can be used in conjunction with soil vapor extraction methods known in the art, for example, in which a vacuum is applied to the site of contamination to physically enhance volatilization and desorption of the contaminants from soil and/or groundwater. Thus, soil vapors are captured above the water table, including vapors produced during the chemical oxidation process.

In some embodiments, the chemical oxidation systems and methods of the invention can be utilized in above-grade tanks or containers to treat soil and/or groundwater, preferably using nested injection points, diffusers or spray nozzles. In such embodiments, contaminated soil and/or groundwater is removed from the ground and placed in container 29 (see FIG. 2A. The present chemical oxidation methods are then utilized to remediate the contaminants in the soil and/or groundwater. The locations and placement of the injection points, diffusers or spray nozzles can be varied to achieve the maximum effect.

In some embodiments, the chemical oxidation systems and methods of the invention can be utilized in in-situ or ex-situ septic systems, evapotranspiration beds, or other locations to reduce or eliminate biological/microorganism accumulation and fouling, preferably using injection ports, diffusers or spray nozzles. In such embodiments, the present chemical oxidation methods are utilized to oxidize the biological growth in the said in-situ or ex-situ system. The locations and placement of the injection ports, diffusers or spray nozzles can be varied to achieve the maximum effect.

In some embodiments, the reagent can contain ozone together with one or more additional fluids or gases, for example to increase the flow rate of the ozone. Thus, in some embodiments, ozone can be injected with, for example, oxygen, air, or combinations thereof to achieve greater flow rates and a greater radius of influence.

In some embodiments, the reagent can contain hydrogen peroxide with one or more additional gases such as air, for example, to increase the flow rate of hydrogen peroxide and/or increase the radius of influence.

The chemical oxidation systems and methods of the invention provide the rapid degradation of dissolved contaminants in water, particularly groundwater, soils and sediment bodies. Contaminants are agents that directly, or indirectly, have a detrimental effect on the environment or a living creature (e.g., human, animal, insect, plant). Contaminants include volatile organic compounds (VOCs), non-volatile organic compounds (NVOCs), polyaromatic hydrocarbons (PAHs) (e.g., anthracene, fluoranthene, phenanthrene, naphthalene); polychlorinated biphenyls (PCBs)(e.g., arochlor 1016); chlorinated solvents, including chlorinated hydrocarbons (e.g., tetrachloroethene, cis- and trans-dichloroethene, vinyl chloride, 1,1,1-trichloroethane, 1,1-dichloroethane, 1,2-dichloroethane, methylene chloride, chloroform, etc.); methyl tertiary-butyl ether (MTBE); and BTEX (e.g., benzene, toluene, ethylbenzene, xylenes, and the like); tert-butyl alcohol (TBA); explosive residues (e.g., nitrobenzenes, RDX, trinitrotoluene (TNT), etc.); excessive biological growth/accumulation; and chlorinated pesticides (e.g., chlordane, heptachlor, etc.). The systems and methods herein are useful in remediating such contaminants, including any one, or combination of, those described herein.

In accordance with some embodiments of the invention, the reaction of ozone-containing and hydrogen peroxide-containing reagents outside of the bore hole produces a further reagent, hydroxyl radicals, which are powerful oxidizers. While not wishing to be bound by any particular theory, it is believed that individually, ozone and hydrogen peroxide will react with organic contaminants due to their relatively high oxidation potentials (2.07 volts and 1.77 volts, respectively). Since hydroxyl radicals have a higher oxidation potential (2.80 volts) than either ozone or hydrogen peroxide individually, and due to the rapid chemical reactions involved, it is beneficial to introduce hydrogen peroxide and ozone together in saturated soils. The formation of hydroxyl radicals through the introduction of ozone and hydrogen peroxide is performed by the following reaction:

$$2O_3 + H_2O_2 \rightarrow 2OH + 3O_2$$

Hydrogen peroxide will also individually react with iron to form hydroxyl radicals. In some embodiments, one or more reagents injected by the conduits can include iron solutions, which can enhance the oxidation of contaminants.

The hydroxyl radical is a strong oxidizer that reacts with organic contaminants, breaking them down to carbon dioxide, oxygen and water. For example, in accordance with the methods of the invention, MTBE is broken down to carbon dioxide and water. The reaction occurs very rapidly. In accordance with the present invention, ozone injection and the overall oxidation process enhance dissolved oxygen concentrations in groundwater (typically up to 15 to 25 milligrams per liter [mg/L]). Although ozone will destroy most microorganism growth in the vicinity of each injection point, the dissolved oxygen effects are typically observed at greater distances than the area of ozone influence. Therefore, high dissolved oxygen concentrations are typically observed downgradient of the zone of oxidation. The elevated dissolved oxygen concentrations will promote the natural degradation of remaining dissolved contaminants that are biodegradable. It will be appreciated that enhanced effectiveness of the system can be achieved with more permeable soil conditions, which facilitate the distribution of the ozone into saturated soils.

In some embodiments, the system includes ozone and hydrogen peroxide injection systems with individual controls for each injection well (i.e., conduit). One limitation of many existing ozone injection systems is their inability to inject a significant flow rate of ozone—it is beneficial to have a flow rate capable of aggressively distributing the ozone into the subsurface, particularly when utilizing numerous injection points. However, most currently utilized systems are limited to a total ozone flow rate of less than two or three scfm. Another limitation of previous systems is the ozone concentration; some systems only deliver 100 to 900 parts per million volume (ppmv) of ozone. The above limitations are compensated for by certain embodiments of the present invention. For example, some embodiments advantageously provide high rates of ozone flow during the treatment regime by supplying the ozone stream from an ozone generator as a mixture of ozone, and one or more of oxygen and air.

To achieve greater distribution, and thus afford an effective radius-of-influence at each injection point, in some embodiments, the ozone/oxygen or hydrogen peroxide stream is combined with compressed atmospheric air. The total flow rate of the ozone, oxygen, and compressed air stream is high enough to create a radius-of-influence of greater than 15 feet at each injection location at certain sites, to remediate absorbed phase contaminants in, for example, surrounding saturated soils in addition to dissolved-phase contaminants. Typically, a system according to the first aspect of the invention can deliver up to about 40 scfm of ozone, oxygen, and/or air. In some embodiments, the gas flows through the conduit at a flow rate between about 0.1 and 150 scfm. The ozone concentration of the injected gas stream can be between 1,000 ppmv and 100,000 ppmv, depending on cycling frequencies of the compressed air system. In systems according to the second and third aspects of the invention, the systems can deliver up to about 30 scfm of gas such as ozone, oxygen, and/or air.

In some embodiments, the present systems offer numerous advantages over existing technologies. For example, the combination of hydrogen peroxide and compressed air allows for aggressive, short-term remediation events where large volumes of hydrogen peroxide are introduced into the contaminated area over a relatively short period of time. Some existing technologies rely on injection of hydrogen peroxide without additional means for increasing its radius of influence, requiring greater volumes of hydrogen peroxide or longer time periods for remediation than the present systems. Accordingly, the combination of compressed air and hydrogen peroxide overcomes many of the difficulties associated with prior remediation systems and maximizes the effectiveness of the injected reagents.

Thus, the present invention provides remediation by at least five mechanisms: chemical oxidation via ozone injection; chemical oxidation via hydrogen peroxide injection; chemical oxidation via hydroxyl radical reactions; enhanced bioremediation via oxygen injection and oxygen-producing chemical reactions (high dissolved oxygen levels); and mass transfer of volatile organic compounds via air injection.

In order that the invention disclosed herein may be more efficiently understood, examples are provided below. It should be understood that these examples are for illustrative purposes only and are not to be construed as limiting the invention in any manner.

EXAMPLES

Example 1

Case Study

A combination of air/oxygen injection and chemical oxidation (via ozone/oxygen and hydrogen peroxide injection) remediation technologies in accordance with the invention were used to remediate a contaminated site, specifically, to reduce soil and groundwater concentrations of BTEX, MTBE, TBA, and TAME associated with a subsurface release of gasoline at the Country Store site on 11 Main Street in Kenton, Del.

Remediation System Overview

The chemical oxidation system activated fully following a five-day start-up period. Remedial system operation & maintenance (O&M) services were performed on a weekly basis.

Domestic Well Monitoring Results

Table 1 (FIG. 4a–e) summarizes the historical domestic well analytical data collected to date at the site. As shown on Table 1, concentrations of benzene, total xylenes, MTBE, TBA, and TAME were detected in the following domestic wells:

32 East Commerce Street—Old Domestic Well:

Benzene was detected at a concentration of 1 microgram per liter (µg/L) on Jan. 16, 2002, and has remained non-detectable through March 2003.

Total xylenes were detected at a concentration of 1 µg/L on Jan. 16, 2002, and have remained non-detectable through March 2003.

MTBE was detected at a concentration of 2,000 µg/L on Jan. 16, 2002, and has decreased to 4 µg/L on Mar. 18, 2003.

TBA was detected at a concentration of 60 µg/L on Jan. 16, 2002, and has remained non-detectable through March 2003.

TAME was detected at a concentration of 220 µg/L on Jan. 16, 2002, and has decreased to non-detectable on Mar. 18, 2003.

87 East Commerce Street—Influent (Pre-Carbon Treatment):

MTBE was detected at a concentration of 4 µg/L on Jan. 16, 2002, and remains at a concentration of 1 µg/L as of Dec. 8, 2003. It is important to note that the concentration of MTBE in this well increased to a high concentration of 29 µg/L in June 2002, and the MTBE concentration in this well continued to decrease following activation of the remediation system in September 2002.

TAME has been sporadically detected at a concentration of 1 µg/L on several occasions throughout 2003.

170 Frazier Street Influent (Pre-Carbon Treatment):

MTBE was detected at a concentration of 7 µg/L on Jan. 4, 2002, and remains at a concentration of 6 µg/L as of Jul. 14, 2003.

TAME has been sporadically detected at a concentration of 1 to 3 µg/L on several occasions throughout 2002 and 2003.

212 East Commerce Street:

MTBE was detected one time during 2002 at a concentration of 2 µg/L on Jun. 24, 2002.

256 East Commerce Street:

MTBE has been consistently detected at a concentration of 2 to 3 µg/L throughout 2003.

Groundwater Monitoring Results

Table 2 (FIG. 5a–d) summarizes the historical recovery and monitoring well analytical data collected to date at the site. Overall, as shown on Table 2, concentrations of each compound analyzed have decreased since activation of the remediation system.

Isoconcentration maps were prepared for total BTEX, MTBE, and dissolved oxygen concentrations in groundwater to illustrate the plume before remediation activities were initiated at the site, and after five months of active remediation at the site. FIG. 6 represents total BTEX concentrations in groundwater prior to remediation and after five months of remediation, respectively. FIG. 7 represents MTBE concentrations in groundwater before remediation and after five months of remediation, respectively. FIG. 8 represents dissolved oxygen concentrations in groundwater before remediation and after three months of remediation, respectively.

As shown on each of the isoconcentration maps, the distribution of total BTEX and MTBE dissolved concentrations in groundwater have been significantly reduced by the remediation efforts at the site. In addition, dissolved oxygen concentrations have increased significantly.

Hydrographs (FIGS. 9a–e) were also prepared for select wells that show groundwater elevations, total BTEX concentrations, and MTBE concentrations with respect to time. The trends exhibited in each well were shown to be decreasing concentrations over time. These data also suggest that the remediation efforts have been effective in remediating the source (vicinity of MW-1 and RW-1), as well as the down-gradient areas of the plume (vicinity of MW-13).

Remediation Results

Chemical Oxidation System

The chemical oxidation process uses ozone (with oxygen and compressed air) and hydrogen peroxide injected separately into the subsurface via the ten stainless steel injection points (INJ-1 through INJ-10). Oxygen, ozone, and hydrogen peroxide are injected into the subsurface, where reactions take place to form hydroxyl radicals, which are known to be powerful oxidizers. The oxidation process breaks down contaminants including BTEX, MTBE, and TBA into by-products of carbon dioxide, and water. The process is carefully monitored and controlled to ensure safe and effective application.

A summary of the injection pattern is presented in FIG. 3. As summarized, the injection pattern alternates among any combination of the gas streams (i.e. compressed air only, oxygen/ozone only, etc.) to any combination of injection wells. The injection pattern was modified three times since system activation in order to focus remediation efforts.

The system is capable of delivering a total flow rate of 17 scfm of oxygen/ozone and compressed air. At typical operating pressure (30–40 psi), the flow rate of the compressed air is 16.5 cfm and 0.7 cfm for the oxygen/ozone stream. Since activation of the chemical oxidation system through three months of remediation, the oxygen/ozone system has had an uptime of greater than 95%. Concentrations of ozone injected into the subsurface ranged from 3,700 parts per million by weight (ppm wt) to 75,000 ppm wt, depending on cycling combinations with the compressed air. During this reporting period an average of 5 to 9 lb/day of ozone were injected into the subsurface.

The hydrogen peroxide system included a holding tank and injection pump. The rate of injection varied with the number of valves (injection wells) open. It ranged from 14.3 milliliters per minute (mL/min) to 42 mL/min of 35% $H_2O_2$ solution at a pressure of approximately 18 psi. Through three months of remediation, the hydrogen peroxide system has had an up-time of greater than 90%, injecting approximately 575 gallons of hydrogen peroxide into the subsurface.

Periodic monitoring has indicated that the chemical oxidation system has enhanced dissolved oxygen concentrations significantly (up to 20 mg/L at the injection wells and up to 18 mg/L at nearby observation wells) as indicated in Table 3 (FIG. 10a–c). Additionally, an ozone radius-of-influence has been calculated to be up to 25 feet.

Conclusions

Pre-remediation concentrations were observed at 26,300 micrograms per liter (µg/L) for BTEX, 26,500 µg/L for MTBE, and 27,000 µg/L for TBA.

After three months of remediaton, only three of the 45 sampling locations—all three on-site—indicated detectable concentrations of BTEX.

After five months of remediation, BTEX was not detected in any of the sampling locations. Only one well indicated MTBE concentrations greater than 60 µg/L, and only one well indicated TBA concentrations greater than 50 µg/L.

After seven months of remediation, Delaware Department of Natural Resources and Environmental Control (DN-REC) granted approval to deactivate the remediation system and initiate one year of groundwater monitoring for closure.

After one quarter of post-remediation monitoring, BTEX was not detected in any of the 11 sampling locations. Only one well indicated MTBE concentrations above 30 µg/L, and all wells indicated TBA concentrations less than 50 µg/L.

After three quarters of post-remediation monitoring, only one well, located in the original source area, indicated MTBE concentration above 30 µg/L. Concentrations of BTEX, MTBE, and TBA were not detected or were less than 4 µg/L in the other eight compliance sampling locations.

Example 2

Case Study

Chemical oxidation remediation via hydrogen peroxide and air injection was performed at the Former Service Station #2-1279 in Fairview Village, Pa.

Nature and Extent of Hydrocarbon Presence/Site Geology:

The site is characterized by a shallow, unconfined aquifer consisting of approximately 5 to 15 feet of light brown silty and sandy clay with fragments of mudstone and shale overlying a two to three foot zone of semi-competent shale and competent shale bedrock. At the site, petroleum hydrocarbon compounds have been detected in soil and groundwater.

Monitoring Well Network:

Due to the varied construction details of monitoring wells and the occurrence of static water table levels in the unconsolidated material, at the soil-bedrock interface, and in the bedrock, the monitoring well network is separated into two networks: shallow well network and deep well network. The shallow well network is comprised of wells with total depths ranging from 8 feet to 20 feet bgs. The deep well network is comprised of wells with total depths ranging from 27 feet to 40 feet bgs.

Chemical Oxidation Remediation Events Via Hydrogen Peroxicle and Air Injection.

Two one-day chemical oxidation events were conducted at the site during June and August 2003. The chemical oxidation process uses air and hydrogen peroxide injected into the subsurface via existing onsite monitoring wells utilizing systems illustrated in FIG. 2b. In addition to oxidizing petroleum hydrocarbon impact in saturated soil and groundwater, air injection enhances the distribution of hydrogen peroxide in subsurface soil and groundwater, and increases dissolved oxygen levels, further promoting biodegradation. Based on the site characteristics and the location of the impact, hydrogen peroxide was injected into each monitoring well at 5% to 10% solutions and flow rates of approximately two to five gpm.

Summary of Activities—Jun. 26, 2003:

On Jun. 26, 2003, a mobile hydrogen peroxide and air injection system was utilized in the vicinity of former gasoline underground storage tanks (USTs) at the abandoned gasoline station. Hydrogen peroxide was delivered to the site at 35% solution and diluted prior to injection. During the event, dissolved oxygen, pH, and temperature levels were continuously monitored in surrounding monitoring wells as shown in Table 4 (FIG. 11). The injection event was performed utilizing the system illustrated in FIG. 2B. In total, approximately 1,300 gallons of the hydrogen peroxide solution was injected during the event, and compressed atmospheric air was delivered at a flow rate of approximately 5 scfm to 15 scfm at pressures ranging from 5 psi to 14 psi.

Figure 12A:
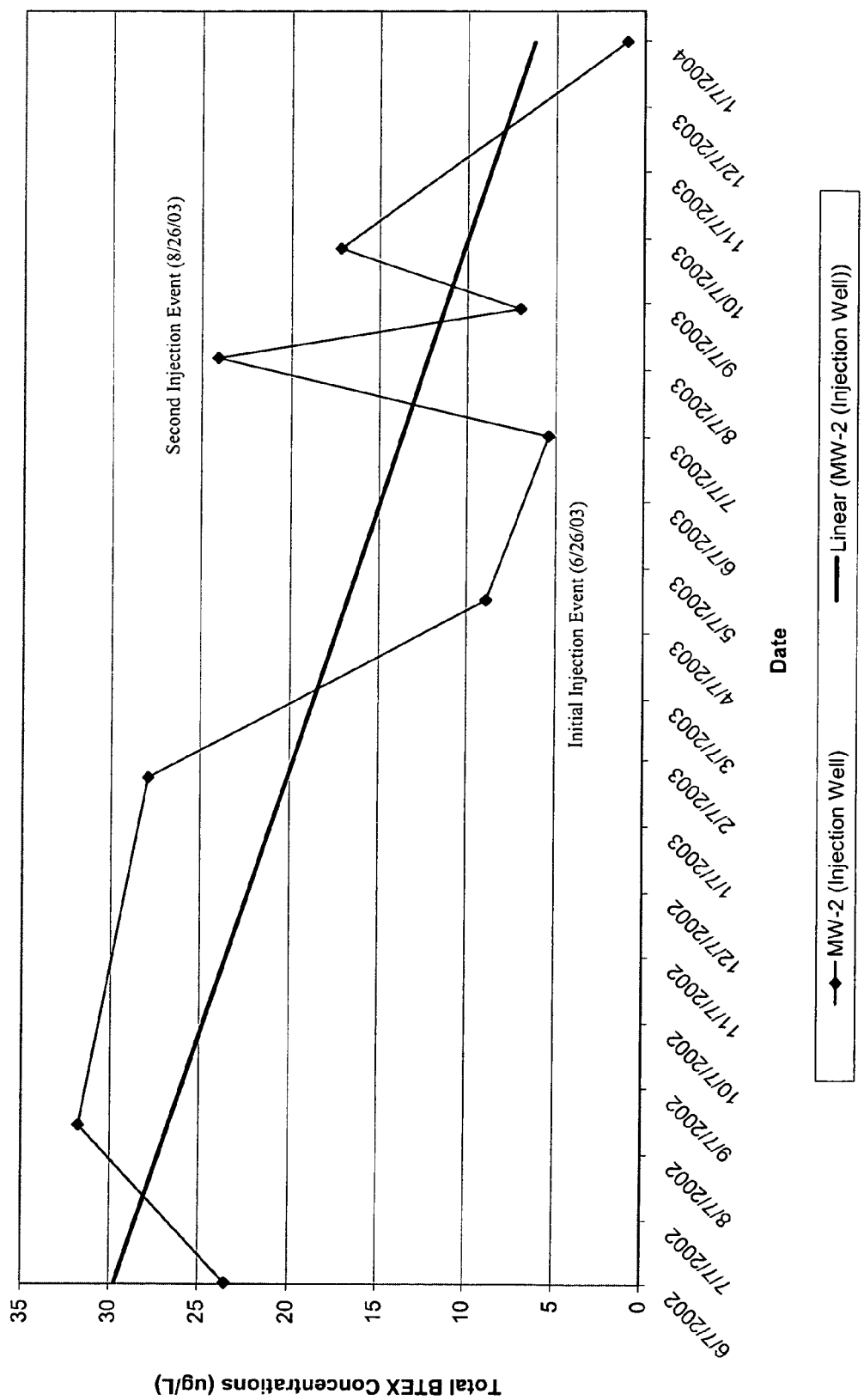
FIGS. 12a–s show the concentration trends and results at the site of remediation in Example 2.
Figure 12B:
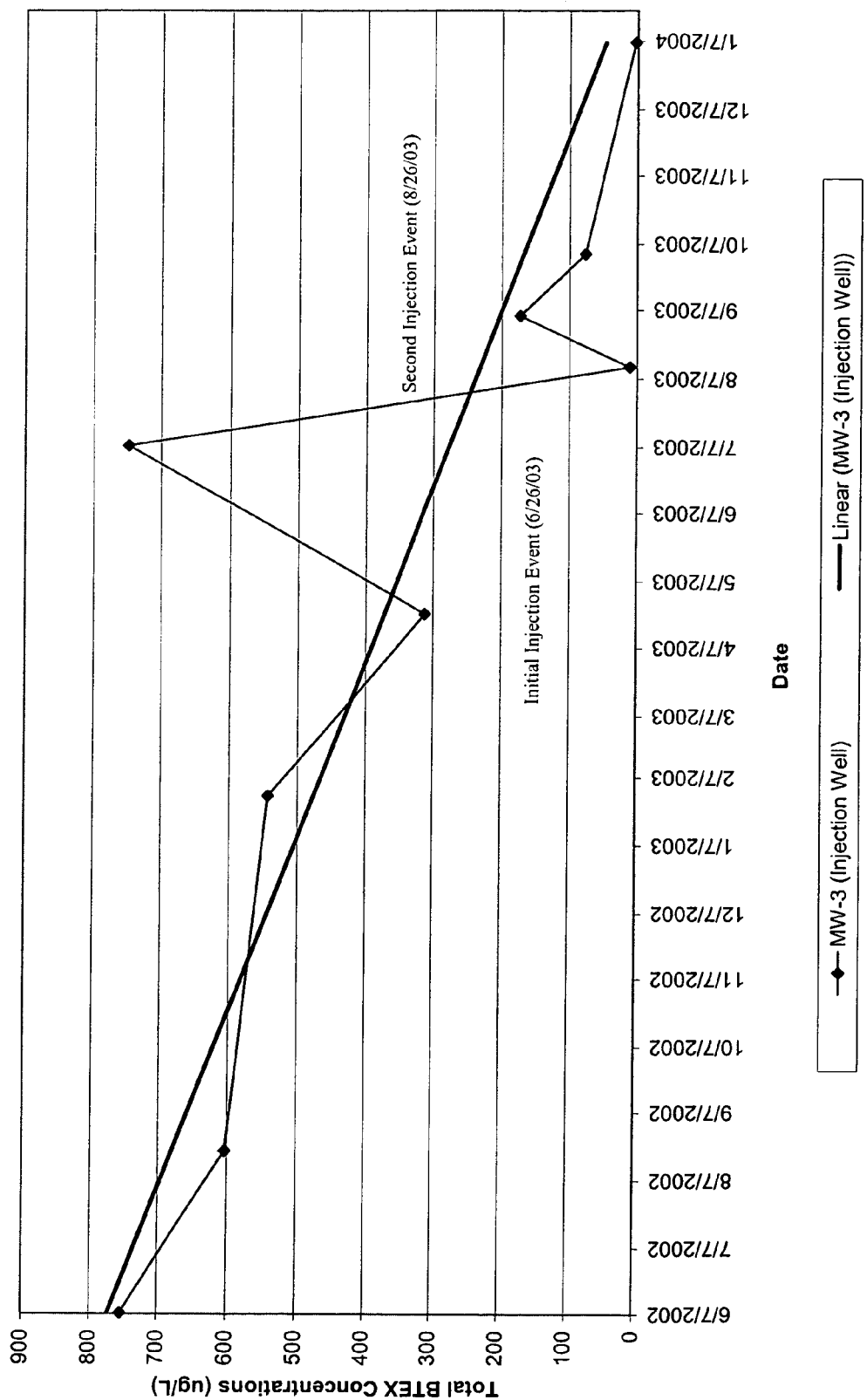
Figure 12E:
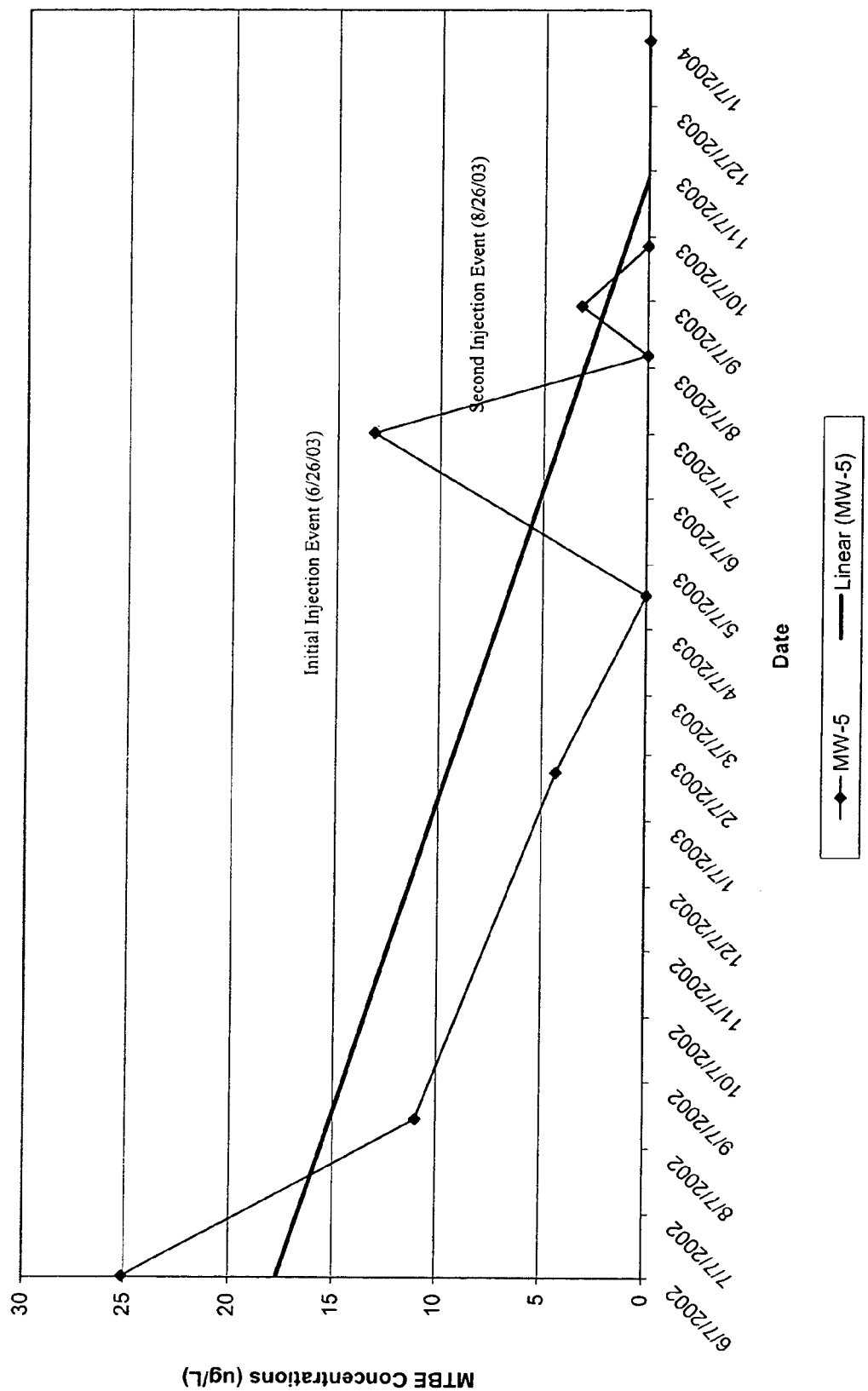
Figure 12H:
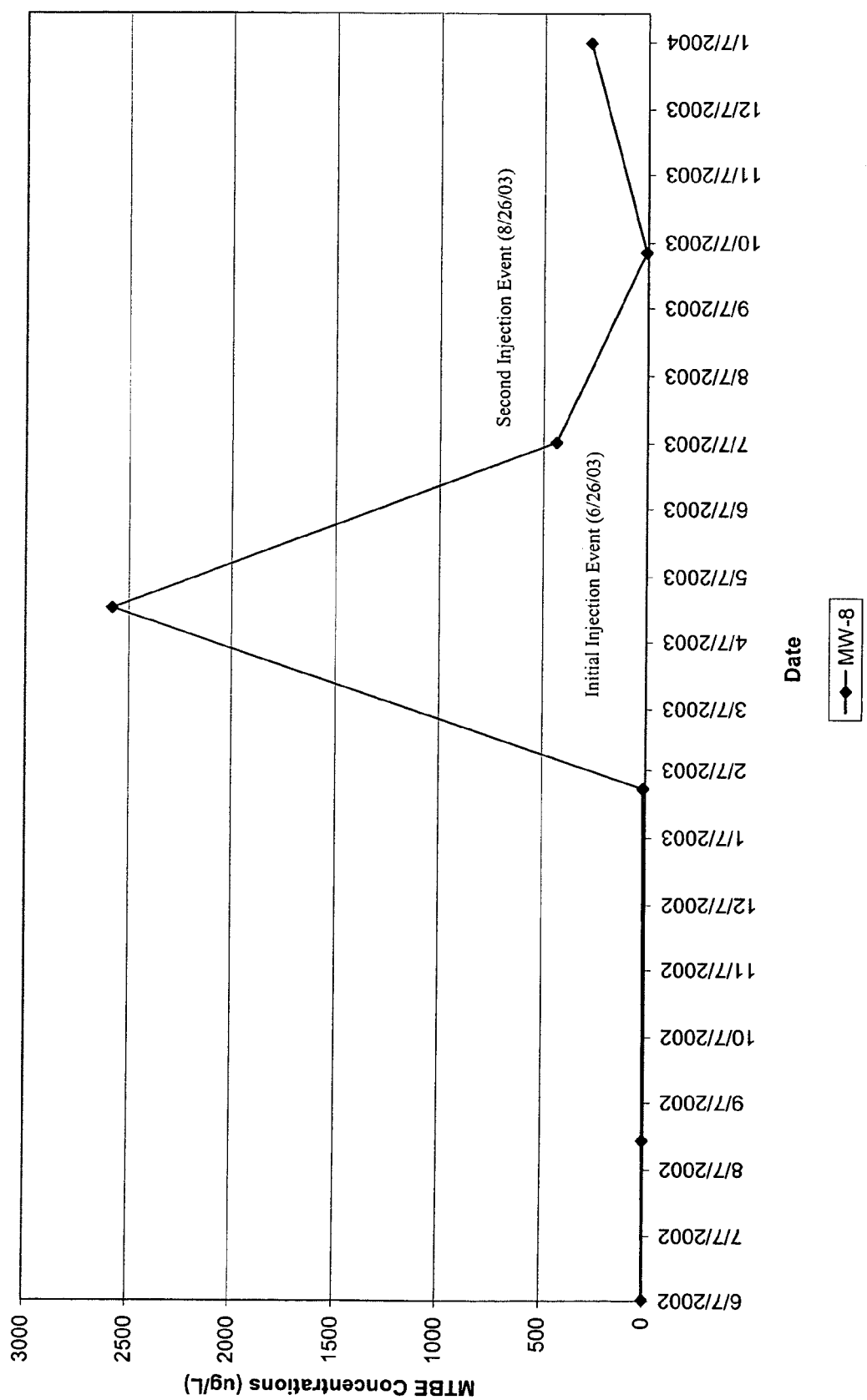
Figure 12I:
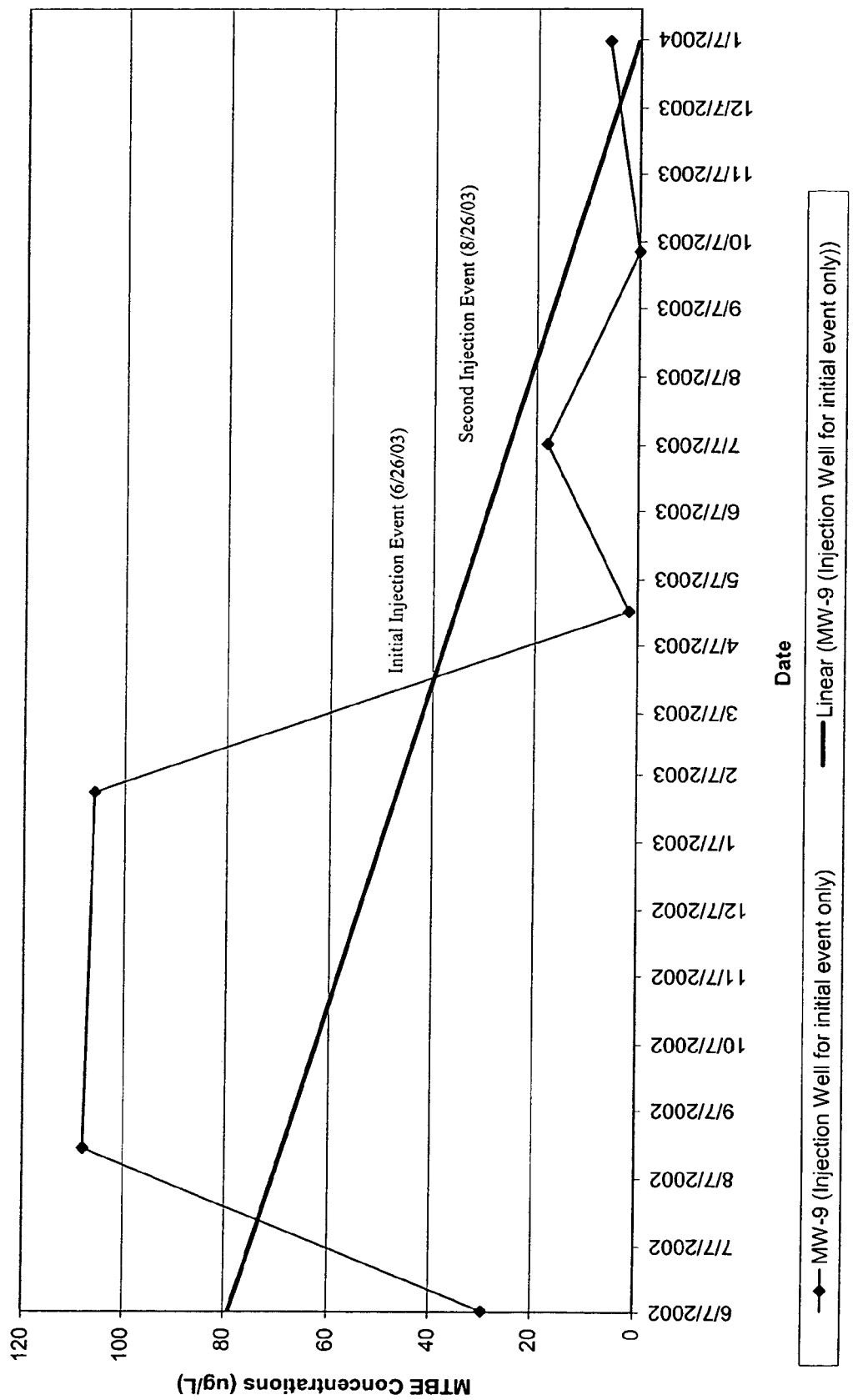
Figure 12J:
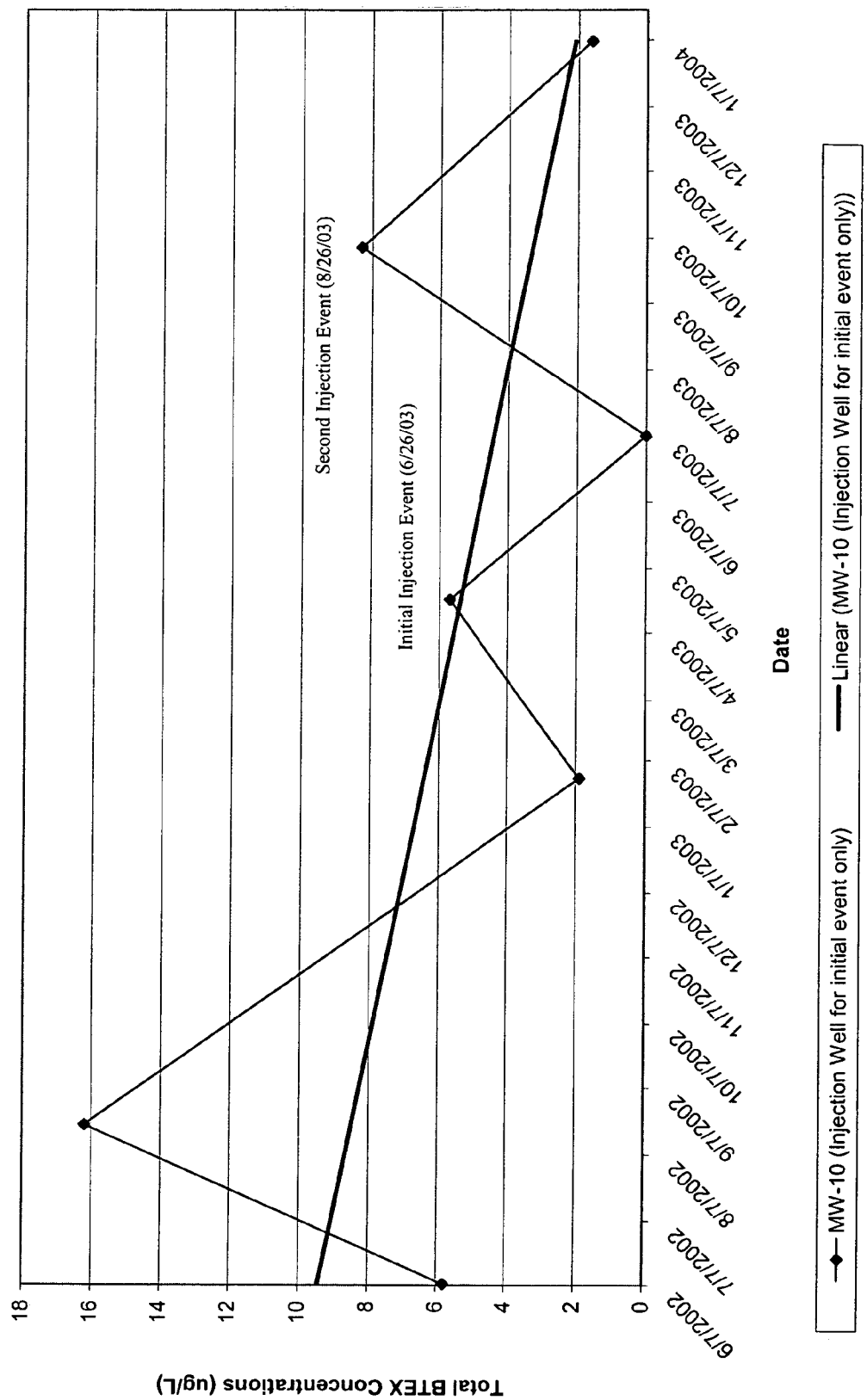
Figure 12K:
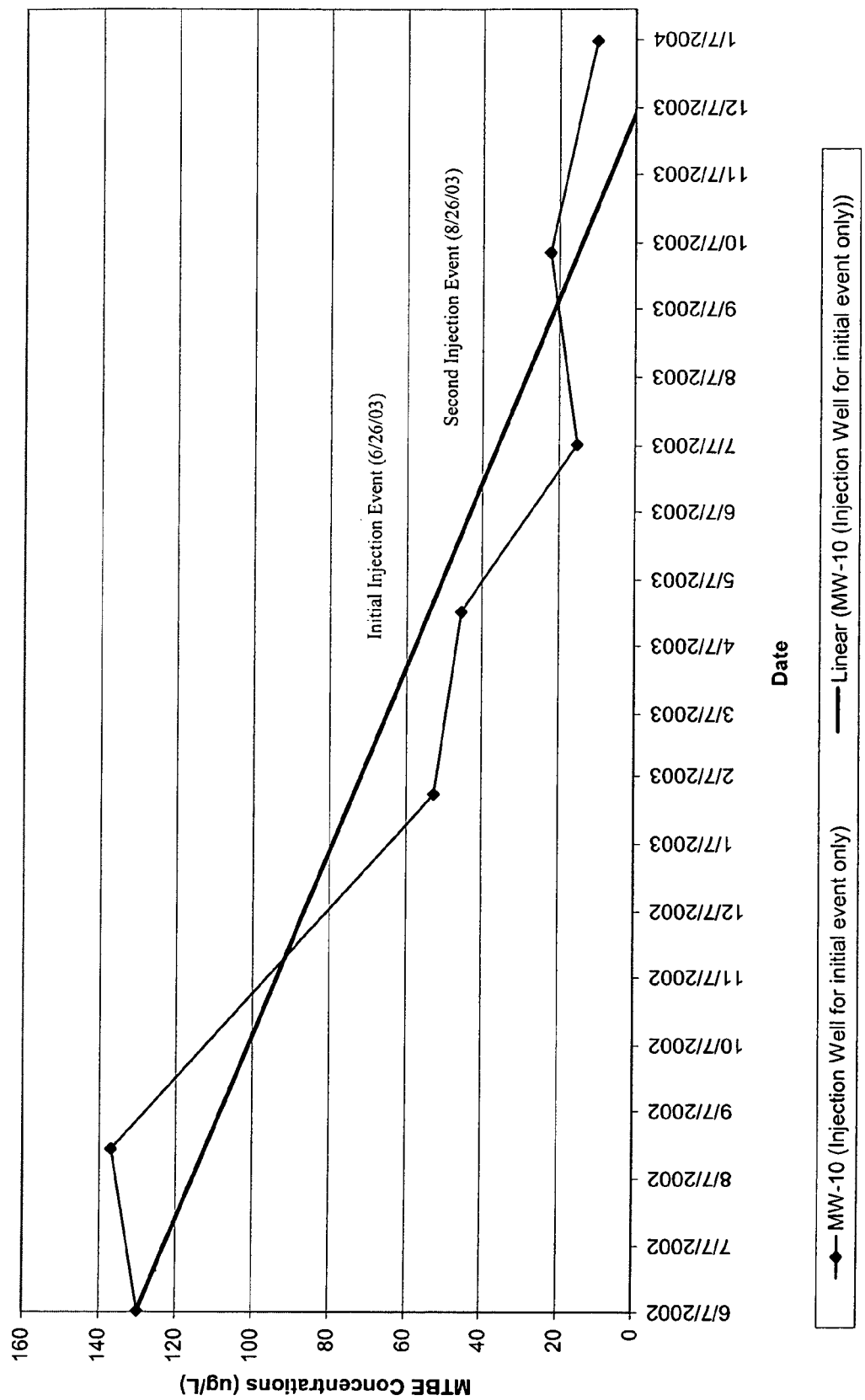
Figure 12I:
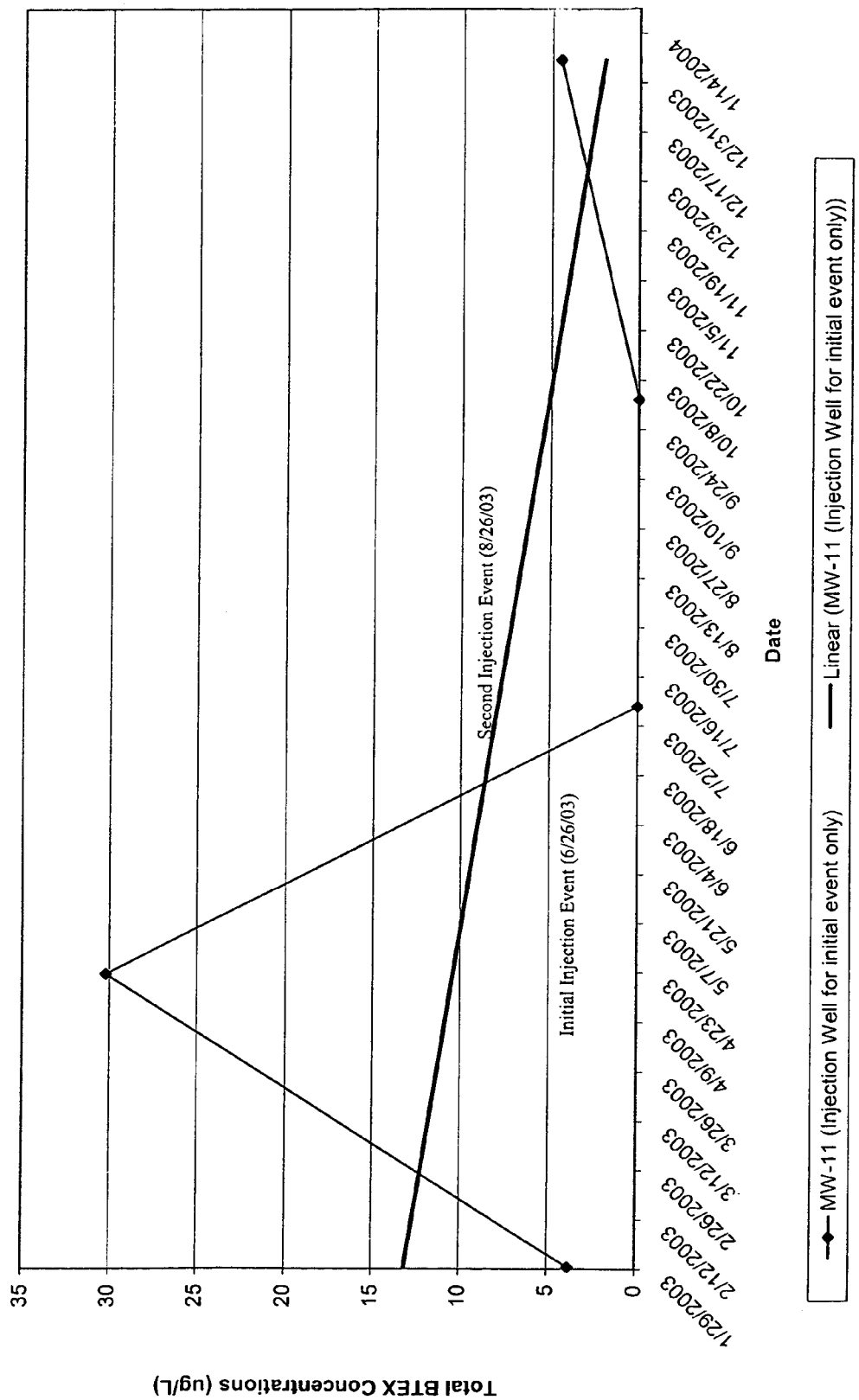
Figure 12M:
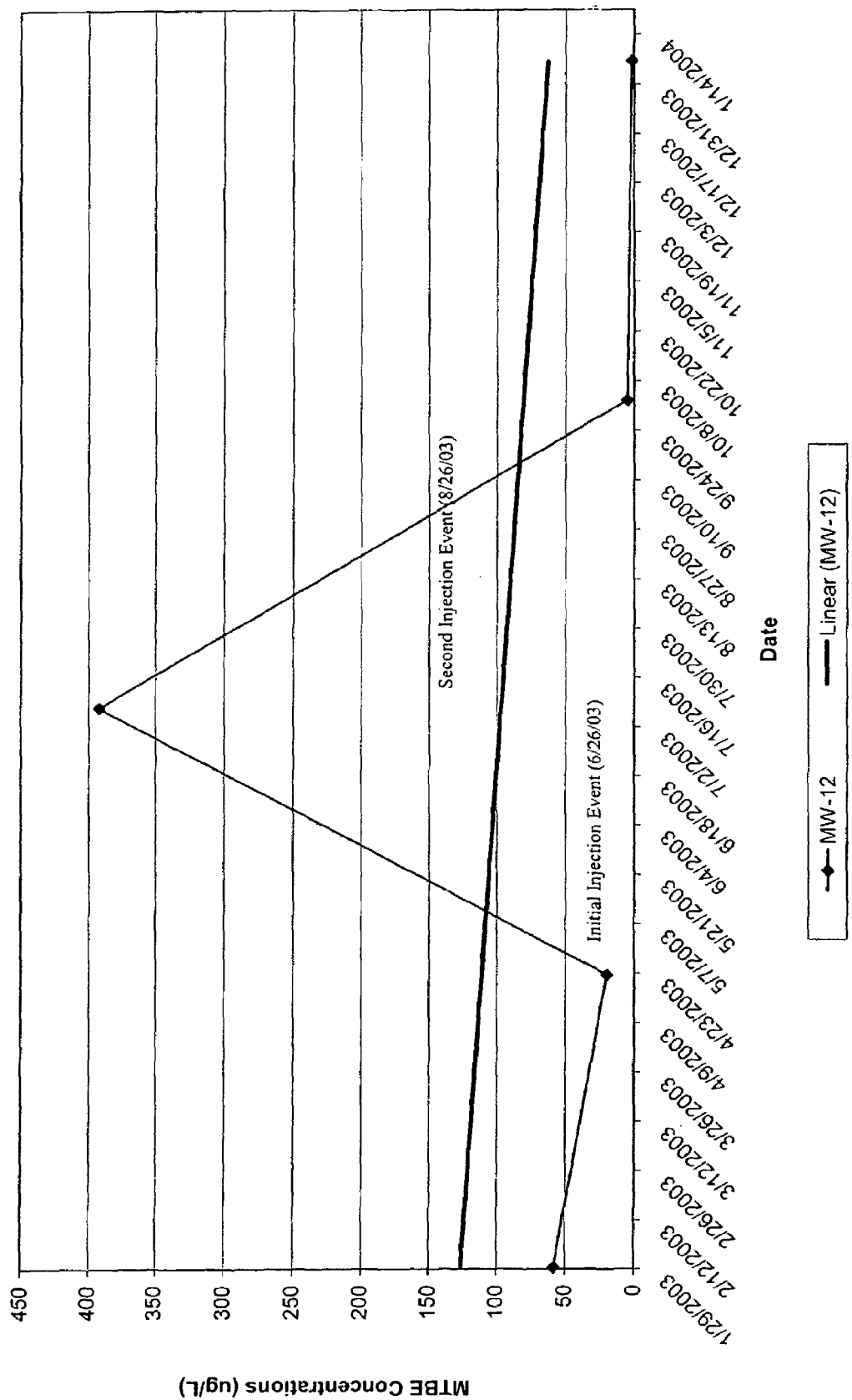
Figure 12O:
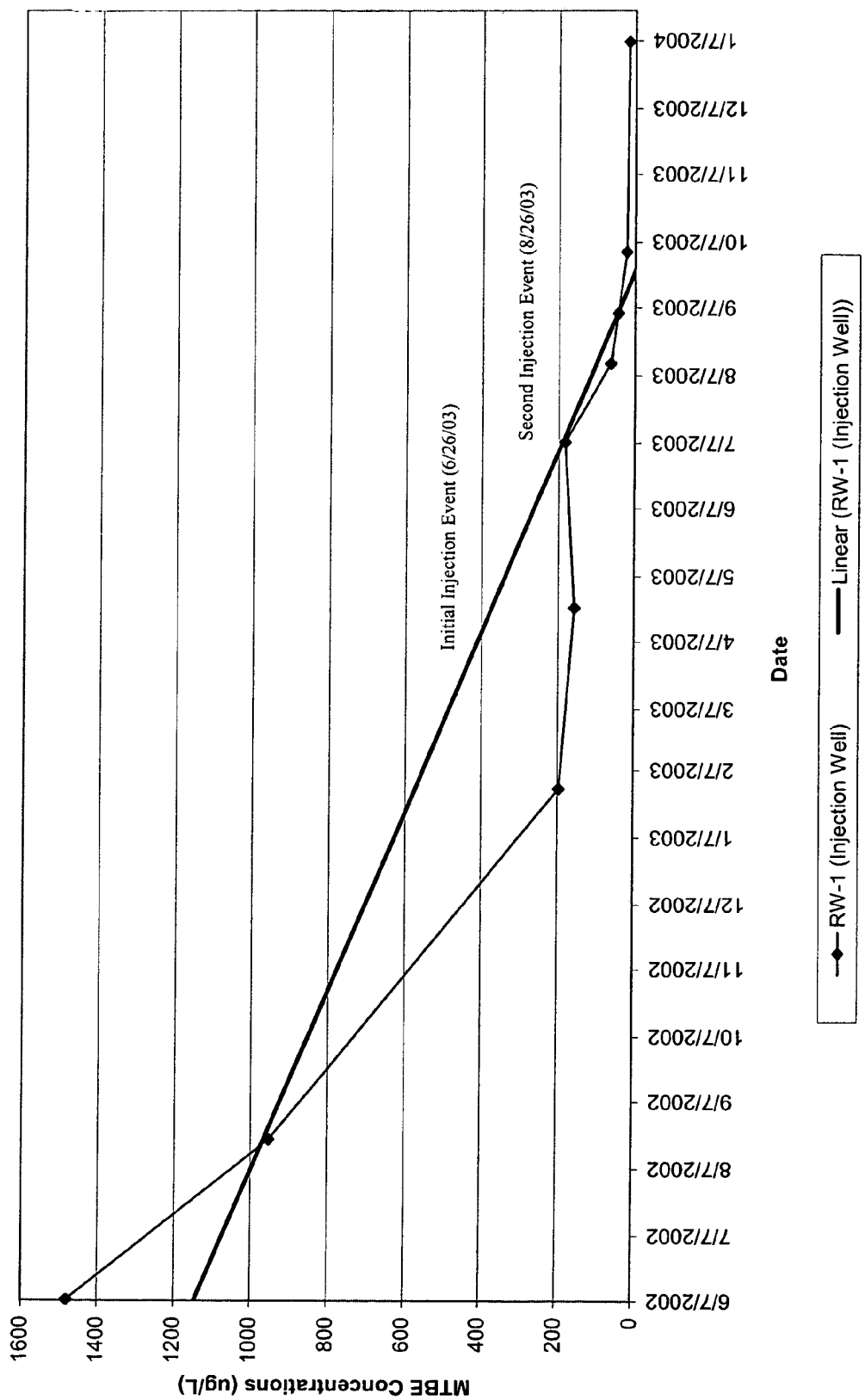
Figure 12P:
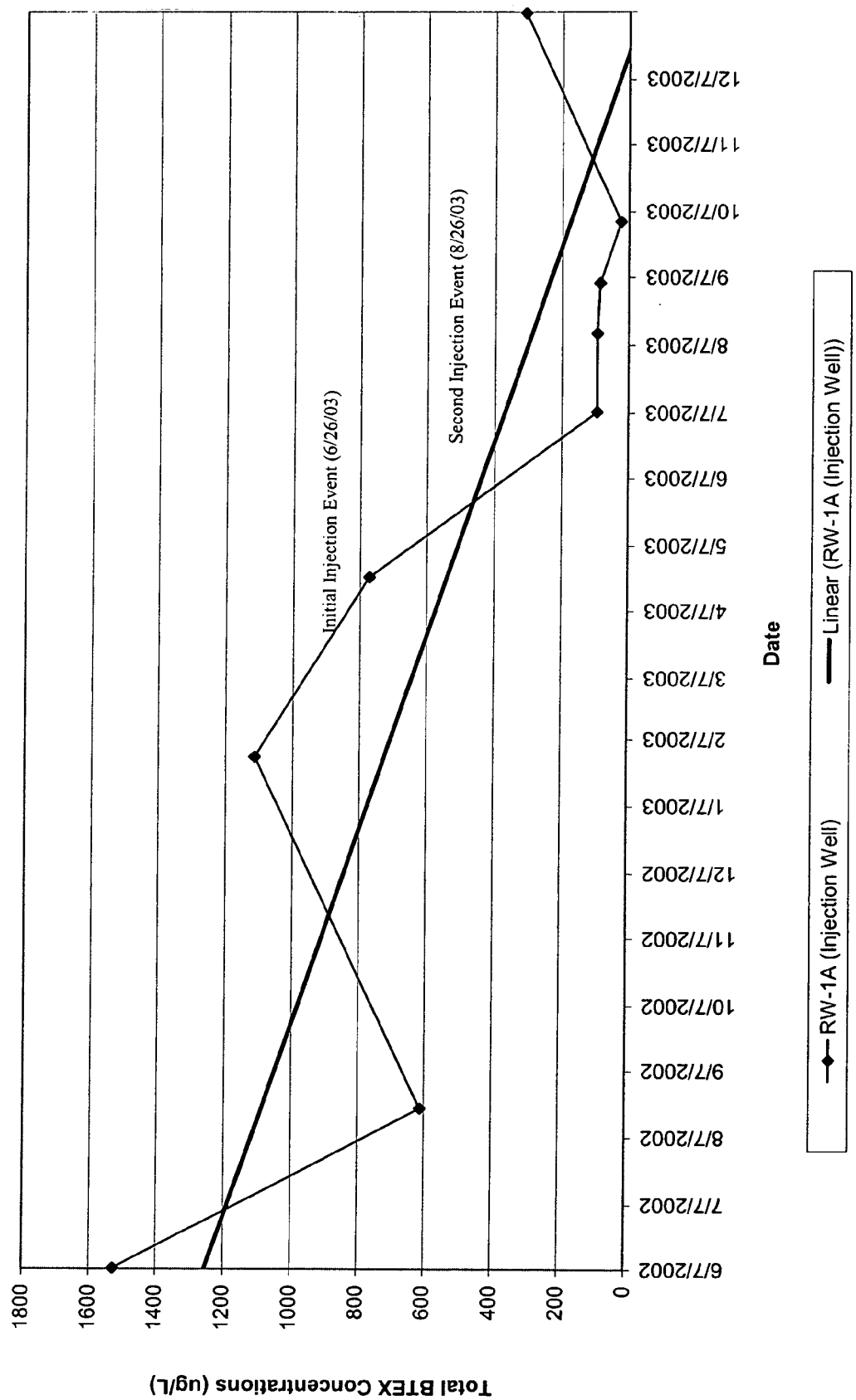
Figure 12Q:
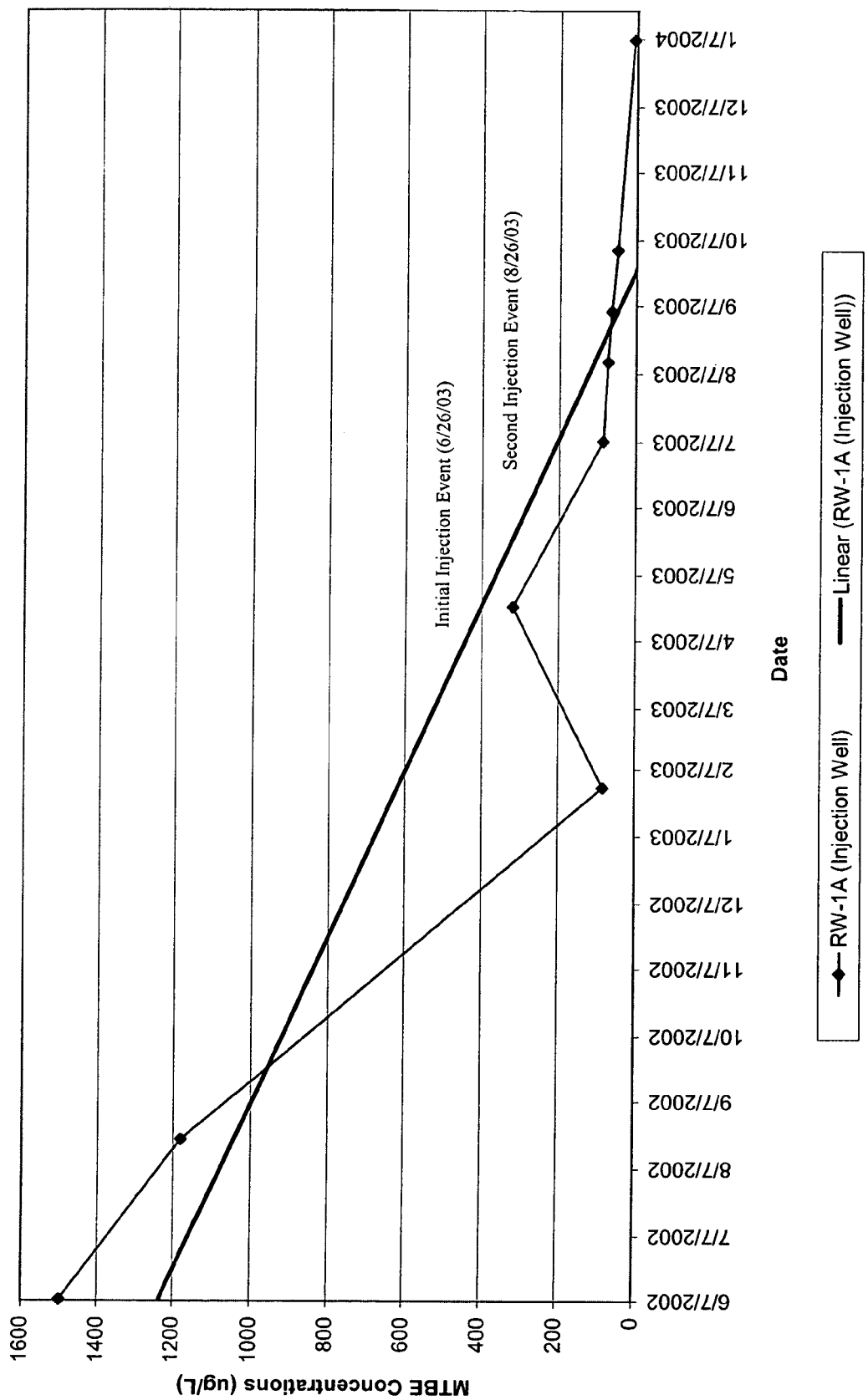
Figure 12R:
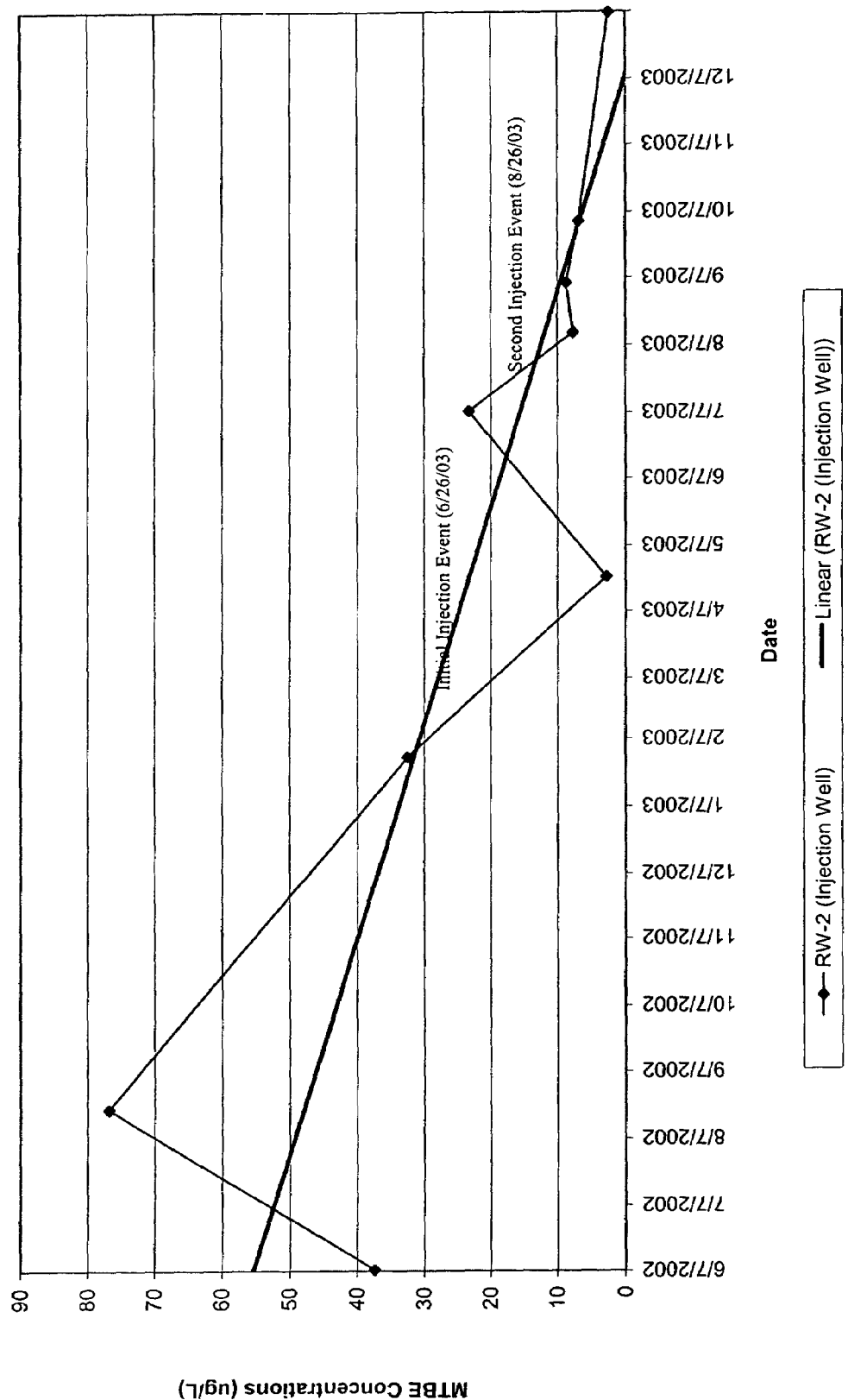
Figure 12S:
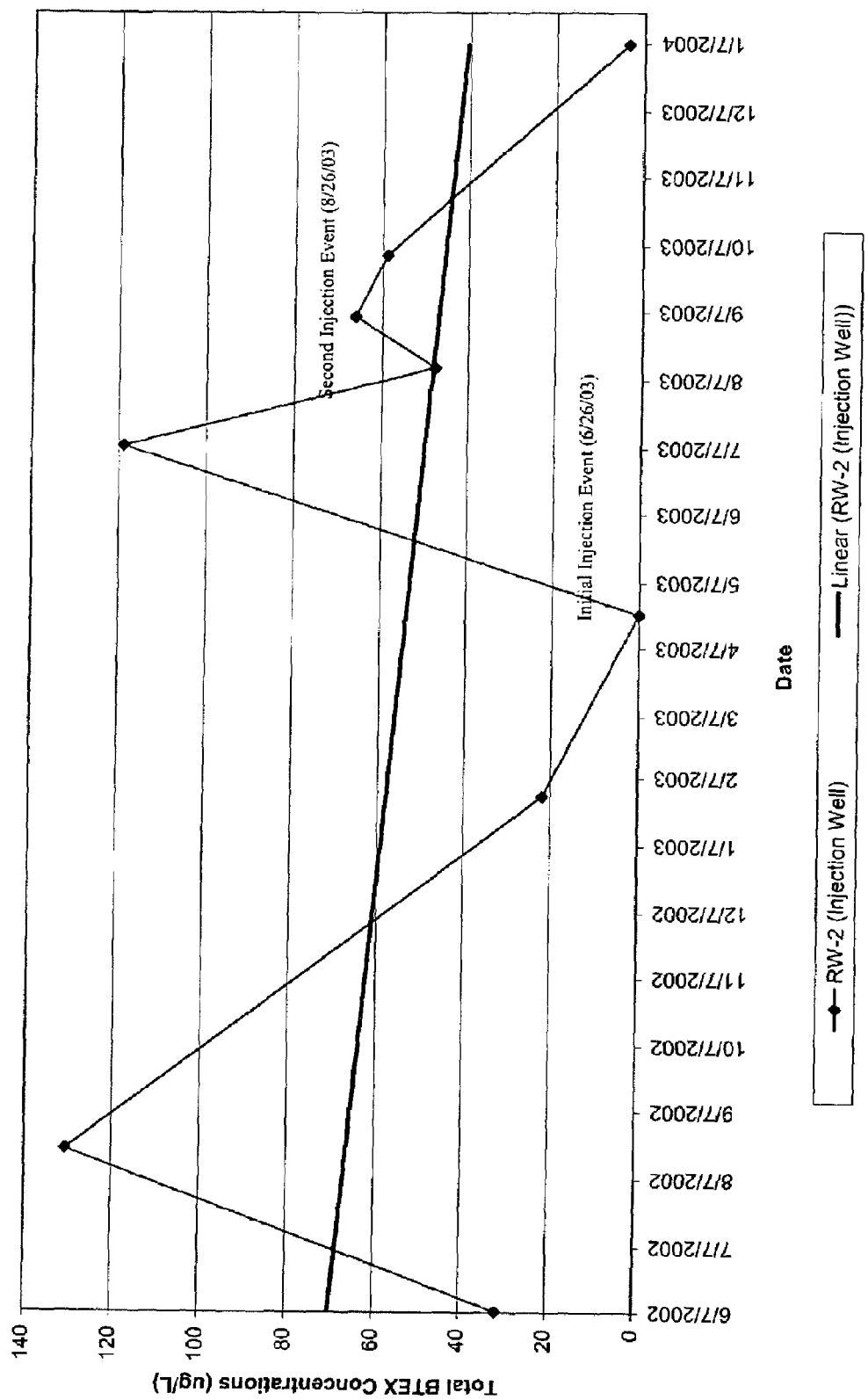
Figure 13C:
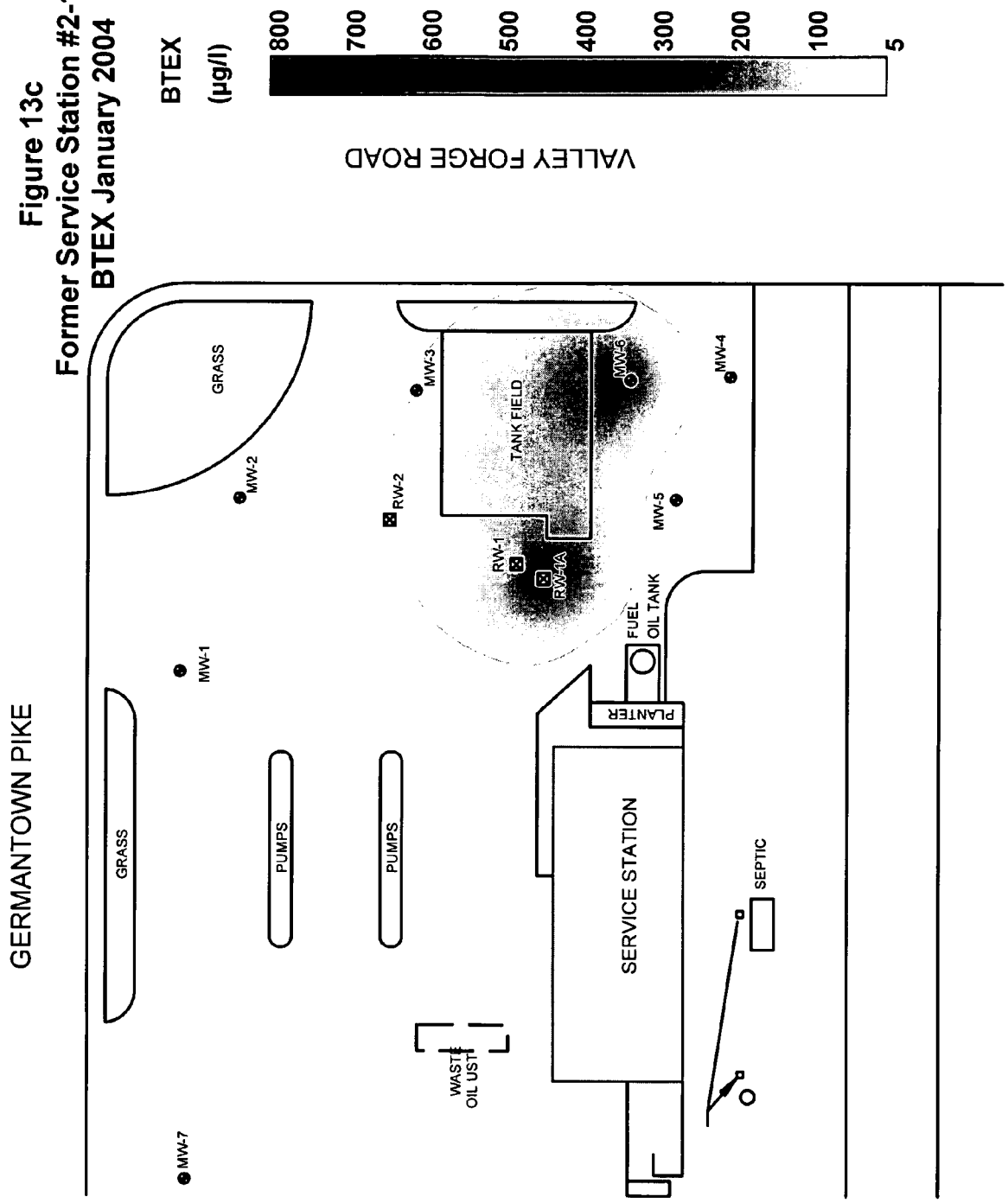
Figure 13D:
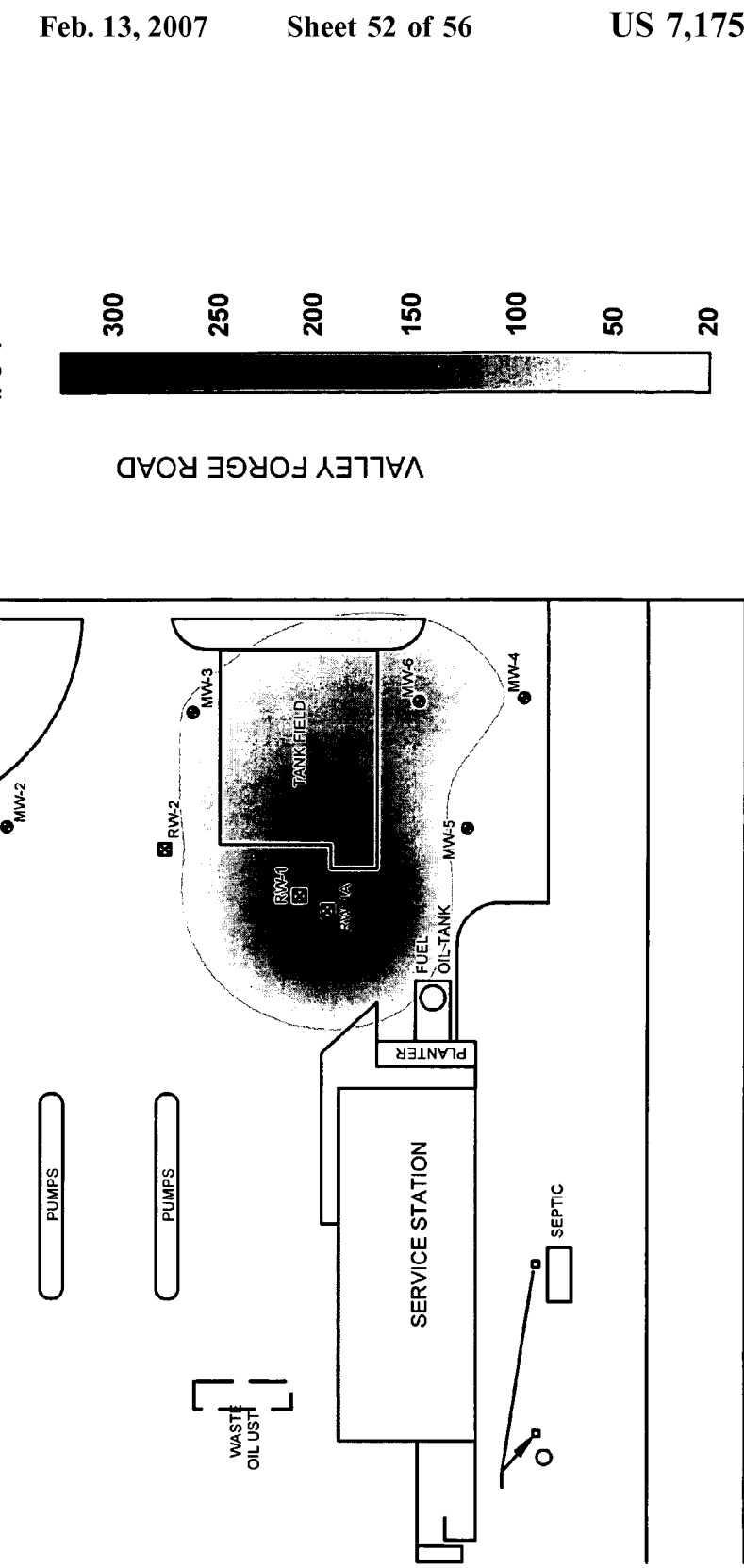
Figure 13E:
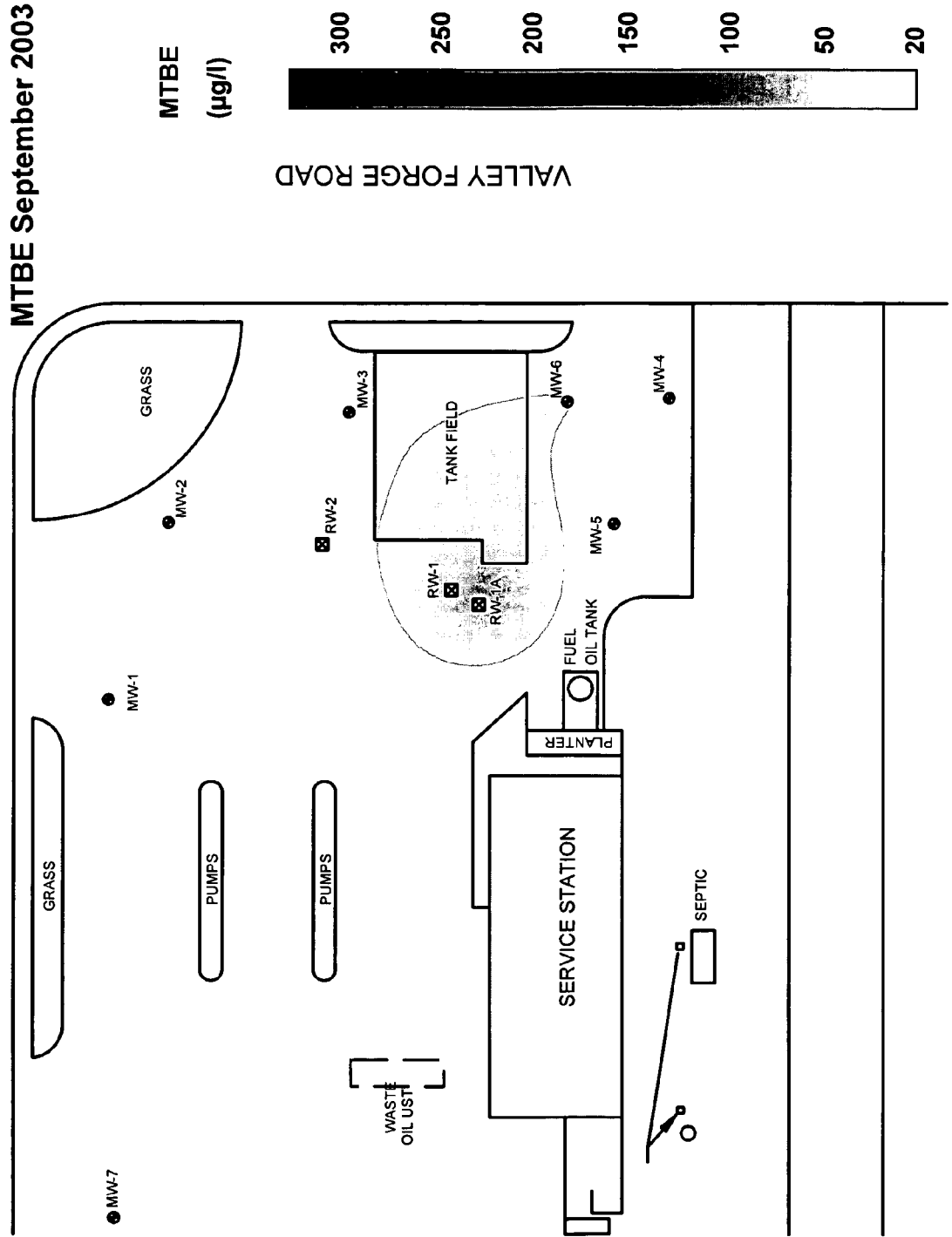
Figure 13F:
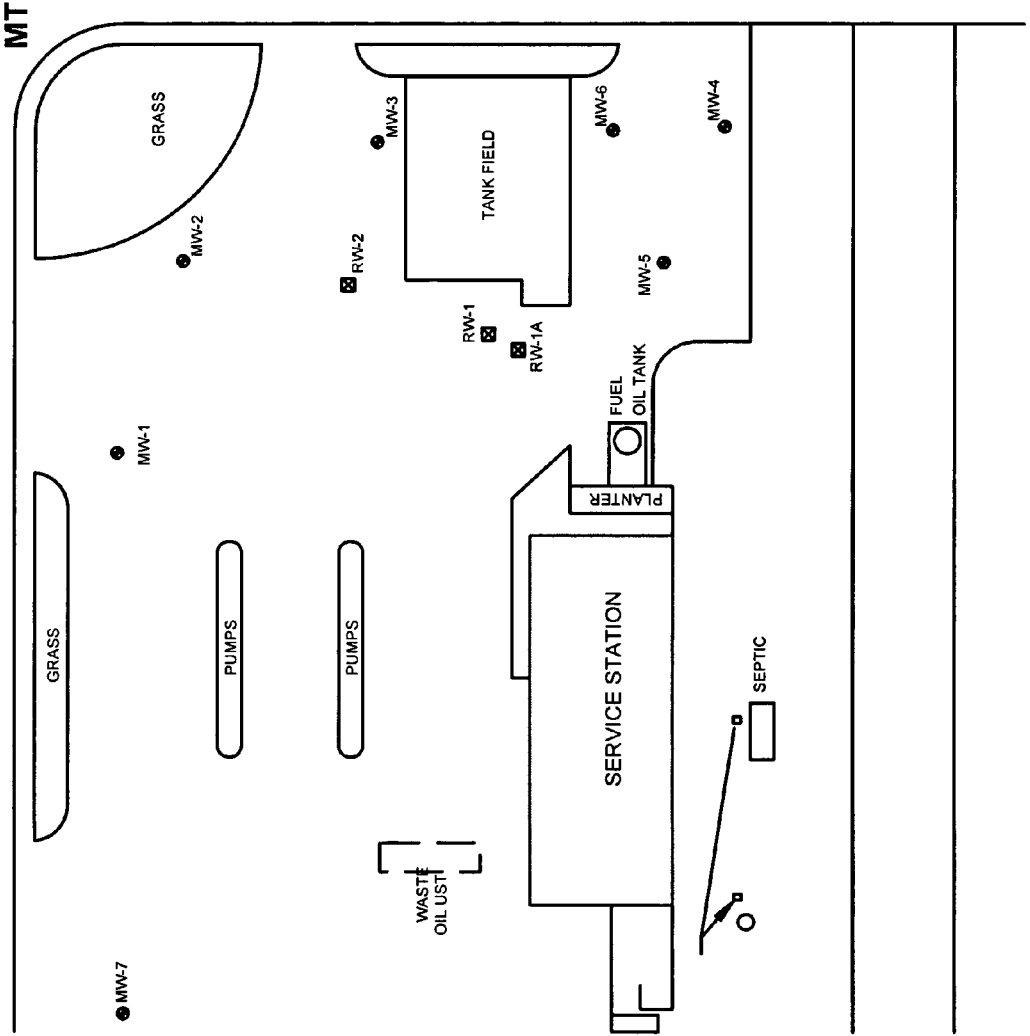

Observations:

Monitoring wells MW-4, MW-5, and MW-6 are located downgradient of the source area (and the injection wells). The rise in water table and dissolved oxygen content observed at these wells are indicative of the migration of the hydrogen peroxide solution within the permeable material. These data also indicate a radius of influence (ROI) of approximately 40 feet from the point of injection; the subsurface in the vicinity of the former tank field (MW-1 through MW-6, RW-1, RW-1A, RW-2) is primarily gravel fill material. All figures and tables associated with the observations wells are included in FIGS. 12a–s.

Subsequent Activities—Groundwater Monitoring

Ten days following the chemical oxidation event, the monitoring wells immediately surrounding the former UST field were developed and sampled. The monitoring wells were developed to ensure that the residual hydrocarbon mass desorbed and/or loosened by the peroxide was removed from the casing of wells.

According to the analytical results immediately following (ten days after) the injection event, dissolved BTEX, MTBE, and naphthalene concentrations within the vicinity of the USTs were significantly reduced. At four monitoring wells in the vicinity of the former USTs, dissolved BTEX concentrations were reduced approximately 13% to 88% and dissolved MTBE concentration were reduced approximately 17% to 73%.

Dissolved benzene, total BTEX, MTBE, and naphthalene concentrations in most wells (in the vicinity of the injection area) decreased considerably from the Apr. 22, 2003 sampling event to the Jul. 7, 2003 sampling event. Table 5 indicates the percentages of decreases for each respective constituent of concern.

TABLE 5

Percent Reduction in Dissolved Concentrations after Jun. 26, 2003 Event

| WELL ID | REDUCTION IN DISSOLVED BENZENE | REDUCTION IN DISSOLVED TOTAL BTEX | REDUCTION IN DISSOLVED MTBE | REDUCTION IN DISSOLVED NAPHTHALENE |
|---|---|---|---|---|
| MW-2 | 58% | 39% | ND | ND |
| MW-4 | ND | — | 17% | ND |
| MW-6 | 1% | 13% | 51% | 16% |
| MW-8 | ND | ND | 83% | ND |
| MW-10 | 99% | 99% | 66% | ND |
| MW-11 | ND | 99% | — | ND |
| RW1 | — | 34% | — | — |
| RW-1A | 95% | 88% | 73% | 52% |

Notes:
(—): No Decrease
ND: Concentrations were below laboratory detection limits and did not change after the event Additionally, according to the analytical data from samples collected from monitoring wells RW-2 and MW-3, there were few minor increases in groundwater concentrations. The increases in concentrations were likely due to desorption (i.e., hydrocarbon mass from the soil was transferred to the dissolved phase, thereby increasing concentrations. This transfer, however, makes the hydrocarbons more amenable to remediation in subsequent chemical oxidation events or through enhanced bioremediation).

Summary of Activities—Aug. 26, 2003

On Aug. 26, 2003, a second one-day injection event was conducted utilizing the mobile hydrogen peroxide and air injection system in the vicinity of former gasoline USTs at the abandoned gasoline station. During this event, a 10% hydrogen peroxide solution and a combination of wells were used to ensure that the peroxide was evenly distributed around the source area. The injection event was performed utilizing the methodology illustrated in FIG. 2B. At the conclusion of the test, approximately 1,250 gallons of hydrogen peroxide solution had been injected into the wells at an average flow rate of 5 gpm. Compressed atmospheric air was delivered at a flow rate of approximately 5 scfm to 15 scfm at pressures ranging from 5 psi to 14 psi.

Subsequent Activities—Groundwater Monitoring

Ten days following the chemical oxidation event on Aug. 26, 2003, the monitoring wells immediately surrounding the former UST field were developed and sampled again.

According to the analytical results (Sept. 4, 2003) immediately following the injection event, dissolved BTEX, MTBE, and naphthalene concentrations within the vicinity of the USTs were again significantly reduced.

Table 6 indicates the percentages of decreases for each respective constituent of concern from Apr. 22, 2003 (data prior to the initial chemical oxidation event) to Sep. 4, 2003.

TABLE 6

Percent Reduction in Dissolved Concentrations after Aug. 26, 2003 Event

| WELL ID | REDUCTION IN DISSOLVED BENZENE | REDUCTION IN DISSOLVED TOTAL BTEX | REDUCTION IN DISSOLVED MTBE | REDUCTION IN DISSOLVED NAPHTHALENE |
|---|---|---|---|---|
| MW-2 | 60% | 21% | ND | ND |
| MW-3 | 99% | 45% | 66% | 30% |
| MW-4 | ND | 99% | 99% | ND |
| MW-6 | 69% | 74% | 78% | 59% |
| RW-1 | 86% | 87% | 72% | 71% |
| RW-1A | 97% | 89% | 80% | 70% |

Note:
(—): No Decrease
ND: Concentrations were below laboratory detection limits and did not change after the event FIGS. 13a–f illustrate the site wide reduction in total BTEX and MTBE over the period. Table 7 (FIG. 14) summarizes the concentrations of benzene, total BTEX, MTBE, and naphthalene prior to and following each injection event.

Conclusions:

Significant dissolved-phase hydrocarbon reductions were observed immediately following the events as summarized below:

Benzene concentrations were reduced in five of six target wells; reductions ranged from 60 to 99 percent;

Total BTEX concentrations were reduced in all of the target wells; reductions ranged from 21 to 99 percent;

MTBE concentrations were reduced in five of six target wells; reductions ranged from 66 to 99 percent;

Naphthalene concentrations were reduced in four of six target wells; reductions ranged from 30 to 71 percent.

According to groundwater analytical data, some parameters exhibited decreasing trends prior to the injection events. Since the injection events, additional decreasing trends have been documented, and evidence suggests that the degradation of hydrocarbons via natural attenuation has been enhanced in those wells which previously identified decreasing trends. Additionally, offsite migration of the dissolved hydrocarbons is decreasing, according to the analytical data from MW-8.

Immediately prior to the initial event (Apr. 4, 2003), benzene was detected at concentrations above the Pennsylvania Department of Environmental Protection (PADEP) statewide health standard (SHS) in six wells. After the two events (Sep. 4, 2003 and/or Oct. 2, 2003), benzene was detected at concentrations below the PADEP SHS in five of the six wells.

Immediately prior to the initial event (Apr. 4, 2003), MTBE was detected at concentrations above the PADEP SHS in 11 wells. After the two events (Sep. 4, 2003 and/or Oct. 2, 2003), MTBE was detected at concentrations below the PADEP SHS in six of the 11 following wells.

Hydrocarbon trend graphs depicting groundwater data immediately prior to the remediation events and after the remediation events indicate decreasing trends in total BTEX and MTBE across the site. Although long term effects have not yet been observed, the decreasing concentration trends already observed have satisfied PADEP, and additional off-site monitoring wells are no longer required. This reduction in scope, due to the success of the remedial efforts, will decrease the lifecycle costs by eliminating additional site assessment and subsequently reducing the timeframe of groundwater attainment sampling for site closure.

Example 3

Case Study

Four two-day hydrogen peroxide and air injection events were conducted to remediate shallow dissolved toluene concentrations in a silty clay lithology. A total-phase vacuum extraction (TPVE) system had been operated for 3.5 years and successfully reduced the size of the plume and concentration levels, but did not achieve the clean-up goals.

Utilizing the methodology illustrated in FIG. 2B, a total of 7,000 gallons of 17.5% hydrogen peroxide solution were injected into a network of six existing monitoring and recovery wells. Compressed atmospheric air was injected at flow rates ranging from 5 scfm to 20 scfm at an applied pressure of 5 psi to 15 psi. The effective radius-of-influence without air injection was ten feet. With air injection, the radius-of-influence was 25 feet. As a result of the four injection events, the dissolved toluene concentrations were reduced by approximately 96% as shown in Table 8 below.

TABLE 8

Dissolved Toluene Concentrations (µg/L)

| Well ID | June 2003 Pre-Injection | September 2003 | November 2003 | December 2003 | Reduction |
|---|---|---|---|---|---|
| RW-11 | 6,300 | 1,200 | 88 | 71 | 99% |
| S-3 | 17,000 | 80 | 1,800 | 1,500 | 91% |
| RW-30 | 150 | 10 | 5 | ND | 100% |
| RW-31 | 46,000 | 35,000 | 620 | 5,600 | 88% |
| RW-32 | 65,000 | 120,000 | 7,200 | 9 | 100% |
| RW-33 | 26,000 | 2,600 | ND | ND | 100% |

ND—Not Detected

Example 4

Pilot Study

Figure 15:
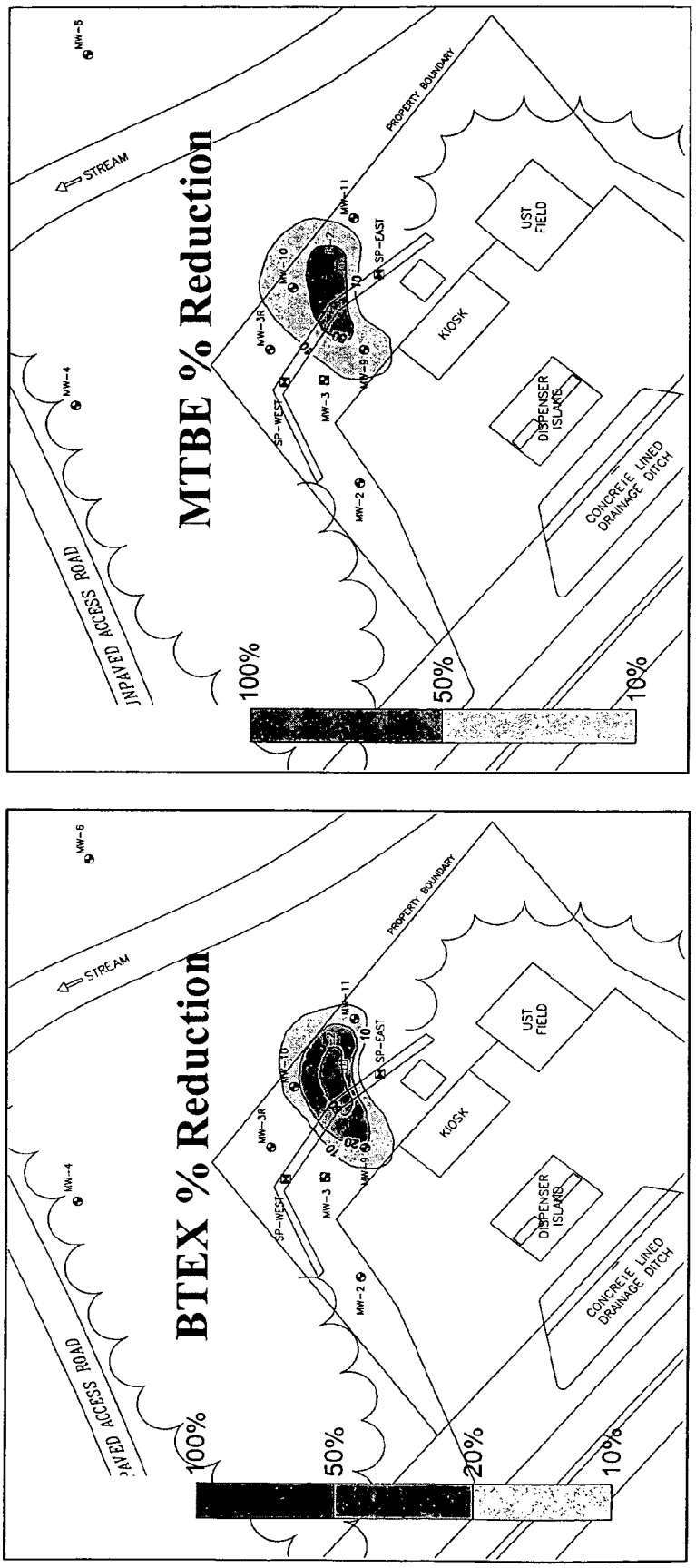
FIG. 15 illustrates the reduction in BTEX and MTBE following a one-day pilot test of the invention at the site of remediation in Example 4.

A one-day chemical oxidation pilot test was performed to determine the effectiveness of chemical oxidation. Two nested injection points (as shown in FIG. 1) were utilized to distribute ozone and hydrogen peroxide in a weathered bedrock. Testing was completed at each injection point in several steps ranging from low flow, high ozone concentration to high flow, low ozone concentration. The moderate to high flow steps were achieved by adding compressed air to the injection stream of oxygen/ozone as a carrier gas. The ozone/oxygen/air flow rates ranged from 0.57 scfm to 20.51 scfm while injected ozone concentrations ranged from 3,786 ppm to 108,800 ppm. Prior to injection of ozone/oxygen, approximately 50 gallons of 18% hydrogen peroxide were injected into each injection well to saturate the subsurface with peroxide. Subsequent ozone injection allows for the production of hydroxyl radicals. Dissolved BTEX and MTBE concentrations decreased significantly within a 15 to 20 ft. radius-of-influence of two injection points. The results are illustrated in FIG. 15.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

What is claimed is:

1. A method for treating groundwater and/or soil comprising:
   a) conducting two or more different reagents separately through two or more conduits residing in a bore hole;
   b) dispensing said two or more different reagents into said bore hole through injection ports associated with said two or more conduits, wherein at least one of said reagents is an oxidizing agent, and at least one of said reagents is capable of forming hydroxyl radicals by contacting said oxidizing agent;
   c) preventing substantial contact of said two or more reagents with each other in said bore hole; and
   d) forming hydroxyl radicals outside said bore hole by contacting of said two or more reagents outside said bore hole.

2. The method of claim 1 wherein said preventing of substantial contact of said two or more reagents in said bore hole is facilitated with at least one diffusion barrier placed between said injection ports.

3. The method of claim 1 wherein said two or more reagents are conducted through two conduits.

4. The method of claim 1 wherein said injection ports comprise a diffuser, well screen, or sprayer.

5. The method of claim 1 wherein at least one reagent is a gas and at least one further reagent is a liquid.

6. The method of claim 5 wherein said liquid flows through said conduit at a flow rate between about 0.5 and 25 gpm.

7. The method of claim 5 wherein said liquid flows through said conduit at a flow rate of about 0.5 gpm.

8. The method of claim 5 wherein said gas flows through said conduit at a flow rate between about 0.1 and 150 scfm.

9. The method of claim 5 wherein said gas flows through said conduit at a flow rate above about 15 scfm.

10. The method of claim 5 wherein said gas comprises ozone, oxygen, or air.

11. The method of claim 5 wherein said gas comprises ozone.

12. The method of claim 5 wherein said gas comprises air.

13. The method of claim 5 wherein said liquid comprises hydrogen peroxide.

14. The method of claim 1 wherein said two or more reagents are pulsed through said conduits.

15. The method of claim 1 wherein said groundwater or said soil is in a container.

16. The method of claim 15 wherein said container is above ground.

17. The method of claim 1 wherein said reagents comprise persulfate, hydrogen peroxide, ozone, oxygen, air, sodium permanganate, potassium permanganate, calcium peroxide, iron, catalyst, nutrients, carbon, or acid, or water solution thereof.

18. The method of claim 1 wherein one of said two or more different reagents further comprises persulfate.

19. The method of claim 2 wherein said diffusion barrier comprises bentonite or grout.

20. The method of claim 5 wherein said liquid comprises persulfate.

21. The method of claim 20 wherein said diffusion barrier comprises bentonite or grout.

22. A method for treating groundwater and/or soil comprising:
   a) conducting a gaseous reagent comprising ozone through a first conduit residing in a bore hole and conducting a liquid reagent comprising hydrogen peroxide through a second conduit residing in said bore hole;
   b) dispensing said reagents into said bore hole through injection ports associated with each of said conduits;
   c) preventing substantial contact of said gaseous and liquid reagents with each other in said bore hole; and
   d) forming hydroxyl radicals outside said bore hole by contacting of said gaseous and liquid reagents outside said bore hole.

23. The method of claim 22 wherein said gaseous reagent flows through said conduit at a flow rate above about 15 scfm.

24. The method of claim 22 wherein said gaseous reagent flows through said conduit at a flow rate up to about 40 scfm.

25. The method of claim 22 wherein the concentration of ozone in said gaseous reagent is between about 1,000 ppmv and about 100,000 ppmv.

26. The method of claim 22 wherein said preventing of substantial contact of said two or more reagents in said bore hole is facilitated with at least one diffusion barrier placed between said injection ports.

27. A system for treating groundwater and/or soil comprising:
   a) one conduit for conducting two or more different reagents into said groundwater and/or soil through a bore hole;
   b) one injection port associated with said conduit for dispensing said two or more different reagents;
   c) a diffusion barrier placed in said conduit above said injection port, isolating reagent injection location to a minimum depth within the borehole.

28. The system of claim 27 wherein said diffusion barrier comprises a well packer.

29. The system of claim 27 wherein said bore hole is packed with sand around said injection port.

30. The system of claim 27 wherein said injection port comprises a diffuser, well screen, or sprayer.

31. The system of claim 27 wherein said reagents comprise air and hydrogen peroxide.

32. The system of claim 27 wherein said reagents flow through said conduit at a flow rate of about 0.5 gpm to 20 gpm.

33. The system of claim 27 wherein said reagents flow through said conduit at about 1 scfm to 30 scfm.

34. The system of claim 27 wherein said system comprises a reagent line for gas and a reagent line for liquid in said conduit, wherein said reagent lines terminate within said injection port.

35. The system of claim 34 wherein said reagent lines each terminate at different points within said injection port.

36. The system of claim 34 wherein a further diffusion barrier is placed in said conduit between the termini of the reagent lines.

37. The system of claim 36 wherein said further diffusion barrier is a well packer.

38. The system of claim 34 wherein said gas flows through said reagent line at a flow rate from about 0.1 to about 150 scfm.

39. The system of claim 34 wherein said gas flows through said reagent line at a flow rate from about 1 to about 30 scfm.

40. The system of claim 34 wherein said gas flows through said reagent line at a flow rate above about 15 scfm.

41. The system of claim 34 wherein said liquid flows through said reagent line at a flow rate between about 0.5 and about 25 gpm.

42. The system of claim 34 wherein said liquid flows through said reagent line at a flow rate between about 0.5 gpm and about 10 gpm.

43. The system of claim 34 wherein said liquid flows through said reagent line at a flow rate between about 2 gpm and about 5 gpm.

44. The system of claim 34 wherein said liquid flows through said reagent line at a flow rate of about 0.5 gpm.

45. The system of claim 34 wherein said gas comprises air and said liquid comprises hydrogen peroxide.

46. A method of reducing organic compounds dissolved or suspended in a body of water and/or soil comprising injecting two or more reagents into said body of water and/or soil using the system of claim 27.

47. The method of claim 46 wherein said organic compounds are VOCs, MTBE, BTEX, TBA, TAME, PCBs, NVOCs, or petroleum hydrocarbons.

48. A method of increasing dissolved oxygen in a body of water and/or soil comprising injecting two or more reagents into said body of water and/or soil using the system of claim 27.

49. The system of claim 27 wherein said two or more different reagents are each independently selected from persulfate, hydrogen peroxide, ozone, oxygen, air, sodium permanganate, potassium permanganate, calcium peroxide, iron, catalyst, nutrients, carbon, and acid, or water solution thereof.

50. The system of claim 27 wherein:
one of said reagents comprises air, oxygen, or ozone; and
one of said reagents comprises hydrogen peroxide.

51. The system of claim 27 wherein said reagents further comprise persulfate.

52. The system of claim 27 wherein said groundwater or said soil is in a container.

53. The system of claim 51 wherein said container is above ground.

54. The system of claim 34 wherein:
said gas comprises air, oxygen, or ozone; and
said liquid comprises hydrogen peroxide.

55. A method of treating a body of water and/or soil comprising injecting two or more reagents into said body of water and/or soil using the system of claim 27.

56. The method of claim 55 wherein said body of water is groundwater.

57. The method of claim 55 wherein said treating occurs in situ.

58. The method of claim 55 wherein said two or more reagents comprise air and hydrogen peroxide or ozone and hydrogen peroxide.

59. The method of claim 55 wherein at least one reagent is hydrogen peroxide which is injected at a flow rate above about 0.5 gpm.

60. The method of claim 55 wherein at least one reagent is hydrogen peroxide which is injected at a flow rate at or above about 2 gpm.

61. The method of claim 55 wherein said reagents each independently comprise persulfate, hydrogen peroxide, ozone, oxygen, air, sodium permanganate, potassium permanganate, calcium peroxide, iron, catalyst, nutrients, carbon, or acid, or water solution thereof.

62. The method of claim 55 wherein said reagents each independently comprise hydrogen peroxide and persulfate.

63. A method of treating groundwater and/or soil comprising contacting two or more reagents, wherein at least one of said reagents is an oxidizing agent, and at least one of said reagents is capable of forming hydroxyl radicals by contacting said oxidizing agent, wherein said contacting occurs after said two or more reagents have diffused into said groundwater and/or soil from separate conduits or separate points at an injection port within a single conduit, where said separate conduits or separate points are separated by a diffusion barrier, and wherein said contacting produces hydroxyl radicals.

64. The method of claim 63 wherein said groundwater and/or soil is in a container.

65. The method of claim 63 wherein at least one of said two or more reagents oxidizes organic molecules dissolved or suspended in said groundwater and/or adsorbed in said soil.

66. The method of claim 63 wherein said contacting produces a further reagent that can react with organic molecules dissolved or suspended in said groundwater and/or adsorbed in said soil.

67. The method of claim 63 wherein one of said two or more reagents comprises hydrogen peroxide and another of said two or more reagents comprises one or more of ozone, oxygen, and/or air.

68. The method of claim 63 wherein said organic molecules comprise pollutants.

69. The method of claim 68 wherein said pollutants are VOCs, MTBE, BTEX, TBA, TAME, PCBs, NVOCs, or petroleum hydrocarbons.

70. The method of claim 63 wherein said two or more reagents are injected below ground into said water and/or soil.

71. The method of claim 63 wherein two of said two or more reagents are ozone and hydrogen peroxide.

72. The method of claim 63 wherein two of said two or more reagents are air and hydrogen peroxide.

73. The method of claim 71 wherein said ozone is injected into the ground at a deeper level than said hydrogen peroxide.

74. The method of claim 63 wherein said diffusion barrier is located inside said bore hole.

75. The method of claim 63 wherein said diffusion barrier is located inside a conduit.

76. The method of claim 75 wherein said diffusion barrier is a well packer.

77. The method of claim 63 wherein said bore hole is about 2 to about 12 inches in diameter and about 2 to about 100 feet deep.

78. The method of claim 63 wherein said bore hole is packed with sand at said injection ports.

79. The method of claim 63 wherein said diffusion barrier comprises bentonite or grout in said bore hole.

80. The method of claim 63 wherein said reagents each independently comprise persulfate, hydrogen peroxide, ozone, oxygen, air, sodium permanganate, potassium permanganate, calcium peroxide, iron, catalyst, nutrients, carbon, and acid, or water solution thereof.

81. The method of claim 63 wherein said reagents each independently comprise hydrogen peroxide and persulfate.

82. The method of claim 63 wherein:
one of said reagents comprises air, ozone, or oxygen; and
one of said reagents comprises hydrogen peroxide.

83. The method of claim 63 wherein one of said two or more reagents further comprises persulfate.

84. A method of reducing organic compounds dissolved, absorbed, or suspended in a body of water and/or soil comprising:

a) conducting two or more different reagents into said body of water and/or soil separately through two or more conduits residing in a bore hole;
b) dispensing said two or more different reagents into said bore hole through injection ports associated with said two or more conduits, wherein at least one of said reagents is an oxidizing agent, and at least one of said reagents is capable of forming hydroxyl radicals by contacting said oxidizing agent;
c) preventing substantial contact of said two or more reagents with each other in said bore hole; and
d) forming hydroxyl radicals outside said bore hole by contacting of said two or more reagents outside said bore hole
e) allowing the formed hydroxyl radicals to contact said body of water and/or soil to reduce organic compounds dissolved, absorbed, or suspended in a body of water and/or soil.

85. The method of claim 84 wherein said organic compounds are VOCs, MTBE, BTEX, TBA, TAME, PCBs, NVOCs, or petroleum hydrocarbons.

86. A method of increasing dissolved oxygen in groundwater and/or soil comprising:
a) conducting two or more different reagents into said groundwater and/or soil separately through two or more conduits residing in a bore hole;
b) dispensing said two or more different reagents into said bore hole through injection ports associated with said two or more conduits, wherein at least one of said reagents is an oxidizing agent, and at least one of said reagents is capable of forming hydroxyl radicals by contacting said oxidizing agent;
c) preventing substantial contact of said two or more reagents with each other in said bore hole; and
d) forming hydroxyl radicals outside said bore hole by contacting of said two or more reagents outside said bore hole
e) allowing the formed hydroxyl radicals to contact said groundwater and/or soil to increase dissolved oxygen in said groundwater and/or soil.

* * * * *